United States Patent [19]

Bauman et al.

[11] Patent Number: 5,412,756
[45] Date of Patent: May 2, 1995

[54] ARTIFICIAL INTELLIGENCE SOFTWARE SHELL FOR PLANT OPERATION SIMULATION

[75] Inventors: Douglas A. Bauman, Apollo; Simon Lowenfeld, Export; Brian A. Schultz; Robert W. Thompson, Jr., both of Pittsburgh, all of Pa.

[73] Assignee: Mitsubishi Denki Kabushiki Kaisha, Tokyo, Japan

[21] Appl. No.: 995,209

[22] Filed: Dec. 22, 1992

[51] Int. Cl.$^6$ ............................................. G06F 15/18
[52] U.S. Cl. ........................................ 395/50; 395/53
[58] Field of Search ....................... 395/53, 77, 68, 50, 395/61

[56] References Cited

PUBLICATIONS

Jagannathan, Dodhiawala & Baum, Blackboard Architectures and Applications, 1989, cover, frontispice, pp. 178–299, Academic Press, San Diego, California.
Nii, Blackboard Systems, Summer 1986, pp. 38–53, AI Magazine.
Nii, Blackboard Systems, Aug. 1986, pp. 82–106, AI Magazine.
Slade, Case-Based Reasoning, 1991, pp. 42–55, AI Magazine.
Hayes-Roth, A Blackboard Architecture for Control, 1985, pp. 251–321, AI Magazine.
Chen, et al., "An Intelligent Control Architecture for Expert Process Control," Twenty-Third Southeastern Symp. on Syst. Theory, Mar. 1991, 323–326.
Lyle, F., "Bridging Networks," UNIX Review, v. 9(5), May 1991, 46(7).
Wang, et al, "A design–dependent approach to integrated structural design," Artif. Intell. in Design, Jun. 1991, 151–170.
Corkill, D., "Blackboard Systems," AI Expert, Sep. 1991, 41–47.
Kopeikina, et al., "Case Based Reasoning for Continuous Control," Proceedings: Workshop on Case–Based Reasoning, May 1988, 250–259.
Barr, et al., The Handbook of Artificial Intelligence vol. IV, Addison–Wesley Pub., 1989, 4–17.
Larner, D. L., "Factories, Objects of Blackboards," AI Expert, Apr. 1990, 38–45.
Alexander, et al., "Case–Based Planning for Simulation," First Int'l. Conf. on Expert Planning Syst., Jun. 1990, 217–220.
Tomassini, M., "Programming with Sockets," C Users Journal, Sep. 1991, p. 39(14).
Buta, et al., "Case–Based Reasoning for Market Surveillance," First Int'l. Conf. or Artificial Intelligence on Wall Street, Oct. 1991, 116–121.
Software Product Specification for GBB v. 2.1, Blackboard Technology Group, Inc., Released 1991.
Blackboard Technology Group, Inc., Advertisement for GBB, AI Expert, Mar. 1992, 4.
Bardsz, et al., "A Blackboard Architecture to Support Case–Based Reasoning in Mechanical Design," Advances in Design Automation vol. 1, Sep. 1992, 337–343.
Product Description for GBB and Net GBB, Blackboard Technology Group, Inc., AI Expert, Dec. 1992.

*Primary Examiner*—Robert W. Downs
*Attorney, Agent, or Firm*—Wolf, Greenfield & Sacks

[57] ABSTRACT

An artificial intelligence software shell for plant operation simulation includes a blackboard module including a database having objects representing plant elements and concepts. A rule-based knowledge source module and a case-based knowledge source module, in communication with the blackboard module, operate on specific predefined blackboard objects. A user interface module, in communication with the blackboard module, enables a user to view blackboard status information. A control module, in communication with the blackboard module and the knowledge source modules, receives input data and controls operation of the knowledge source modules in accordance with a predetermined knowledge source priority scheme.

55 Claims, 64 Drawing Sheets

| Value Type | Code |
|---|---|
| Reserved | 0 |
| Char | 1 |
| Int | 2 |
| Double | 3 |
| String | 4 |
| Object | 5 |
| File | 6 |
| Unused | 7,8 |
| List of Char | 9 |
| List of Int | 10 |
| List of Double | 11 |
| List of String | 12 |
| List of Object | 13 |
| List of File | 14 |
| Unused | 15,16 |

Fig. 8

```
initialize/load files repeat forever
    wait for message
    if stop message then exit
    else
        parse data message
        if message incorrect then NACK
        else
            forward message to blackboard process/echo bb response
            for each data point received
                if data point is in hash table
                    data point.value = new value
                    data point.updated = true
                else  eliminate data point
            for each data point left
                for each expression in its indirect expression list
                    if      expression has not been evaluated yet
                            AND
                            associated KS not already on KS list
                            AND
                            expression evaluates to true
                    then    add KS to KS list
                            expression.updated = true
                            expression.last value = current value
            send KS list to activation/agenda manager process
            for each data point left
                data point.updated = false
            for each expression in expression list
                expression.updated = false
```

Fig. 9

```
initialize/load files repeat until stop message
wait for message from event detector
for each knowledge source in message
        if preconditions evaluate to true
                if knowledge source already on timer queue
                        remove from timer queue
                        reschedule it on timer queue
                if a knowledge source is currently running
                        wait for it to finish
                activate knowledge source wait for timer signal
pop first entry from timer queue
if a knowledge source is currently running
        wait for it to finish
activate knowledge source
reschedule knowledge source for its next run
set timer to next entry in timer queue
```

Fig. 10

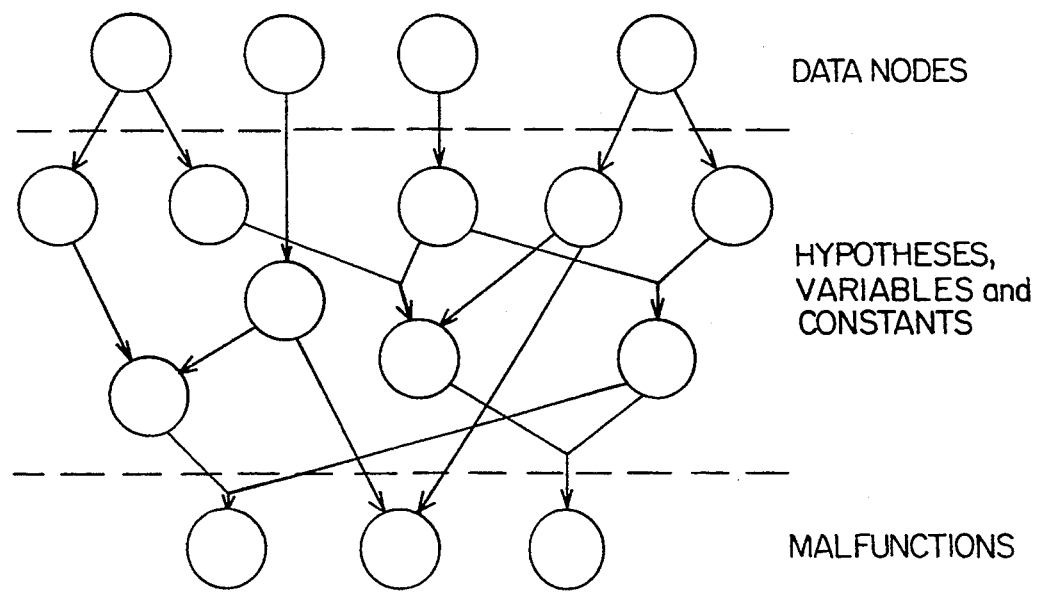

DATA NODES

HYPOTHESES, VARIABLES and CONSTANTS

MALFUNCTIONS

Fig.11

DATA NODE

| name |
|---|
| object |
| description |
| value |
| updated |
| mapping-function |

HYPOTHESIS NODE

| name |
|---|
| (object) |
| description |
| mb |
| md |
| cf |
| updated |
| supporting-rules |
| supported-rules |

MALFUNCTION NODE

| name |
|---|
| object |
| description |
| mb |
| md |
| cf |
| updated |
| priority |
| severity |
| supporting-rules |

Fig.12

RULE

| name |
|---|
| description |
| context |
| evidence-text |
| evidence-expr. |
| evidence-list |
| hypothesis-list |
| action-list |
| sf |
| nf |
| alpha |
| beta |
| change-based-val |
| fired |

META-RULE

| name |
|---|
| description |
| context |
| source-text |
| source-expr. |
| source-list |
| target-list |
| target-slot |
| function |
| change-based-val |
| fired |

Fig.13

| CONSTANT |
|---|
| name |
| description |
| value |
| supported-rules |

| CONTEXT |
|---|
| name |
| description |
| value |

| PIECE-WISE-LINEAR |
|---|
| name |
| description |
| xy-list |

| VARIABLE |
|---|
| name |
| description |
| value |
| updated |
| supporting-rules |
| supported-rules |

| EVALUATOR |
|---|
| name |
| description |
| expression-text |
| expression |
| expression-list |
| variable |
| change-based-val |
| context |

| SYSTEM |
|---|
| name |
| description |
| data-nodes |
| hypotheses |
| malfunctions |
| rules |
| meta-rules |
| evaluators |
| context |
| piece-wise-lin. |
| variables |
| constants |

Fig.14

```
request data from blackboard
for each data node
        if new value then
                set data node value slot
                evaluate mapping function
                add node to new node list
для each node in new node list
        clear updated slot in all rules and nodes rooted in this node
for each node in new node list
        for each of this node's supported rules
                if      the rule is in context AND
                        the evidence is available AND
                        the evidence is in range
                then    fire the rule:
                        update rule's hypotheses
                        execute rule's actions
                        add rule's hypotheses to node list
```

Fig.15

| | | | |
|---|---|---|---|
| if CF>0 (evidence is true) | if SF=1 then $CF_{evidence}$ | changes $MB_{hypothesis}$ |
| | if 0<SF<1 then $SF*CF_{evidence}$ | changes $MB_{hypothesis}$ |
| | if SF=0 then no change | |
| | if -1<SF<0 then $-SF*CF_{evidence}$ | changes $MD_{hypothesis}$ |
| | if SF=-1 then $CF_{evidence}$ | changes $MD_{hypothesis}$ |
| if CF<0 (evidence is false) | if NF=1 then $CF_{evidence}$ | changes $MD_{hypothesis}$ |
| | if 0<NF<1 then $NF*CF_{evidence}$ | changes $MD_{hypothesis}$ |
| | if NF=0 then no change | |
| | if -1<NF<0 then $-NF*CF_{evidence}$ | changes $MB_{hypothesis}$ |
| | if NF=-1 then $CF_{evidence}$ | changes $MB_{hypothesis}$ |

Fig. 20

| MESSAGE | CODE |
| --- | --- |
| acknowledgment | ACK |
| notification of failure | NACK |
| request for data | DATAREQ |
| data supplied | DATASUP |
| knowledge source list | KSSUP |

Fig. 21

| MESSAGE | CODE |
| --- | --- |
| start | START |
| stop | STOP |
| activate process | ACTIV |
| set parameters | SETPARAM |
| acknowledgement | ACK |
| notification of failure | NACK |

Fig. 22

| MESSAGE | CODE |
| --- | --- |
| NACK | 0 |
| ACK | 1 |
| DATAREQ | 2 |
| DATASUP | 3 |
| KSSUP | 4 |
| START | 5 |
| STOP | 6 |
| ACTIV | 7 |
| SETPARAM | 8 |

Fig.23

```
DATAREQ
number_of_objects
object_name_1
        number_of_attributes
        attribute_name_1
        .
        .
        attribute_name_n
object_name_2
        number_of_attributes
        attribute_name_1
        .
        .
        attribute_name_n
.
.
object_name_n
        number_of_attributes
        attribute_name_1
        .
        .
        attribute_name_n
```

Fig.25

```
KSSUP
number_of_knowledge_sources
knowledge_source_ID_1
knowledge_source_ID_2
.
.
knowledge_source_ID_n
```

Fig. 24

```
DATASUP
number_of_objects
object_name_1
        number_of_attributes
        attribute_name_1
                number_of_values
                value_type
                value_1
                time_1
                value_type
                value_2
                time_2
                .
                .
                value_n
                time_n
        attribute_name_2
        .
        .
        attribute_name_n
                number_of_values
                .
                .
                time_n
    .
    .
object_name_n
        attribute_name_1
        .
        .
        attribute_name_n
                number_of_values
                .
                .
                time_n
```

Fig.26

```
SETPARAM
number_of_parameters
parameter_code_1
status_1
.
.
parameter_code_n
status_n PARAMETER        CODE
trace              0
log                1
step               2
breakpoint         3

STATUS           CODE
off                0
on                 1
```

Fig.27

```
BLACKBOARD FILE: bb_structure_description_filename.BB
RULE BASE FILE: rule_based_description_filename_1.RB
                         .
                         .
RULE BASE FILE: rule_based_description_filename_n.RB
CASE BASE FILE: case_description_filename_1.CB
                         .
                         .
CASE BASE FILE: case_description_filename_n.CB
```

Fig.28

```
OBJECT: object_name_1
    ATTRIBUTE: attribute_name_1
    NUMBER OF VALUES: number_of_values
    DEMON: demon_name
    VALUE TYPE: value_type ATTRIBUTE: attribute_name_2
    NUMBER OF VALUES: number_of_values
    DEMON: demon_name
    VALUE TYPE: value_type
            .
            .
            .
    ATTRIBUTE: attribute_name_n
    NUMBER OF VALUES: number_of_values
    DEMON: demon_name
    VALUE TYPE: value_type
.
.
OBJECT: object_name_n
```

Fig. 29A

```
------------------------------
EVENTS
EXPRESSION: (evaluation_expression_1)
EXPRESSION: (evaluation_expression_2)
.
.
EXPRESSION: (evaluation_expression_n)

------------------------------
PRECONDITIONS
EXPRESSION: (evaluation_expression_1)
EXPRESSION: (evaluation_expression_2)
.
.
EXPRESSION: (evaluation_expression_n)

------------------------------
RULE BASE STRUCTURE

------------------------------
PIECEWISE LINEARS

NAME: pwl_name_1
DESCRIPTION: descriptive_text
XY-LIST: ((x_value_1,y_value_1)...(x_value_n,y_value_n))
.
.
NAME: pwl_name_n
.
.

------------------------------
CONTEXTS

NAME: context_name_1
DESCRIPTION: descriptive_text
.
.
NAME: context_name_n
.
.
```

Fig. 29B

```
------------------------------------
DATA NODES

NAME: data_name_1
OBJECT: object_name/attribute_name
DESCRIPTION: descriptive_text
MAPPING RULE: pwl_name
  .
  .
NAME: data_name_n
  .
  .
------------------------------------
HYPOTHESES NAME: hypothesis_name_1
OBJECT: <object_name/attribute_name>
DESCRIPTION: descriptive_text
  .
  .
NAME: hypothesis_name_n
  .
  .
------------------------------------
MALFUNCTIONS NAME: malfunction_name_1
OBJECT: object_name/attribute_name
DESCRIPTION: descriptive_text
  .
  .
NAME: malfunction_name_n
  .
  .
------------------------------------
VARIABLES NAME: variable_name_1
OBJECT:<object_name/attribute_name>
DESCRIPTION: descriptive_text
  .
  .
NAME variable_name_n
  .
  .
```

Fig.29C

```
------------------------------------
CONSTANTS

NAME: constant_name_1
DESCRIPTION: descriptive_text
VALUE: constant_value
    .
    .
NAME: constant_name_n
    .
    .
------------------------------------
RULES NAME: rule_name_1
DESCRIPTION: descriptive_text
EVIDENCE TEXT: evaluation_expression
HYP. LIST: (hypothesis_name <,hypothesis_name>...)
ACTION LIST: (action_1 <,action_2>...)
ALPHA: alpha_number
BETA: beta_number
SF: SF_number
NF: NF_number
CONTEXT: context_name
    .
    .
NAME: rule_name_n
    .
    .
------------------------------------
METARULES NAME: metarule_name_1
DESRIPTION: descriptive_text
SOURCE: evaluation_expression
TARGET LIST: (target_1 <,target_2>...)(context_name or rule_name)
TARGET SLOT: (value or SF or NF)
FUNCTION: function_name or pwl_name
CONTEXT: context_name
    .
    .
NAME: metarule_name_n
    .
    .
```

Fig. 30A

```
------------------------------
EVENTS

EXPRESSION: (evaluation_expression_1)
EXPRESSION: (evaluation_expression_2)
       .
       .
EXPRESSION: (evaluation_expression_n)
------------------------------
PRECONDITIONS EXPRESSION: (evaluation_expression_1)
EXPRESSION: (evaluation_expression_2)
       .
       .
EXPRESSION: (evaluation_expression_n)
------------------------------
CASE BASE STRUCTURE
------------------------------
CASES CASE ID: case_name_text
      CASE OBJECT/ATTRIBUTE: object_name/attribute_name for dynamic data OBJECT: object_name_1
      ATTRIBUTE: attribute_name
      VALUE LIST: ((value_1,time_1)(value_2,time_2)
            ...(value_n,time_n))

or for static data

OBJECT: object_name_1
      ATTRIBUTE: attribute_name
      VALUE: value repeat for all object attributes used to define a case .
       .
CASE ID case_name_text
       .
```

*Fig.30B*

```
- - - - - - - - - - - - - - - - - - - - - - -
FUNCTIONS AND WEIGHTS
    OBJECT: object_name_1
    ATTRIBUTE: attribute_name
    FUNCTION: (evaluation_expression_1...<,evaluation_expression_n>)

(this is a list of functions: one for each value in the attribute's history)
    WEIGHT: weight_value
    <WEIGHT LIST: (weight_value_1... <weight_value_n>)> repeat for all object attributes used to define a case
```

*Fig.31*

```
TIME: time_stamp_1
    OBJECT: object_name_1
    ATTR.,VALUE: attribute_name_1,value
    ATTR.,VALUE: attribute_name_2,value
            .
    ATTR.,VALUE: attribute_name_n,value OBJECT: object_name_2
    ATTR.,VALUE: attribute_name_1,value
    ATTR.,VALUE: attribute_name_2,value
            .
    ATTR.,VALUE: attribute_name_n,value
            .
            .
    OBJECT: object_name_n
    ATTR.,VALUE: attribute_name_1,value
            .
    ATTR.,VALUE: attribute_name_n,value repeat for all data sets
```

Fig.32

Format for a RLOGF (Rule Based)

TIME: time_1
DIAGNOSIS: descriptive_text
CF:CF
PRIORITY: priority_number
SEVERITY: severity_number

.
.

TIME: time_n
DIAGNOSIS: descriptive_text
CF:CF
PRIORITY: priority_number
SEVERITY: severity_number In addition, free-form descriptive text may appear interspersed in the file Format for a CLOGF (Case Based)

TIME: time_1
SIMILARITY VALUE: similarity_value
CASE NAME: case_name_text

.
.

TIME: time_n
SIMILARITY VALUE: similarity_value
CASE NAME: case_name_text

Fig.33

```
------------------------
DIAGNOSES

RANK: 1
RANK VALUE: rank_value_1
TIME: time_1
DIAGNOSIS: diagnosis_text
KNOWLEDGE SOURCE: knowledge_source_ID RANK: 2
RANK VALUE: rank_value_2
TIME: time_2
DIAGNOSIS: diagnosis_text
KNOWLEDGE SOURCE: knowledge_source_ID RANK: n
RANK VALUE: rank_value_n
TIME: time_n
DIAGNOSIS: diagnosis_text
KNOWLEDGE SOURCE: knowledge_source_ID

------------------------
CASES

RANK: 1
SIMILARITY VALUE: similarity_value_1
TIME: time_1
CASE NAME: case_name_text
KNOWLEDGE SOURCE: knowledge_source_ID
    .
    .
RANK: N
SIMILARITY VALUE: similarity_value_n
TIME: time_n
CASE NAME: case_name_text
KNOWLEDGE SOURCE: knowledge_source_ID
```

Fig. 34

```
OBJECT: object_name_1

ATTRIBUTE: attribute_name_1
    NUMBER OF VALUES: number_of_values
    DEMON: demon_name
    VALUE TYPE: value_type
    VALUE @ TIME: value_1 @ time_1
    VALUE TYPE: value_type
    VALUE @ TIME: value_2 @ time_2
                  :
    VALUE @ TIME: value_n @ time_n ATTRIBUTE: attribute_name_2
    NUMBER OF VALUES: number_of_values
    DEMON: demon_name
    VALUE TYPE: value_type
    VALUE @ TIME: value_1 @ time_1
    VALUE TYPE: value_type
    VALUE @ TIME: value_2 @ time_2
                  :
    VALUE @ TIME: value_n @ time_n
                  :
    ATTRIBUTE: attribute_name_n
    NUMBER OF VALUES: number_of_values
    DEMON: demon_name
    VALUE TYPE: value_type
    VALUE @ TIME: value_1 @ time_1
    VALUE TYPE: value_type
    VALUE @ TIME: value_2 @ time_2
                  :
    VALUE @ TIME: value_n @ time_n repeat for all blackboard objects
```

DATA AVAILABLE
FOR MONITORING
AND DIAGNOSIS

Fig.37

```
<blackboard-object>
    name         :   [string]
    is-a         :   [blackboard-object]
    has-instance :   [blackboard-object]
    has-parts    :   [blackboard-object]
    part-of      :   [blackboard-object]
    inputs       :   [blackboard-object|output attribute,link]
    outputs      :   [blackboard object|input attribute,link]
    function     :   [function]
```

Fig.38

```
<link-object>
    name         :   [string]
    is-a         :   [link-object]
    has-instance :   [link-object]
    input        :   [blackboard-object|output-attribute]
    output       :   [blackboard-object|input-attribute]
    function     :   [function]
```

Fig.43.
Development Environment
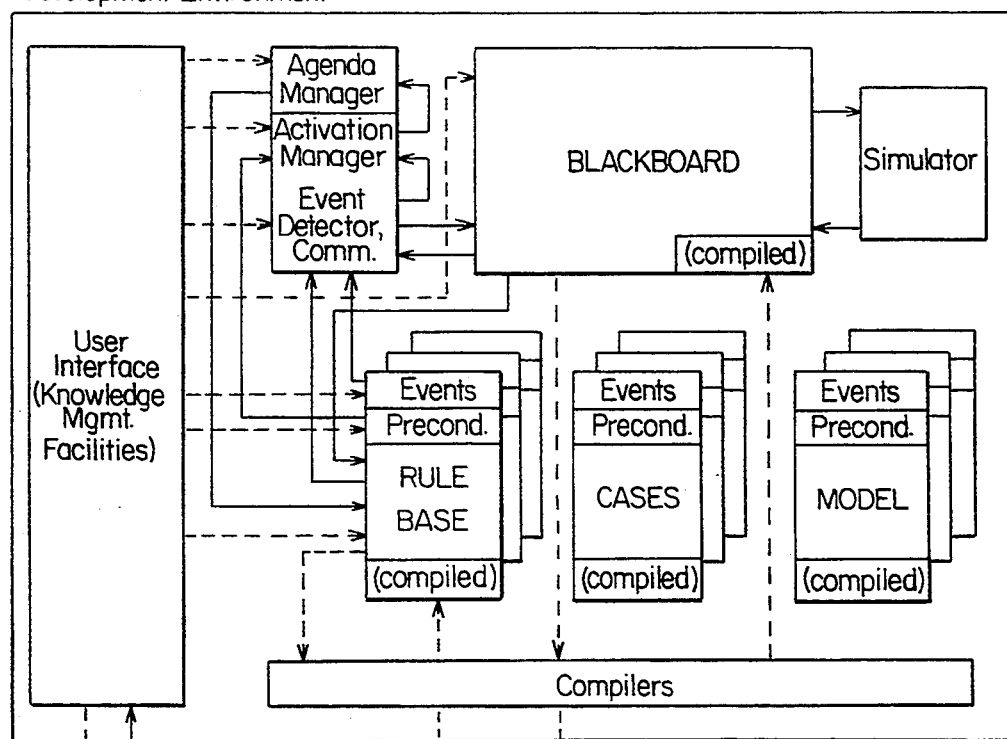
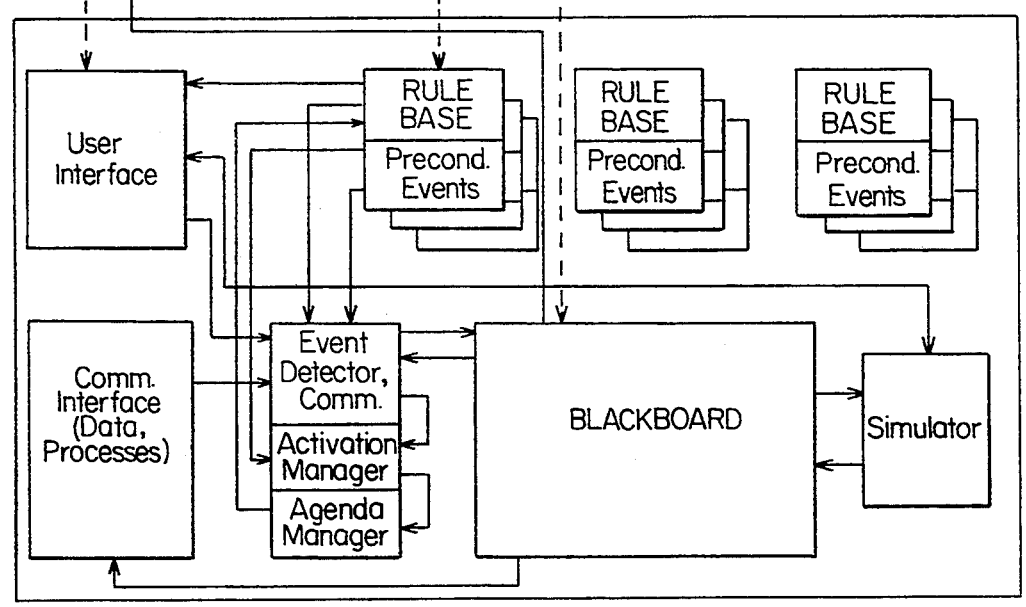
Runtime Environment

Fig. 51

| OBJECT NAME: object_4 | |
|---|---|
| ATTRIBUTE LIST<br>attribute_1<br>attribute_2<br>attribute_3<br>attribute_4 | ATTRIBUTE NAME: attribute_3<br>HISTORY LENGTH: 30 values seconds<br>DEMON:<br>[Attribute OK] [Attribute Cancel]<br>VALUE  TYPE  TIMESTAMP |
| [ATTRIBUTE ADD] [ATTRIBUTE DELETE] [ATTRIBUTE MODIFY] | [VALUE ADD] [VALUE DELETE] [VALUE MODIFY] |
| [Object OK] | [Object Cancel]  [Help] |

Fig.52

OBJECT: object_3
ATTRIBUTE: attribute_4

VALUE: [           ]
TYPE: [     ]  [PICK]
TIMESTAMP: [        ]

[OK]   [Cancel]   [Help]

Fig.53 control editor

[System] [Control Rules] [Save] [Exit]

knowledge_source_1
knowledge_source_2
knowledge_source_3
．
．
external_process_1
external_process_2
external_process_3

System
Modify
Delete
Add

Fig.54

| application name : application_2 |
| system module: knowledge_source_2  type: rule_base   PICK |
| description: | interruptible:  YES   NO
priority: 1 time out:  YES   NO
time out period: 10 seconds
time out action: suspend   PICK control:
EVENTS   PRECONDS.   REFIRE CONDS.

Save   Cancel   Help

Fig.57 rule base name: rule_base_4
context name: context 1
object name: object_3 | attribute_2  PICK
value: 1   0
description:
This is an example of a context.
OK    Cancel    Help

Fig.58 rule base name: rule_base_4
data node name: data_node_7
object: object_4 | attribute_3  PICK
description:
This is an example of a data node.
OK    Cancel    Help objects:
object_1
object_2
object_3
object_4
object_5
PICK
OK  Cancel  Help OBJECT: object_4
attributes:
attribute_1
attribute_2
attribute_3
attribute_4
OK  Cancel  Help

Fig. 59 rule base name: rule_base_5
evaluator name: evaluator_7
variable: variable_5    PICK
expression: (data_node_4 * data_node_5)    EDIT
context: context_5    PICK
description:
This is an example of an evaluator.
OK    Cancel    Help

Fig. 60 rule base name: rule_base_5
hypothesis name: hypothesis_3
object: object_2 | attribute_1    PICK
description:
This is an example of a hypothesis.
OK    Cancel    Help

PICK objects:
object_1
object_2
object_3
object_4
object_5
OK  Cancel  Help

OBJECT: object_2
attributes:
attribute_1
attribute_2
attribute_3
attribute_4
OK  Cancel  Help

Fig.62 rule base name: rule_base_4 metarule name: metarule_10 source:
(temp_100_is_high>0.8)    [EDIT]

| target | slot | function |
|--------|------|----------|
| context_5 | value | pwl_1 |
| rule_37 | SF | pwl_2 |
| | | |
| | | |

[ADD]  [MOVE]
[DELETE]  [CLEAR]

counter: 10 context: normal    [PICK]

description:
This is an example of a metarule.

[OK]    [Cancel]    [Help]

Fig. 63 rule base name: rule_base_5

PWL name: pwl_4

X-Y list editor

| X | Y |
|---|---|
| −4.6 | −1.0 |
| −3.75 | −0.6 |
| −0.8 | −0.14 |
| 0.3 | 0.0 |
| 1.5 | 0.2 |
| 6.9 | 1.0 |

ADD  MODIFY

DELETE

X: 1.5   Y: 0.2 description:

This is an example of a piecewise linear.

OK   Cancel   Help

Fig.64

| rule base name: rule_base_4 | rule name: rule_100 evidence:
(temp_100>650.0)   EDIT hypothesis list:
vessel_100_is_hot
stage_1_alert

ADD   MOVE
DELETE   CLEAR action list:
assign int_rec 25.0
put_bb vessel_100_state

ADD   MOVE
DELETE   CLEAR alpha: 0.5          SF: 1.0
beta: -0.5          NF: 0.0 context: normal     PICK description:
This is an example of a rule.

OK     Cancel     Help

Fig. 70

| Case | Live | Score |
|---|---|---|
| String_00 | String_01 | Score_1 |
| String_10 | String_11 | Score_2 |
| String_20 | String_21 | Score_3 |
| ⋮ | ⋮ | ⋮ |
| String_n0 | String_n1 | Score_n |

[Symbol] [Return]

Frame Name: Frame_Name_1

Symbol
Modify
Add
Delete

Fig. 71

Case String: String_10
Live String: String_11
Score: 0.68
[OK]  [Cancel]

Fig. 72

[Actions] [Return]

| Score | Actions |
|---|---|
| Score_1 | Actions_1 |
| Score_2 | Actions_2 |
| Score_3 | Actions_3 |
| ⋮ | ⋮ |
| Score_n | Actions_n |

Frame Name: Frame_Name_1

Actions
Modify
Add
Delete

Fig.76

| Value | Return |

Value_1
Value_2
Value_3
⋮
Value_n

Value
Modify
Add
Delete

Data Source Name: Data_Source_4

Fig.77

Type: [        ]  PICK
Value: [        ]
Timestamp: [        ]
Weight: [        ]
Operator: [        ]  PICK
Operator Parameters:
[  ][  ][  ][  ][  ]

Data Source Name: Data_Source_3

| OK |     | Cancel |

Fig.86 knowledge source name: rule_base_6

| source | value |

Check  Send  PICK  Close

Fig.87 application name: application 3 test mode:  ● SYSTEM    ○ KNOWLEDGE SOURCE
data source: input_data.dat   name:

Set Options

TEST STATUS:  ● RUNNING
              ○ STOPPED
              ○ ERROR

Start  Stop  Exit  Help

Fig.88 application name: application_2

| knowledge source | status |
|---|---|
| rule_base_1 | ENABLED |
| rule_base_2 | DISABLED |
| rule_base_3 | ENABLED |
| case_base_1 | ENABLED |
| case_base_2 | ENABLED |
| case_base_3 | ENABLED |

[Enable] [Disable]  [OK] [Cancel]

Fig.89 test mode options use last knowledge source to test? [yes] [no]

output filename: ____
data source: ____  [PICK] → Manual / File / Real-Time
time factor: ____ knowledge source test mode: [ks only] [ks+control]

prompt to verify test configuration? [yes] [no]

[OK]  [Cancel]  [Help]

ARTIFICIAL INTELLIGENCE SOFTWARE SHELL FOR PLANT OPERATION SIMULATION

This application is related to U.S. patent application Ser. No. 07/994,664, "Case-Based Knowledge Source for Artifical Intelligence Software Shell", filed Dec. 22, 1992, related to U.S. patent application Ser. No. 07/994,668, "Control Processed for Artifical Intelligence Software Shell", filed Dec. 12, 1992, and related to U.S. patent application Ser. No. 02/000,172, "Interruptibility Priority Control Scheme for Artifical Intelligence Software Shell", filed Jan. 5, 1993.

CROSS REFERENCE TO RELATED PATENT APPLICATION

FIELD OF THE INVENTION

The present invention relates to manufacturing plant operation simulation and, more particularly, to an artificial intelligence software package for plant operation simulation.

BACKGROUND OF THE INVENTION

Factory and processing plant environments are so diverse that they are difficult to describe in specific terms. Many difficulties are encountered in trying to understand plant operation in a general way because of this diversity. There do exist, however, in the field of manufacturing, some common operational characteristics that a factory or processing plant should possess for efficiency purposes. In particular, it has become increasingly desirable for a plant to be operated in an optimal manner with respect to material resources, human resources and time. Areas of focus, in this regard, include the utilization of sound engineering principals, economic planning and safety.

Simulation modules of plant operation, which incorporate specific knowledge of plant operation, aid in implementing such principals in practice. Because of the complexity of most plant environments, however, experts such as manufacturing engineers only have knowledge limited to the particular areas of the plant domain within which they work. This knowledge may exist in different forms ranging from analytical models to heuristics. Because of the incompatibility of the forms of knowledge, it is very difficult to incorporate the knowledge in a complete plant model.

The application of computer technology in the plant environment is commonplace. In all areas of production, one can find computers used for a variety of tasks from control of equipment to data logging. One particular area that is growing is the use of computers to implement knowledge-based systems, or expert systems, in the plant domain to aid in achieving plant operation efficiency. A knowledge-based system contains a representation of knowledge about some aspect of the plant operation, and it provides diagnoses or recommendations by using some form of logical reasoning or heuristics to process the knowledge. The systems represent a distinct use of computers beyond numerically-based applications. Attempts have been made to create a knowledge-based system with which one can combine the power of the computer with the expertise of plant operators to yield a tool that can assist in the operation of the plant, and provide diagnostic information that can be used to monitor the plant and its resources. Because a plant may have many different knowledge sources and expert systems, a method of integration would allow interaction among different systems and would permit broader issues of plant operation to be incorporated within the computation framework. Because of the different forms of knowledge sources and expert systems, such a method of integration has not been achieved to model complete plant operation. In addition, because every plant differs somewhat in specific areas, a system has not been realized which possesses functional modules in an overall structure sufficiently broad to be useful in diverse plant environments.

In order to achieve such a system, it is important to model characteristics of every plant that are common. One such characteristic common to every plant is that in some complex way, inputs (raw materials) are processed to produce outputs (finished products). Another common aspect is that all plants involve processing over time. Unfortunately, a complete analytical description of a plant involving full time dependencies is impractical, if not impossible. Information concerning a plant operation is typically incomplete and fragmentary. Abundant information relating to plant operation, however, may exist, but in order to create a system, it must be gathered and organized into such a system. This has not been done successfully in the past with knowledge-based systems.

Accordingly, a general object of the present invention is to provide a knowledge-based system which possesses functional modules in an overall structure sufficiently broad to be useful in diverse plant environments.

Another object of the present invention is to provide a knowledge-based system which can combine the power of the computer with expertise of plant operators to yield a tool that can provide diagnostic information and monitor operation of the plant.

SUMMARY OF THE INVENTION

To accomplish the foregoing and other objects, features and advantages of the invention, there is provided an artificial intelligence software shell for plant operation simulation which includes a blackboard module including a database having objects representing plant elements and concepts. At least one knowledge source module including an artificial intelligence operation scheme, in communication with the blackboard module, operates on specific predefined blackboard objects. A user interface module, in communication with the blackboard module, enables the user to view blackboard status information. A control module, in communication with the blackboard module and the at least one knowledge source module, receives input data and controls operation of the at least one knowledge source.

The control module includes an event detector module and an activation/agenda manager module. The event detector module, in communication with the user interface module, determines when the at least one knowledge source should execute. The activation/agenda manager module, in communication with the at least one knowledge source module and the event detector module, executes the at least one knowledge source module in accordance with a predetermined knowledge source priority scheme.

In a preferred embodiment of the present invention, the at least one knowledge source module includes a rule-base knowledge source module and/or a case-based knowledge source module. The rule-based knowledge source module has a forward-chaining belief propagation scheme including rules in if-then-else form with associated levels of belief. The case-based knowledge source module has a data comparison scheme including predefined patterns and conditions, whereupon execution of the case-based knowledge source, the conditions are inferred to be true if a certain level of closeness is found between the received data and the patterns.

BRIEF DESCRIPTION OF THE DRAWINGS

Numerous other objects, features and advantages of the invention should now become apparent to those skilled in the art upon a reading of the following detailed description taken in conjunction with the accompanying drawings, in which:

FIG. 8 is a logic list of event detector software;

FIG. 9 is a list of activation/agenda manager logic flow;

FIG. 10 is a diagram of a rule network example;

FIG. 11 is a diagram of rule-based node structures;

FIG. 12 is a diagram of rule structures;

FIG. 13 is a diagram of rule structures;

FIG. 14 is a list of rule-based knowledge source logic flow

FIG. 15 is a list of formulas for combining evidence with rule belief;

FIG. 20 is a list of data message type codes;

FIG. 21 is a list of control message type codes;

FIG. 22 is a list of message type codes;

FIG. 23 is a list of a particular message format;

FIG. 24 is a list of a particular message format;

FIG. 25 is a list of a particular message format;

FIG. 26 is a list of a particular message format;

FIG. 27 is a list of a system file format;

FIG. 28 is a list of a blackboard structure description file format;

FIG. 29A, 29B and 29C are a list of a rule-based description file format;

FIG. 30A and 30B are a list of a case-based description file format;

FIG. 31 is a list of an input data file format;

FIG. 32 is a list of a log file format;

FIG. 33 is a list of a diagnostic file format;

FIG. 34 is a list of a blackboard status file format;

FIG. 37 is a list of a blackboard object structure;

FIG. 38 is a list of a link object structure;

FIG. 43 is a detailed system block diagram;

FIG. 51 is a diagram of an object/attribute/value display;

FIG. 52 is a diagram of a value editor window;

FIG. 53 is a diagram of a top level control editor window;

FIG. 54 is a diagram of a system process display;

FIG. 57 is a diagram of a context editor window;

FIG. 58 is a diagram of a data node editor window;

FIG. 59 is a diagram of an evaluator editor window;

FIG. 60 is a diagram of a hypothesis editor window;

FIG. 62 is a diagram of a metarule editor window;

FIG. 63 is a diagram of a piece wise linear editor window;

FIG. 64 is a diagram of a rule editor window;

FIG. 70 is a diagram of a symbol table display;

FIG. 71 is a diagram of a symbol display;

FIG. 72 is a diagram of a case actions display;

FIG. 76 is a diagram of a case data display;

FIG. 77 is a diagram of a case datum display;

FIG. 86 is a diagram of a manual input data entry window;

FIG. 87 is a diagram of a test operation control window;

FIG. 88 is a diagram of a system test knowledge source configuration window;

FIG. 89 is a diagram of a test mode options window;

DETAILED DESCRIPTION

I. Introduction

The present invention provides an artificial intelligence software shell in which a blackboard database includes objects representing plant items. Expert system knowledge sources, in accordance with a temporal priority scheme, execute and modify specific objects. A user can view the status of the objects to diagnose and monitor plant operation. An application developer (plant expert for a particular application) must develop the objects and knowledge-based rules before the system can be used.

The domain shell can be described from two viewpoints. One way to look at the domain shell's organization is from the knowledge-based system functional view. For the domain shell this is a description of the blackboard architecture, its components and their interaction. This is the internal view of the system. The other view is from the user's standpoint, that is, how does the system appear to the user as he interacts with it or uses it. The details of the interfaces and the operating sequences that occur are the external system view. While these representations are different, they are strongly related to each other.

Figure 1:
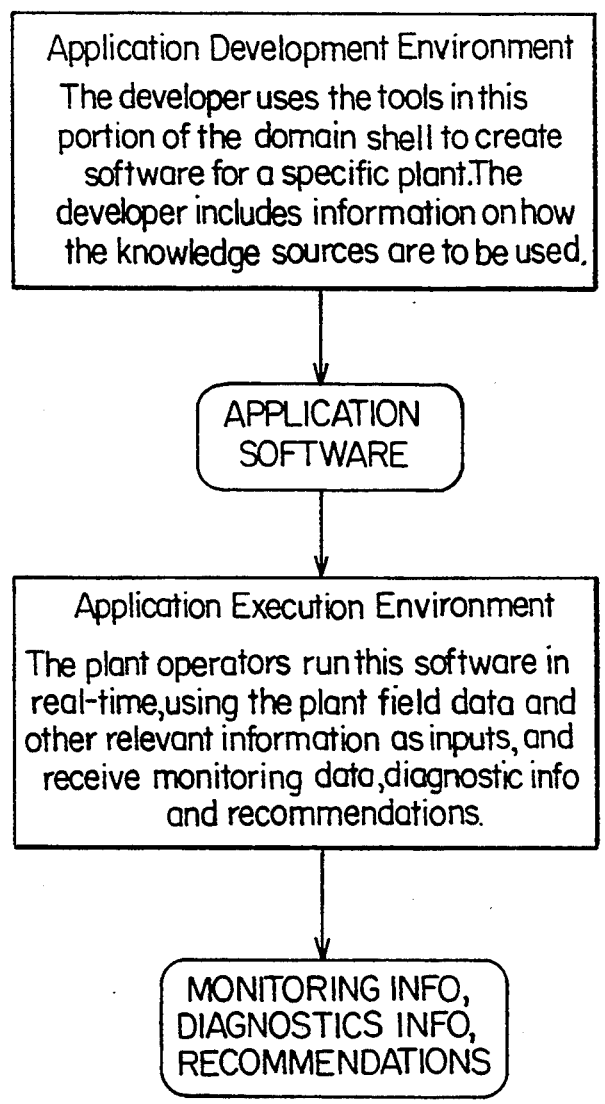
FIG. 1 is a block diagram of the overall system environment of the present invention.

The overall system environment diagram is given in FIG. 1. The domain shell will consist of an environment in which a specific application program can be developed. This is known as the application development environment. It has the functions that are used by the application developer to enter, modify and test the structure for the application. These structures form an instantiation of the blackboard approach, including a control framework. The knowledge sources are created and entered at this stage as well. The domain shell described in this document will contain the tools and framework facilitating the creation of applications for any plant environment. An application developer would benefit from the existence of structures common to his particular plant type. If structures representing equipment types and associated icons were already features of the shell, the developer could use them without having to create them himself. The existence of such tools would also have the benefit of standardizing the graphical appearance of the running system. Clearly, there are types of plants (such as steel mills or food processing plants) which would benefit from having a set of structures that are specific to the plant type (such as icons of a roller press for the steel mill). As a first step, the developer could create a steel mill domain shell by adding to the domain shell the set of structures that would be useful to the application developer in a particular steel mill. Then the application developer in any steel mill could use the created structures, thus easing the burden of development. The increase in value of the plant type specific domain shell suggests that the level of customization of the domain shell be carefully considered to maximize the shell's utility.

After the application development is completed and tested, it is installed on-line in the plant environment. The system then enters the application execution environment. Here the users are the plant personnel that interact with the system to receive the system recommendations and take appropriate action.

Figure 2:
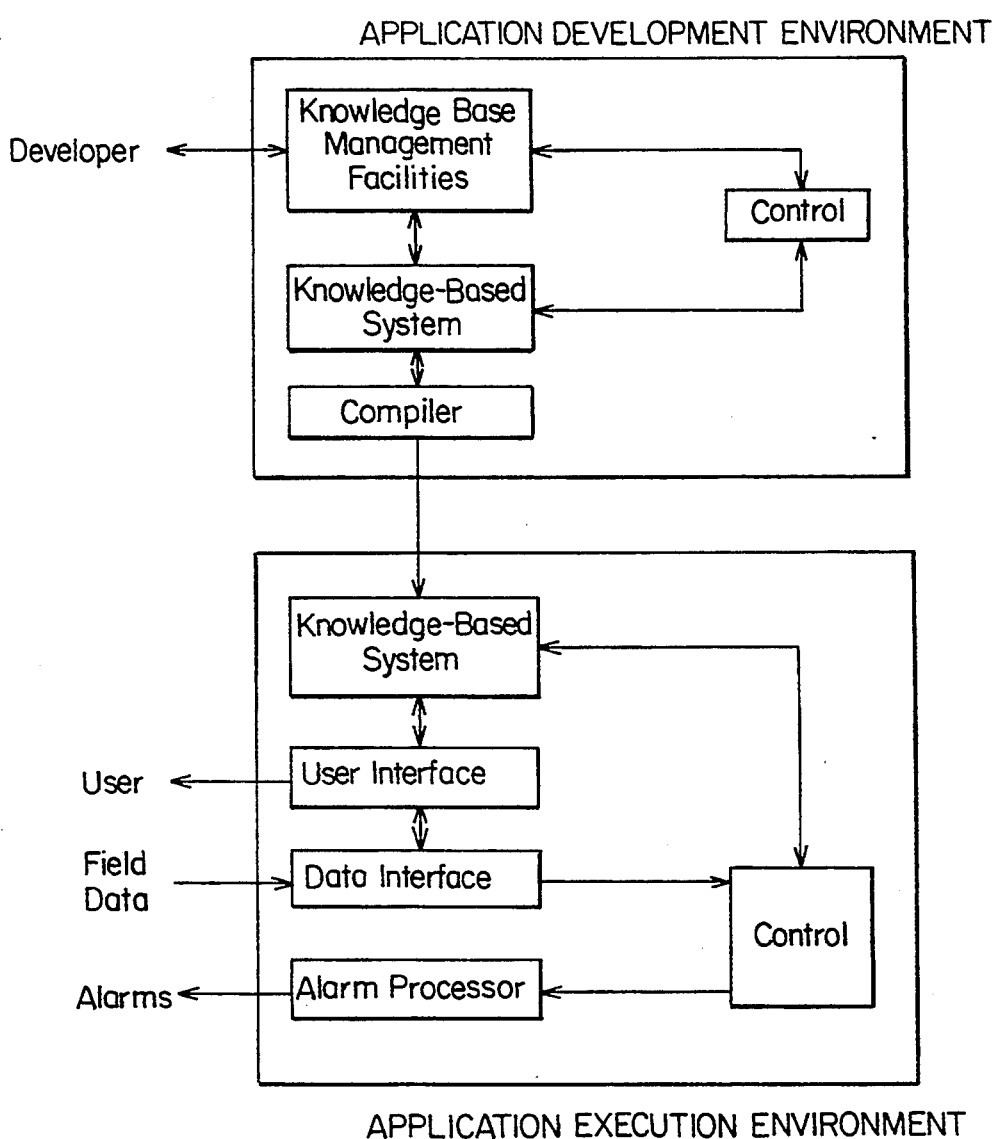
FIG. 2 is a detailed block diagram of the overall system environment of FIG. 1.

FIG. 2 is a more detailed view of the two environments. This shows the distinctions in the two environments. Note that the knowledge-based system framework resides in both environments. The link between these two systems is the compiler, which translates the entered information into a format suitable for real-time operation. Note that the "compiler" is included as part of the APP. DEV. ENV. The knowledge-based system in the development environment is the system that is created by the developer, represented in a form that allows easy editing, manipulating and testing, while the knowledge-based system in the execution environment represents the runtime version of the system, having been modified for compactness and efficient execution. The domain shell specified here can be described in detail by examining these two environments.

The end users are the plant personnel who will use the system in the real-time plant environment. This view of the system emphasizes the details of the interface to the users, and describes the features that include the presentation of information, and the nature of the types of inputs that the user might enter.

The domain shell's architecture will be visible to the end user mainly in the manner of presentation of information. This includes the use of a windowing environment that allows the user access to different levels and types of information. The window environment should be held consistent so that all users maintain familiarity with the mechanics of operation within all parts of a particular application and also across applications.

The system will allow the end user to view the reasoning processes and to be provided with explanations of what the system is doing and why. It is important to maintain the explanation at a simple level, so that the plant operator is not overwhelmed by too much information when faced with the need to make a time-critical decision. However, the generality of the shell will allow the application developer to alter the runtime characteristics to optimize the appearance for the specific application.

Another major aspect of the external view is the ability of the user to direct the system to focus attention to certain aspects of plant operation. One example of this would be informing the system of aspects of planning so that the monitoring system can appropriately adjust its operation. This would occur, for example, if the operator knew of a scheduled shutdown of a part of the plant operation. The application will have the means of receiving this information and acting appropriately. Note that this type of action would have been "programmed" into the system during the application development phase. As implemented, it is only possible to specify this type of information by developing an external process (to the shell) that receives and sends blackboard data that specifies this type of information.

One final aspect of the external view is the presentation of conclusions and recommendations produced by the system. Since these are time-critical, appropriate methods of presentation will be used. Once again, the domain shell will provide a selection of presentation methods; it will be the task of the application developer to choose the appropriate presentation.

After the application has been created for a particular plant environment, the system is then installed with appropriate interfaces established. The system is then set into operation in the runtime environment. This will involve the blackboard framework in operation with the contributing knowledge sources.

To facilitate the creation of an application, the domain shell will provide a set of what could be considered programmer tools. Editors to create and modify the blackboard structures will be implemented. These editors will guide the user in the development phase by ensuring that the structures are viable. Compilers will translate the information entered by the developer into a form suitable for execution in real-time. Development diagnostic tools will give the developer a means of checking the validity of his work before execution.

Because of the general nature of the domain shell, it is impossible to state the exact sequential nature of operation. This will be determined by the characteristics of the application as designed by its developer.

The internal view involves the description of the blackboard approach. This is the domain of the application developer, who must apply the tools in the domain shell to create the specific application. The internal structure is given in FIG. 3.

The blackboard structure contains data that is of relevance to one or more knowledge sources. Basically, it is a structure representing the state of the system. The developer creates a blackboard structure by organizing a hierarchy of information slots at different levels. Simply put, the highest level represents the broadest view of the plant, and each level beneath is a successively more detailed representation of a part of the plant. Note that the structure as created in the development environment must be augmented by actual and simulated data that is measured or derived during runtime.

The hierarchy of the blackboard is basically a partitioning of the understanding of the plant on different levels. For the plant environment, the partition that is most evident is the spatial and structural arrangement of equipment and processing areas in the factory itself. One can see the plant on a very abstract level, where raw materials enter a building at one end and finished products emerge at the other end. At lower levels, the processing can be seen to involve a series of steps or subprocesses, each of which can be represented on the blackboard. On the blackboard, parameters and variables of interest would be placed. These would be the parameters used by one or more of the knowledge sources.

The blackboard will hold this information. The domain shell will provide the blackboard structure components, and give the application developer the means of creating a blackboard framework specific to the plant. This framework will represent a model of the plant as the system understands it.

The knowledge sources are the particular segments which contain some form of reasoning about some part of the information in the model. Each knowledge source has its own domain, that is, the parts of the blackboard that it has knowledge about. A knowledge source interacts with the blackboard by initially recognizing that it "sees" something on the blackboard of interest. It then receives permission to alter some other section of the blackboard based on conclusions that it has reached. In this way, the state of the system (as seen on the blackboard) is updated and the overall system acts appropriately on the information in the blackboard. In the present application, however, the control process does the recognizing.

Each knowledge source in the blackboard system is responsible for recognizing the things that are important to it. In other words, each source should contain reasonable knowledge about its own domain of interest. In the domain shell, the application developer must have the information needed to integrate the knowledge sources into the system, and ensure that the knowledge source can interact with the blackboard. The knowledge source should provide the blackboard system with some indication of the urgency of its information.

The value of the blackboard approach is that different knowledge sources can apply their reasoning to overlapping parts of the blackboard. While the ability to overlap knowledge source domains introduces complexity, it is more valuable because it allows knowledge sources to fail without totally crippling the system. All major engineering systems provide for safety margins and backups, and the blackboard approach not only allows it but in effect encourages it by making sure that information is available to the knowledge sources that need it.

The simulator is a collection of mathematical and functional tools that can be used by the system. These tools include algebraic, difference and differential manipulations. These tools are not implemented as a distinct entity, although these tools do exist in parts of the domain shell.

The control is perhaps the most critical part of the blackboard approach. The control oversees the actual operation of the system. It is responsible for determining which knowledge source should access the blackboard, as well as prioritizing the operations of the knowledge sources. This portion of the blackboard structure will require the most thought, but will yield the most powerful performance if a well-designed control is developed.

A critical portion of the application development process will be determining an appropriate control hierarchy for the different knowledge sources. Even if the knowledge sources don't interact (their domains are mutually exclusive), the real-time nature of the domain shell requires that the system recognize the most urgent request first. For a complex application, different knowledge sources may have relevant information that could conflict. Thus, while the domain shell described here will provide a general set of tools for the application developer, it is vital that he develop a coherent problem solving strategy.

Because of the expected diversity of intended applications in the plant environment, the domain shell requires flexibility in knowledge representation, as well as the capability to adjust operation to the specific application. By use of the blackboard architecture, the desired flexibility is achieved while maintaining a foundation of standardized structure that can be the basis for expansion.

Overall System Design Description

This section describes the design of the shell at the operational level. It briefly discusses the system design concept and gives the modular decomposition of the shell. The system design is based on satisfying the requirements given elsewhere in this document.

Figure 4:
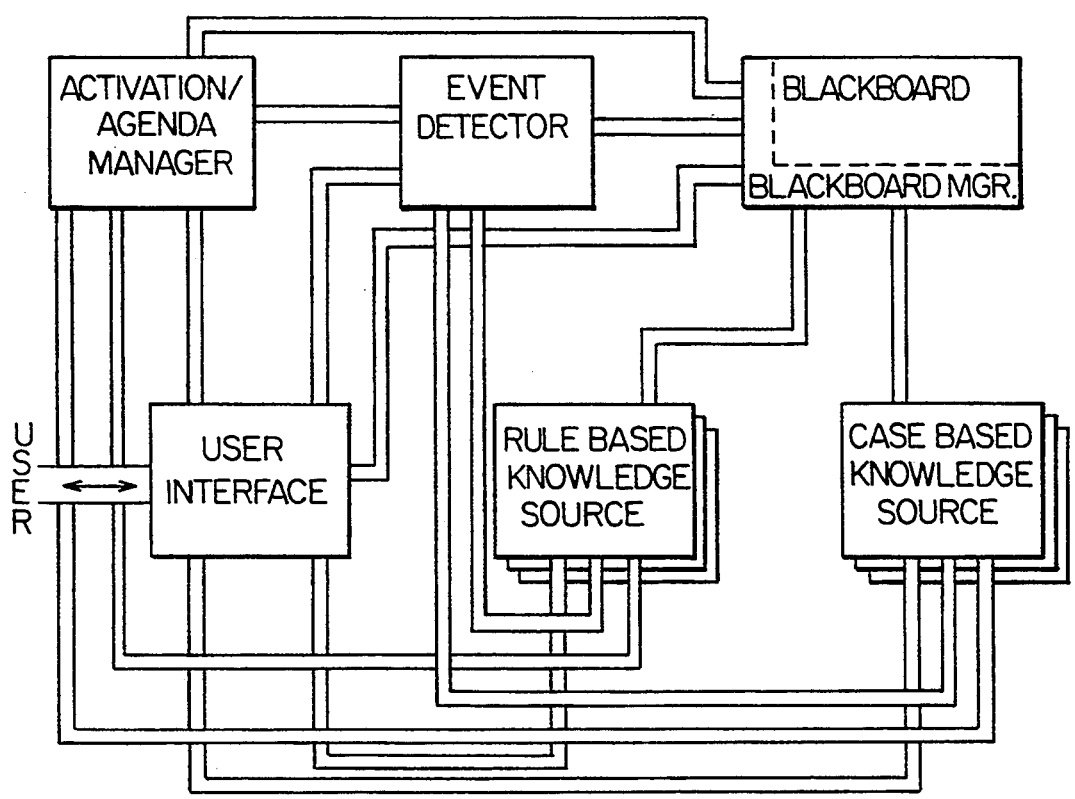
FIG. 4 is an overall system block diagram.

A block diagram view of the domain shell is shown in FIG. 4. The system is divided into the following modules: the blackboard, the event detector, the activation-/agenda manager, the rule-based knowledge source, the case-based knowledge source, and the user interface. Each of these modules represents a distinct UNIX process. Within the context of a specific application, there will exist one blackboard process, one event detector process, one activation/agenda manager process, and one user interface process. In addition, there must be at least one knowledge source process; multiple knowledge source processes are permitted.

Prior to the use of the shell, the user creates all the required input files. The required files are: the Blackboard Structure Description File (BSDF), one Rule-Base Description File (RBDF) for each rule base knowledge source, one Case Description File (CDF) for each case based knowledge source, and at least one Input Data File (IDF). The prototype software does not have editors; the app. developer creates these files outside of the shell.

In one embodiment, the shell will internally generate any description files.

While the shell checks the files for syntactical correctness, allowing the user to correct errors through a text editor, the shell does not scan the files for higher level errors or inconsistencies. Therefore, the user must ensure that the files contain consistent information or else the shell will generate unexpected results.

The shell is run by typing the program's name at the UNIX shell prompt, together with the system file name. The system (application) file name identifies a file that contains a list of files defining the structure of a particular application. The set of files determines the structure of the blackboard application; the BSDF and all RBDF's and CDF's related to the blackboard belong to the application. There is sufficient flexibility here to permit, for example, the creation of similar applications with perhaps one knowledge source removed. This allows the evaluation of the usefulness of a particular knowledge source to the application being tested.

After the system file has been given to the shell, the shell then begins loading the information. The shell starts the appropriate processes and supplies them with the name(s) of the appropriate file(s). This would include the blackboard process, the event detector process, the activation/agenda manager process, and the rule-based and case-based knowledge source processes. After all of the input files have been loaded, the shell is ready to initiate a session run of the application. In one embodiment, it asks the user to set the run parameters and specify the Input Data File (IDF). In another embodiment, IDF's are not used in the run-time environment. At this point the session run begins.

A session run of an application consists of the shell receiving input data, and taking appropriate action based on the data. The determination of appropriate action is the responsibility of the event detector process. Data values are updated on the blackboard and test conditions are evaluated to determine whether a knowledge source should be fired. If a knowledge source should be fired, then its name is placed on a First-In-First-Out (FIFO) queue to await execution. The present invention uses more sophisticated control including interruptibility.

The activation/agenda manager controls the execution sequence of the knowledge sources. It ensures that only one knowledge source is executed at a time.

Each knowledge source process used by the application contains appropriate structures relevant to its domain of expertise. During the shell's operation, each knowledge source pauses until activated by the activation/agenda manager. Upon awakening, the knowledge source executes its routines in an attempt to generate a diagnosis. When a knowledge source makes a diagnosis, it is written into a diagnostics file.

As a knowledge source executes, it requests data from the blackboard directly. Thus, all knowledge sources have direct read privileges with the blackboard. However, data updates to the blackboard generated by a knowledge source are directed through the event detector. The event detector can then scan the data to determine if an event has occurred.

The design decision to direct data updates through the event detector is an important one. The alternative is to allow each knowledge source to write directly to the blackboard. The advantage of direct writing is the efficiency of writing to the blackboard. The disadvantage is that the event detector must then continuously search the blackboard to determine if updated data is present. The shell's design, with indirect data updates from the knowledge sources, makes uniform all updates to the blackboard, whether from sensors or from knowledge sources. Conceptually, this is a simplification for the event detector, which has other difficult tasks to perform. If the event detector had to search the blackboard continuously, it would represent a fundamental conceptual shift in the blackboard operation from an asynchronous, data-driven process (as originally envisioned) to a mixed combination of asynchronous processes and systematic searches.

The sequence of reading input data, firing knowledge sources and generating diagnoses continues until the user specifies to the shell to stop. At this point, an ordered list of the diagnoses, the Diagnostics File (DF), is generated.

Description of Processes

This section describes in more detail each of the processes involved in the execution of the shell. Each process is described in terms of four entities: a brief summary of its purpose, the process name, data structures, and the logical flow of the program. The data structures and logical flow entities are augmented by programming guidelines wherever necessary. The input/output relationships are described hereinafter. It should be noted that the level of detail in this section is such as to guarantee proper operation of the overall software. Thus, programmers are constrained by the information contained here. For example, the data structures described in subsequent sections are implemented as described here; programmers are free to use any other structures that also might be required for the proper operation of a module.

The Blackboard

Figures 5, 6:
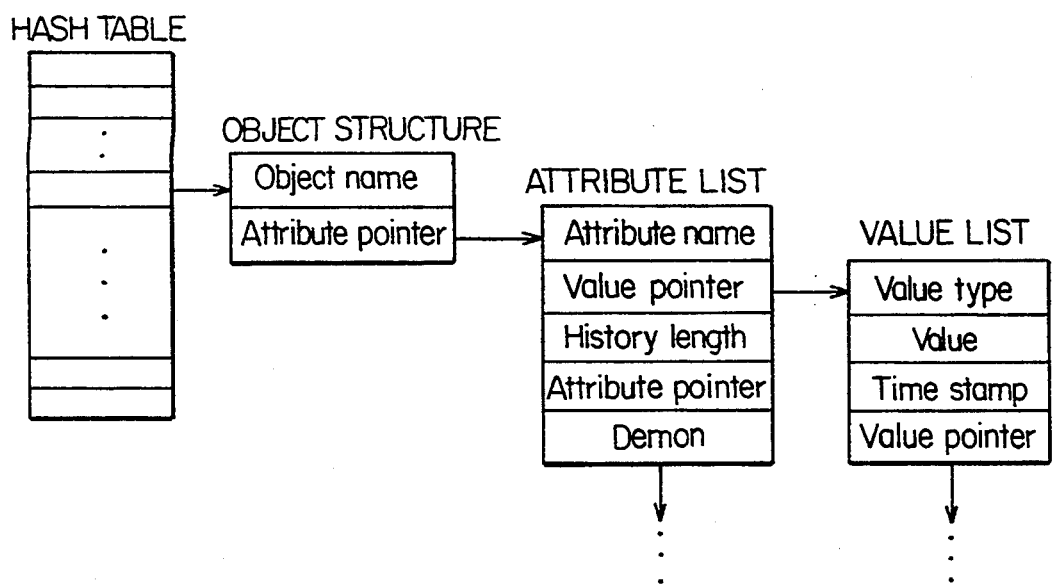
FIG. 5 is a block diagram of a blackboard data structure.
FIG. 6 is a list of value type codes for the blackboard.

The blackboard process incorporates the blackboard objects and the methods necessary to manipulate the objects. Process name: blackboard Data structures: FIG. 5 shows the basic organization of the data structures which represent the blackboard objects. The structure on the left is an array which implements a hash table. On the right, linked lists store the attribute/value pairs.

Programming guidelines:

The hash table is implemented using Brent's variation of the open addressing with double hashing algorithm. The size of the hash table starts out at a large number, but not excessive. For example, 503. If the number of objects causes the table loading factor to exceed approximately 85%, a new, larger table is allocated, and the data is rehashed. The maximum hash table size is 43,391 or larger.

The hash table key is the object name, and the table entry is a pointer to an object structure, which also contains the name of the object (pointer to a string).

Upon retrieval, the key and the name string are always compared. Accessing an object/attribute is also possible by using the index of the object in the hash array, and the index of the attribute in the list. This provides a fast access mechanism during runtime, if such indices are known by the entities requesting the access.

Attribute structures include a demon slot, optionally referencing a function. If present, the function is executed each time the attribute receives new value(s).

Value structures contain a "type" slot. FIG. 6 shows the type codes.

Value structures contain a "time stamp" slot, in seconds. Insertion in the list is such that most recent values are first.

Insertion in the value list is done such that there is always one, and only one value older than current the time stamp minus the history length. All other, older values are discarded.

Logic flow:

The blackboard manager performs several functions. First, after the process is started, it creates the blackboard structures from information contained in the file whose name is passed on to it. Then, it receives messages which request getting or putting data on the blackboard. Each message is acknowledged by one of the following: a data message, if a successful "get" took place, an ACK message, if a successful "put" took place, or a NACK message, if an error is found. A STOP message from the user interface tells the software to write out the blackboard structures and exit. A RESET message causes the blackboard to clear all its data contents, but not its structure of objects/attributes. This module can be written in a structured programming language such as ANSI C.

The Event Detector

This process receives data from external sources; it also receives the data that knowledge sources want to write on the blackboard. All incoming data is sent to the blackboard process. Every piece of incoming data is also checked for potential detection of an event. An event may be triggered by the value of data, i.e., by satisfying an expression, or by the simple arrival of a data point, regardless of its value. Timer based events are handled by the activation/agenda manager process. A list of knowledge sources associated with detected events is sent to the activation/agenda manager process.

Process name: event detector

Figure 7:
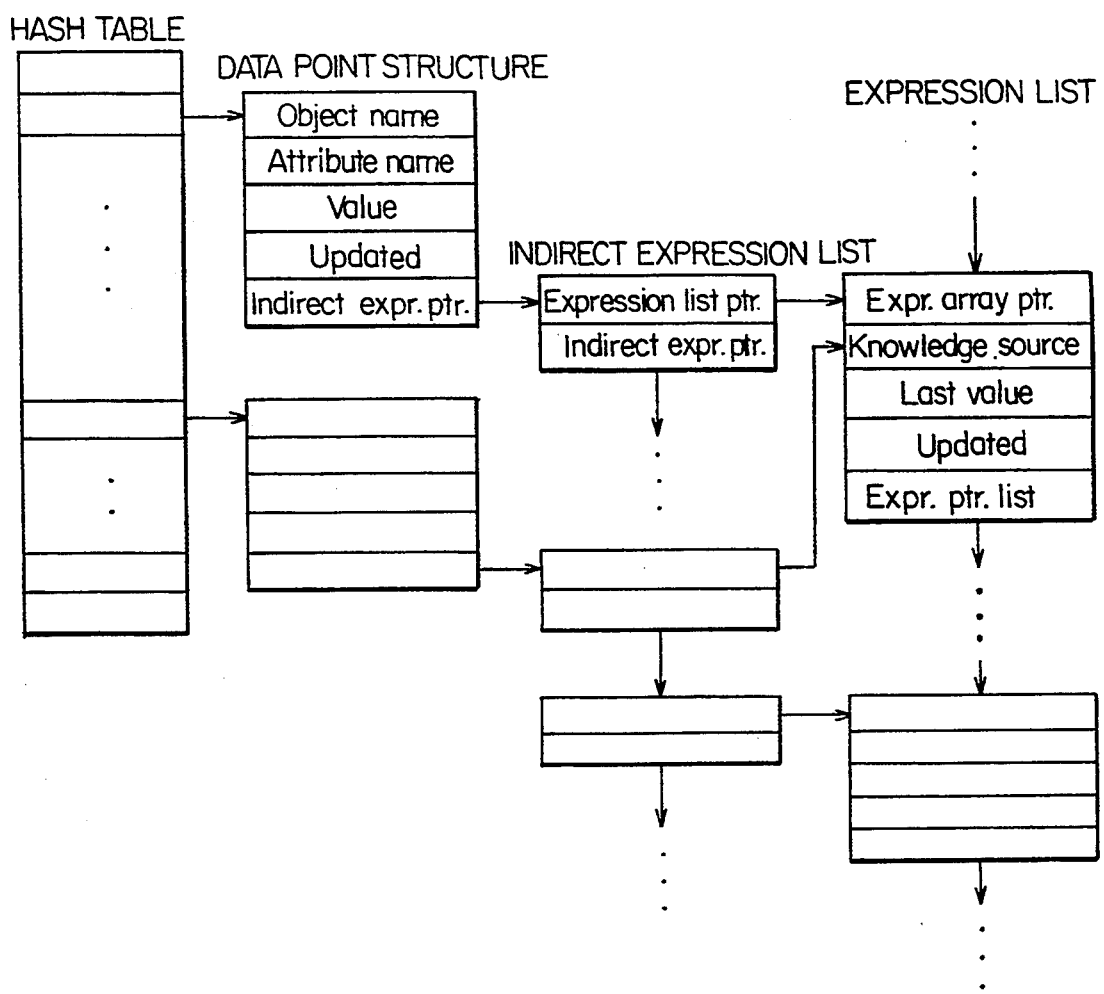
FIG. 7 is a block diagram of event detector data structures.

Data structures: FIG. 7 shows the data structures required by this process. On the left, an array implements a hash table. Each data source, be it sensor (external) data, or knowledge source generated, has an entry in the hash table, which points to a data point structure. Each data point then has an associated indirect expression list. The elements of this list point to entries in the expression list, which in turn, has pointers to the expression arrays.

Programming guidelines:

The hash table is implemented using a simple, double hashing algorithm. Since the event detector is a potential bottle neck, the highest possible performance should be sought. The separate chaining algorithm, perhaps with ordered lists, or even Brent's variation are alternative basing algorithms that could be used.

The size of the hash table is expected to be smaller than the blackboard table. It also starts at 503, and more space is allocated if the loading factor exceeds 90%.

The hash table key is the concatenation of the object and attribute names. The table entries point to data structures which also contain the object/attribute names. The names are always compared during retrieval.

Logic flow: FIG. 8 shows a simplified representation of the program's logic. The initialize part is executed when the process is started: it creates the structures shown in FIG. 7, by loading and parsing the event expression definitions from the knowledge source description files whose names are passed to it as arguments. The remainder of the program is driven by the receiving of messages.

Programming guidelines:

All incoming data messages are acknowledged by a NACK message if a syntax error is found, or by forwarding the blackboard acknowledgment message back to the original sender otherwise.

An expression evaluator is described elsewhere. Event defining expressions are similar to evidence expressions, hence the same software is used.

The operators used in expressions are essentially the same as operators used elsewhere in the system. Thus, in order to differentiate between newly arrived values, and older values, available from the blackboard, the new operator is required to precede object/attributes which trigger on arrival of new data.

If there are no expressions associated with a knowledge source, such knowledge source will only fire if one of its preconditions include the every operator. This module can be written in C++, since it has object-oriented features.

The Activation/Agenda Manager

This process starts the execution of a knowledge source. The knowledge sources activated by the event detector are started immediately, if and only if their preconditions evaluate to TRUE. If no preconditions are defined for a knowledge source, it will fire at the next opportunity. A priority scheme determines execution order. A separate queue is kept for knowledge sources that execute periodically.

Process name: a manager

Data structures: There are three basic data structures required by this process: a priority scheme for activation of event driven knowledge sources, a time-based queue for periodic knowledge sources, and a knowledge source/precondition expression structure for checking preconditions. The latter is conceptually identical to the event detector data structures, as shown in FIG. 7, with the following differences: a hash table is not required at this time, a simple array of size 100 will suffice; an expression list for each knowledge source is pointed to by the array elements; hence, the object/attribute structures and the indirect expression lists are not needed; the "knowledge source" and "updated" slots in the expression list structures are also not needed.

Logic flow: Although it is basically one process, the software that implements the activation/agenda manager is best thought of as two interrupt driven programs. One reacts to the arrival of a message from the event detector, as shown at the top of FIG. 9. The other reacts to the passing of time, as shown at the bottom of FIG. 9.

Programming note: Although this process is best thought of as two interrupt driven programs, the actual implementation approach is at the implementer's discretion. This module can be written in C++.

Rule Based Knowledge Sources

This process implements a basic data-driven (forward chaining) inference mechanism operating on a set of IF ... THEN ... rules, with propagation of belief.

Process name: rule_based/Data structures: The basic data structure is the rule network (tree). An example is shown in FIG. 10. The network nodes exist in three fundamental layers: the input layer, consisting of data nodes, the intermediate layer, consisting of hypothesis, variable and constant nodes, and the output layer, consisting of malfunction nodes. Their structures are shown in FIG. 11. The data and malfunction nodes must have blackboard equivalents. The other node types (hypotheses, variables and constants) may, but are not required to. The supporting- and supported-rules slots contain pointers to structures which describe the way nodes are inter-related. These structures are the rules, and their basic organization is shown in FIG. 12. Also shown in this figure is the structure of meta-rules.

In addition to these structures, FIG. 13 shows the organization of several other entities which are required for the implementation of the features described in the functional specification. Some of these are further discussed. Lastly, a structure is needed to store evidence expressions.

Logic flow: The program first reads the rule base description file and creates the structures described above. Then, it waits for a message. If it is a SETPARAM type message, then the program sets or resets the trace, log and step run parameter, or it changes the value of the global sufficiency and necessity factors, or it changes the values of the global alpha and beta cutoffs. For setting breakpoints, the rule based knowledge source's own user interface is invoked. If the message is a RESET type message, then the program resets itself, in preparation for a new session run. If the message is an ACTIV type message, the program generally follows the steps shown in FIG. 14. The logical flow shown in this figure is greatly simplified. Critical aspects of the software are further elaborated in the following sections.

Evidence Expressions

As shown in FIG. 14, before a rule can fire, certain conditions must be met:
1. The rule's context must evaluate to TRUE,
2. The rule's evidence is available, and
3. The value of the evidence contribution towards the rule's hypothesis must be within the range defined by the alpha and beta cutoff values.

These conditions are dependent on expression evaluation. The general strategy for handling expressions is as follows. An expression is initially specified in a rule base description file using a prefix or infix notation. A few examples:

"if the temperature went from below to above 500 degrees in the past hour":

((time-when (temp>500))<3600)

"if the change in pressure over the last 2 hours was less than 0.5":

(<(trend pres 7200) 0.5)

"if hypothesis #1 is TRUE AND at least one of the following is TRUE: hypothesis #2 is TRUE OR hypothesis #3 is TRUE OR hypothesis #4 is FALSE":

(hyp1 and (or hyp2 hyp3 (not hyp4)))

The text is stored as a string in the evidence-text slot of the rule, for simple display purposes. It is also parsed into an expression-array. The structure of this array is a strict prefix, recursive representation of the expression, where the operators have been replaced by their corresponding tokens (or pointers to functions), and the operands are replaced with pointers to the structures holding the dynamic values, or with the values themselves, if they are static constants.

In the last example, the numbers 2 and 3 indicate the number of operands following the token. A pointer to this array is placed in the evidence-expression slot of the rule. The parser also generates a separate evidence-list containing only the operands which are pointers. This list is used for quick checking of the availability of the evidence.

Runtime evaluation of the expression then consists of recursively calling a simple evaluation function which performs the actual calculation.

The conditions for firing a rule are then checked as follows:
1. Evaluate the rule's context expression. If TRUE (i.e., value evaluates to 1),
2. Check if ALL the evidence components on the evidence-list have been updated. If yes,
3. Evaluate the rule's evidence expression. This returns a confidence level, CF evidence. This value, combined with the rule's sufficiency or necessity (as described in the next section) determine the rule's contribution to the belief in the rule's hypothesis. If the contribution affects the hypothesis MB, and the contribution amount (value) is greater than the alpha cutoff value, OR if it affects the hypothesis MD, and the contribution amount is less than the beta cutoff value, then the rule can fire.

Operands can be of several types:

Value operands evaluate to a number. Value operands can be specified by an actual number, the name of a node, the name of a context, or an expression which itself evaluates to a value. If a name is used, then the value used in calculations depends on the type of structure:

hypothesis and malfunction nodes supply their CF slot value data, variable and constant nodes, and contexts supply the contents of their value slot. CF operands are like value operands, except that the value must be a number between −1.0 and +1.0.

Piece-wise-linear operands are the name of a piece-wise-linear structure, which supplies a list of X-Y pairs for data interpolation.

Operators are also of various types:

Algebraic operators always return numerical values, and all of their arguments are values. A list of these operators is given elsewhere. In addition a current_time operator is provided, which returns the time stamp of the current set of data.

Boolean operators always return a CF value. Their operand types however differ:

fuzzy booleans (and, or, not) require CF type operands.

weighted booleans (weighted-and, weighted-or) require (weight, CF) pairs, where the weight is a number.

comparative booleans (equal, less, greater) take two value arguments, and an optional piece-wise-linear.

If the latter is not specified, the operators return +1 or −1 (TRUE or FALSE). Otherwise, a fuzzy result is calculated by mapping the difference of the two numeric arguments on the x-axis of the piece-wise linear function, and returning the corresponding y-axis value.

Time-based operators always return a numerical value. Their operands are a node name and a value (delta T). The second argument must be an actual numerical value. A list of time based operators is given elsewhere. In addition, two more operators are added: a time value operator, which returns a value from the node's history, and a time stamp operator, which returns the time stamp of a data node (not necessarily the same as current time).

Change-based operators always return a value. The time when operator requires one expression as an argument. When the truth value of the expression goes from FALSE (less than zero) to TRUE (positive value), the time of the transition is recorded. Hence, the expression should be a CF type. The value when operator takes two arguments: a CF expression and a node name. When the expression goes from FALSE to TRUE, the value of the node is remembered. Both of these operators accept an additional argument, used to define the transition from FALSE to TRUE. If this optional argument is missing, the boundary between TRUE and FALSE is the global alpha cutoff value.

Other notes:

When expressions are used as a rule's evidence, they must evaluate to a CF type. In other words, the top level operators must be of boolean type. In all other circumstances (such as meta-rules and calculations stored in variable nodes) there are no restrictions.

All node references in expressions which include time based operators must have corresponding object/attribute entities in the blackboard, where the actual histories are kept. When the reference is in a rule's evidence, then the name of the node should be used; when it is in an event or precondition definition, the object/attribute names have to be used.

Only one change-based operator is allowed per rule.

All time references are in seconds. All time intervals are measured from the current time stamp (not necessarily the same as the current real time).

Some operators have "aliases": add +; and &; diff −; div /; equal =; greater >; less <; not !; or ?; and times *. These operators can be used (either their names, or their aliases) in both infix or prefix notation. All other operators can be used in prefix notation only.

The number of arguments is generally implied by the nature of the operator. Some operators however can take any number of operands: and, or, average, diff, div, max, min, std-dev and times.

Inference Mechanism

Propagation of belief. This is done in three steps:
1. Evaluation of a rule's evidence. This has been discussed in the previous section. Also, see elsewhere, for combining formulas of boolean evidence.
2. Calculating the rule's contribution. Rules have a priori defined confidence levels, named sufficiency and necessity (SF and NF). The table in FIG. 15 gives the complete algorithm. Note: this contribution is used in the determination of the alpha-beta cutoff.
3. Updating a hypothesis' belief. When more than one rule affects a hypothesis, the union probability rule is used: $Belief_i = Belief_{i-1} + Belief_{rule-i} - Belief_{i-1}*Belief_{rule-i}$, where $Belief_i$ is the hypothesis' MB or MD, as indicated in FIG. 15, and $Belief_{rule-i}$ is the contribution of the with rule, as indicated in FIG. 15.

Data nodes. The input into the system is in the value slot of the data nodes. These values are generally converted to beliefs by use of comparative booleans.

Meta-rules. These rules do not propagate belief, but are used to change the context and to modify the importance of rules. The target-list slot of a meta-rule (see FIG. 12) therefore points to context or rule structures. In the first case, the target-slot slot of the meta-rule is assumed to be the value slot of the context structure; in the second case, the SF or NF slots of the target rule must be specified. The source slot of a meta rule contains an expression. The value obtained by its evaluation is passed on as an argument to the optional function slot (a piece-wise-linear function), and the result is placed in the target-slot of the target contexts or rules. If a function slot is not defined, then the result of evaluating the expression is placed directly in the destination (target-slot).

When a meta-rule changes the context, all the rules that have already fired, and whose context changed, are "unfired" (i.e., their effects are removed). The program then re-checks rules that couldn't fire before the context change, for the possibility that they are in context now. Similarly, when a meta-rule changes the SF or NF of a rule, all effects of this rule must be undone, and the rule fired again.

Two observations about meta-rules: first, they can cause infinite loops, due to the un-firing and re-firing process. Thus, each meta-rule has an optional associated counter, which only allows a predefined number of executions of the meta-rule. If a counter is not defined, it is assumed to be 1. Second observation: meta-rules must be used with caution, since they not only are difficult to use conceptually, but they also greatly reduce runtime performance.

Evaluators. Although similar to rules, the purpose of the evaluators is not to propagate belief, but rather to perform calculations. Thus, an evaluator structure (FIG. 13), has a context expression, just like a rule. It's expression slot is evaluated, just like a rule's evidence. The result of this evaluation is then placed in the value slot of the variable whose name is in the variable slot.

Debugging. Eight run parameters can be set:
trace: when set, it causes a detailed descriptive message to be displayed on the screen by each rule, when it fires.
log: exactly like trace, but output goes to a file with the extension ".log"
step: when set, the program stops after each rule firing, and continues only when requested by the user
breakpoints: associated with rules, they cause the program to stop just after the marked rule fired
global SF and NF: they define default values for these two parameters (i.e., if a rule is defined without an SF and/or NF value, then the global defaults are used.)
global ALPHA and BETA: they define default values for these two parameters (i.e., if a rule is defined without an ALPHA and/or BETA value, then the global defaults are used.) The global ALPHA is also used to define the default transition from FALSE to TRUE for change-based operators, if not specified within the expression.

All these parameters, except for breakpoints, can be set and cleared by SETPARAM messages from the user interface. The breakpoints are set by the rule-based knowledge source software, via its own user interface:

User interface. The program's own user interface is invoked in one of two circumstances: when the user wants to set breakpoints, and during runtime, if the step parameter is set, or a breakpoint is encountered. The program's user interface allows the user to perform a minimum amount of browsing through the rule base (e.g., list structures). The system structure shown in FIG. 13 stores the appropriate bookkeeping information for this purpose.

Output. Besides the log files, the program writes a diagnostic file, where the top malfunctions are listed. This output file has the extension ".out"

Actions. Several actions for the right hand side of a rule are provided:

Put value in bb. This action takes one argument, a node name. If the rule having this action fires, the value of the node argument will be sent to the blackboard. Note that a malfunction's value is sent to the blackboard automatically.

Assign. This action takes two arguments, first a variable name, second, a node name. The value of the second argument is placed in the value slot of the variable node.

Show. This action takes no arguments. When the rule fires, information similar to that displayed by the trace parameter is shown on the screen. This action is useful if a rule needs to be monitored, but without stopping the run (as a breakpoint would do), and without displaying information about other parts of the rule base.

Performance. The program will record its starting and stopping times, as well as the number of rules fired and unfited. Blackboard access times are also recorded. This module can be written in C++.

Case Based Knowledge Sources

This process calculates a similarity value for each case stored in its case tables, by comparing each case with the current data.

Process name: case based

Figure 16:
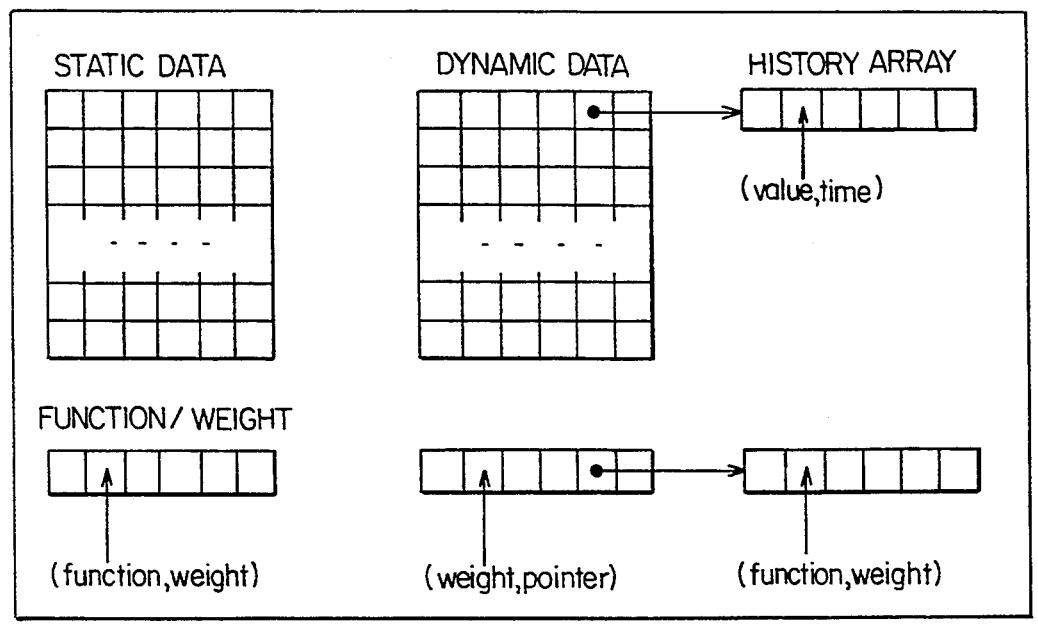
FIG. 16 is a diagram of case-based knowledge source data structures.

Data structures: FIG. 16, shows the information that is represented in a case table. The case-based process represents the data in the table in two separate structures, as shown in FIG. 16: a static data array, and a dynamic data array, for the time-dependent data. The static data array is simply an array of floating point numbers (doubles). The dynamic data array is an array of pointers, where each cell points to a history array. Each cell of the history array, in turn, contains a value/time pair. In addition to the data arrays, two other structures are needed, to store the function/weight information. One such structure corresponds to the static data array, and it is itself an array of function/weight pairs. The other structure corresponds to the dynamic data array, and it consists of weight/pointer pairs. The weights are used for the result of matching the time dependent data; the pointers point to another array, which consists of function/weight pairs. In addition to these structure, a summary array is used to keep the final score of each case, together with the name and attribute of the blackboard object to which the case corresponds, and a description of the case.

Logic flow: The program has two parts. First the structures described above are initialized (loaded) from a case description file. Then, whenever the process is activated, the current data is compared to the data in the structures, and scored according to formulas.

Programming guidelines:

There are four functions f used for scoring: equal, less than, greater than and match-points-on-curve. The latter function translates into equals and weights of 1 in the function/weight array. Since all values are floating point numbers (doubles), the equal function is defined to be TRUE whenever the two values are within some small percentage of each other (e.g., 1%). This is true in all similar cases.

The results of applying the functions range from 0 to 1. Interpolation is performed between user defined points.

Aside from all of the above, a criterion is needed for when to place a similarity score back on the blackboard. For example, whenever the score is greater than a predefined percentage of the maximum possible score for a case. The maximum score would then be calculated once, and stored in the summary array. In this implementation, the scores are always written back into the blackboard.

An output file is written at the end of each activation session, as described elsewhere.

The User Interface

This module generally performs two functions essential to the operation of the software. It is the principal means by which the user interacts with the system. It also acts as a "supplier" of data during the execution of the diagnostics.

Process name: user int

Figure 17:
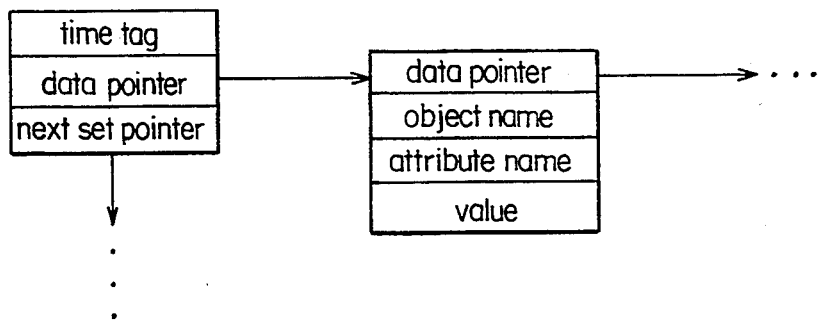
FIG. 17 is a diagram of an input data structure.

Data structures: FIG. 17 shows a general data structure that could be used to store the input data. This linked list is created from the contents of one data file, and it is used to supply the data to the event detector at the appropriate times, as determined by the time tags. Note that, at this time, the data values are of one type only (double); other data types may have to be added in the future. The use of this structure is optional.

Figure 18:
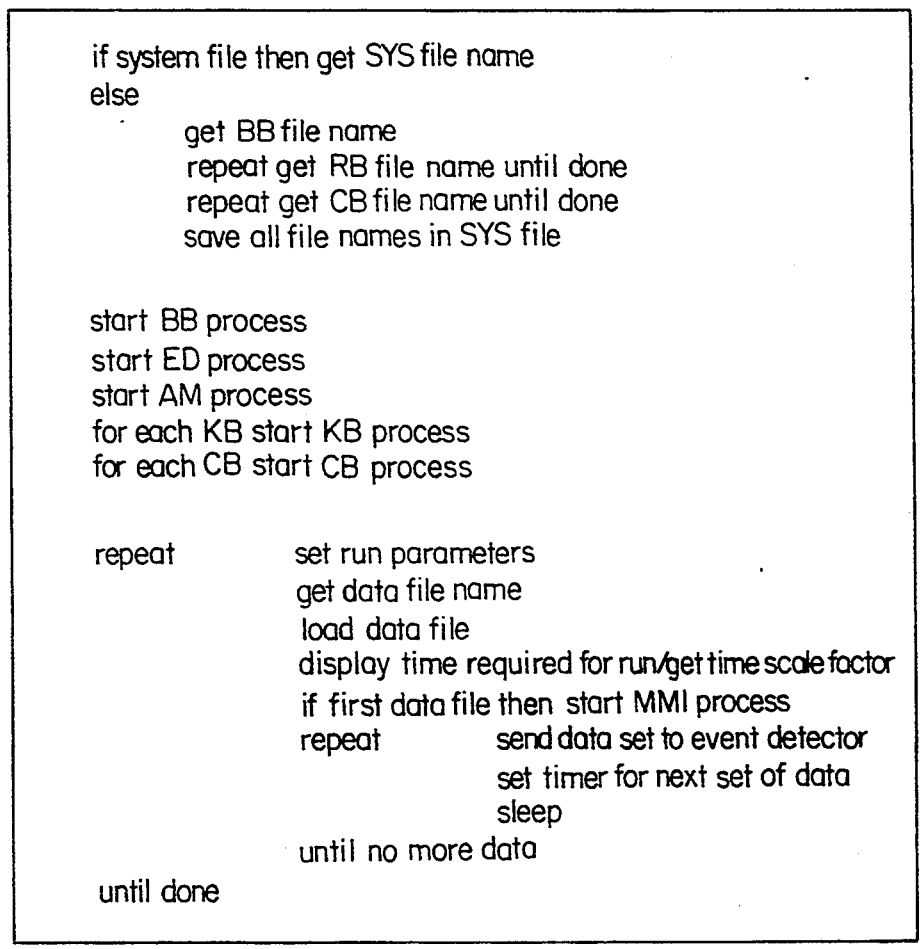
FIG. 18 is a list of logic flow of user interface software.

Logic flow: FIG. 18 illustrates the sequence of operations that makes up this program. There are three parts to this process.

First, the names of files in which the descriptions of the blackboard and of the knowledge sources are determined. The names of these files are kept in a system file, which has the name <system name>.SYS. The name of this file can be passed as an argument to the program:

user int <system name>.sys

Next, the other processes are started. First, the blackboard process, then the control processes (event detector and activation/agenda manager), followed by the knowledge sources.

After the system has been loaded, the actual execution of the diagnostics is started. First the user has the option to set run parameters: tracing, logging, stepping and breakpoints can be set or turned off; SF's, NF's, alpha and beta values can be set. Then the user is asked for the name of a data file. At this point the user may, in general, specify a time scale factor, which is used to "compress" or "expand" the time scale, such that data sets are run faster or slower than real time. The data sets are then supplied to the event detector, one at a time, until there are no more sets. The setting of the run parameters and the execution of the diagnostics is then repeated as long as the user wants to.

Programming guidelines:

After starting a process, the user interface waits until the process acknowledges the correct loading of its file(s). If an error occurs, a NACK message is expected. This message includes an error message, which is displayed. In this case, the user has the option to repeat loading the file with the error, after it is fixed in a different UNIX shell.

The displaying of error messages due to syntax problems in files is the responsibility of both the loading process and of the user interface. The setting of the trace, log and step run parameters is done from the user interface, via messages to the knowledge source(s). The setting of breakpoints however, requires passing control over to a rule-based knowledge source.

Before asking the user for a time compression factor, the program may display the time required to run the diagnostics in real time, based on the difference between the last and the first time stamps in the data file. The time compression must be done such that the data sets do not become overlapping as the interval between them becomes smaller than the available time resolution.

Interface Description

This section provides the details of the interfaces between the modules. It also contains message format descriptions and file syntax structure for the shell's input and output files.

Figure 19:
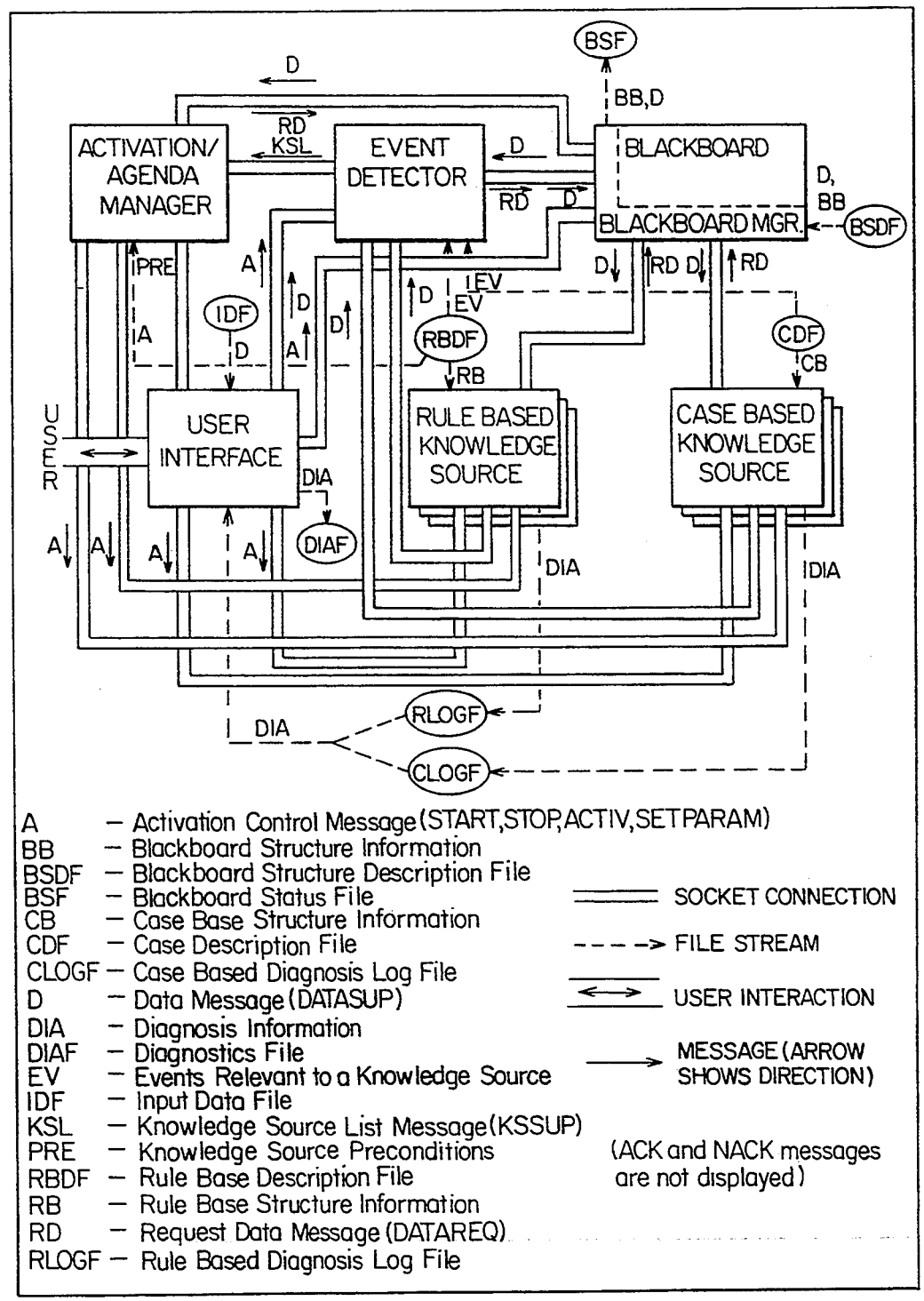
FIG. 19 is a detailed system block diagram.

FIG. 19 is a detailed picture of the system block diagram. It shows the socket connections, the message paths, and the I/O files (Section 4.3) that are required for the shell. The man-machine interface and its connections are not shown in FIG. 19. However, its interface requirements are described in this section. Message queues are also used for communications. Message queues are a standard feature of the UNIX operating system on HP computers. The manner of usage is similar to that for sockets; in other words, the description given here for communications applies also to message queues.

Communications interprocess communication between modules in the shell is based on either the use of Berkeley Interprocess Communication (BSD IPC) Sockets or UNIX message queues. Either of these modes provides a means of message passing so that data can be transferred between two processes.

The version of the software of the present invention resides on one machine; therefore, the UNIX domain sockets or message queues will be used for implementation.

For socket communications, the shell uses stream sockets since these provide reliable, two-way communication. Communication through the channel is analogous to that for UNIX pipes (file streams). The shell uses the sockets to exchange messages in a message sequence. The message sequence is essentially a request-response pair. The initiating process requests an action; the receiver then responds with either the results of the action, an acknowledgment of success, or a notification of failure.

Throughout this section it is assumed that the request messages are free from errors. However, processes will respond to an error in a message with a notification of failure (NACK) message if they are able to detect the error before a response is needed.

For the shell, all required communication channels are established before a session run begins. When the shell is started, each of the six process types described elsewhere is started (user interface, blackboard, event detector, activation/agenda manager, prototype only, and rule based knowledge source and/or case based knowledge source). A sequence of communication establishment then begins.

For socket communications, in its initialization, the user interface process establishes a bound socket with a listen queue. When the event detector, blackboard, activation/agenda manager and processes are started, they each request a connection with the user interface. Three channels are established in this manner. The blackboard, event detector and activation/agenda manager each establish their own bound sockets with a listen queue. Four additional channels are established: the event detector—blackboard channel, the event detector—activation/agenda manager channel, the activation/agenda manager—blackboard channel, and the blackboard—interface channel.

Additional channels are established as the application's knowledge sources are spawned from the parent knowledge source process. For each knowledge source, communications are established with the event detector, the blackboard and the activation/agenda manager.

There are two distinct uses of the connections within the shell. The first use is data-oriented, being involved in requesting and supplying application data for transfer between modules. The second use is control-oriented. This entails the activation of processes and changes in the modes of process operation. However, the type of communication established is independent of the use. Activities of either type of use are permitted. The content of the message determines the usage. The distinction is made in this document to efficiently categorize the design information presented herein. Only one communications channel normally uses both data-oriented and control-oriented message sequences. This is the event detector—user interface channel. The data-related communication channels carry five distinct message types. They are shown in FIG. 20. The syntactical format of the message streams corresponding to these five message types are described hereinafter.

A further distinction of the DATASUP message type is possible between data headed for the blackboard and data coming from the blackboard. This distinction can be made on contextual information (i.e. which process is sending the data). However, it is not necessary to have a distinct message format specified, since the content of the message is similar for both DATASUP messages. This channel is established as part of the initialization of the shell processes prior to a session run.

One task of the user interface is to supply the data input to the event detector. Data is supplied to the domain shell either from an input data file, used to simulate "real" data, or a UNIX process external to the shell that sends "real" data. The event detector responds to the message in one of two ways. If a syntax error is found, then the event detector returns a NACK message. Otherwise, the event detector relays the DATASUP message to the blackboard. This channel also carries control-oriented messages. These messages are discussed herein.

The event detector agenda/activation manager channel is established when the event detector and agenda/activation manager are initializing. The connection must be established prior to the beginning of the application session run (when the input data is read).

The channel is used to deliver the list of knowledge sources to be activated from the event detector to the activation/agenda manager. The event detector passes a KSSUP message that contains the list of knowledge sources. The agenda/activation manager responds with an ACK message to indicate that a correct message was received. The event detector blackboard socket channel is established when the event detector and the blackboard are initializing. The connection must be established prior to the beginning of the application session run.

The channel delivers the data updates to the blackboard, and also provides a two-way channel for the event detector to request data from the blackboard, and the blackboard to deliver the data. There are two message sequences that pass through this channel. One message sequence is the event detector furnishing data to be updated on the blackboard with a DATASUP message. The blackboard will acknowledge receipt of a correct DATASUP message with an ACK. The other message sequence is that of the event detector requesting data from the blackboard with a DATAREQ, and the blackboard supplying the data with a DATASUP.

The activation/agenda manager-blackboard channel functions in an identical manner to the event detector—blackboard connection, except that there is only one message sequence. This is the DATAREQ—DATASUP sequence as described in the previous section. The implementation requirements for this channel are identical to those for the event detector—blackboard. See the previous section for details.

One channel is established for each knowledge source in the application. At this point, the required number of knowledge source processes is known by the shell. When each spawned knowledge source process is being initialized, it requests a connection with the blackboard.

One message sequence type is used on the knowledge source—blackboard channel. This is the DATAREQ—DATASUP sequence as described for the event detector—blackboard channel. Here, the knowledge source is the requester of the data, and the blackboard is the supplier of the data.

Each knowledge source has a connection with the event detector. The connection is established when the knowledge source is being initialized.

The message sequence on this channel is the DATASUP—ACK sequence as described for the event detector—user interface channel. The event detector responds to the DATASUP message from the knowledge source by sending an ACK message to the data-supplying knowledge source.

The shell uses a process starter that is responsible for starting and terminating the other shell processes.

There are six control-oriented message types. They are shown is FIG. 21.

The syntactical formats of the message streams corresponding to these message types are described herein.

The event detector process starter channel is established during the initialization of the shell processes prior to an application session run.

The process starter is responsible for controlling the event detector process. The process starter sends an appropriate control message to the event detector. The event detector responds with an ACK message if the message is correct.

The process starter activation/agenda manager channel is established during the initialization of the shell processes prior to an application session run.

As in the previous section, the process starter activation/agenda manager channel is used by the user interface to communicate appropriate control messages to the activation/agenda manager.

The process starter—blackboard socket channel is established during the initialization of the shell processes prior to an application session run.

Again, this channel is used by the user interface for controlling the blackboard as described for the user interface—event detector channel.

The process starter knowledge source channel is established when the knowledge source is initializing after it has been spawned.

The process starter must be able to shut down a knowledge source process when desired with a STOP message. This is one use of the channel. Another use is when the user desires to set operating parameters for a knowledge source. The user interface then sends a SETPARAM message to the knowledge source, communicating the desired operating mode.

The activation/agenda manager—knowledge source channel is established when the knowledge source is initializing after it has been spawned.

The purpose of this channel is to allow the activation/agenda manager to activate a knowledge source when it is time for that knowledge source to begin reasoning. It sends an ACTIV message to the appropriate knowledge source to inform it that it should begin active operation to produce a diagnosis.

A control message is also sent from the knowledge source to the activation/agenda manager when the knowledge source has completed executing. This allows the agenda manager to update the status record for the knowledge source.

Messages

There are nine distinct messages that pass through the communication paths. All messages are headed by an integer code, which identifies the type of message that follows. FIG. 22 shows a typical integer code for each message. Actual implementation codes include additional information to source and destination process.

The whitespace characters shown in the figures for the message formats are present for clarity. The actual data message formats include the size of the message and should also be efficiently aligned.

DATAREQ

This message contains a sequence of object attributes whose values are requested. FIG. 23 shows the message format. The message begins with the DATAREQ identifier, followed by the number of objects whose attribute data is requested. Each object name and attribute name is then listed.

DATASUP

This message contains a sequence of object attributes with values and time stamps for the attributes. FIG. 24 shows the message format. The format is similar to that of the DATAREQ message except that the attribute values and times are also present.

KSSUP

This message contains a sequence of knowledge source identifiers to be activated. It is headed by the KSSUP identifier. FIG. 25 shows the message format. The message is headed with the KSSUP identifier, followed by a sequence of knowledge source identifiers. The knowledge source identifier is a unique handle for the application, determined by the order of appearance of the knowledge source file name in the the system file. Note that UNIX process numbers are not recommended as handles.

ACK

This message consists solely of ACK identifier code returned to the communication initiating process.

NACK

This message consists of an integer NACK identifier code.

START

This message consists of a START identifier, followed by a character string. The character string provides the means of passing information to another process. If the processing sending the string is ready to start, then it sends the strink "OK" to the user interface. Otherwise, it should send an error message, to be displayed by the user interface.

STOP

This message consists of a STOP identifier.

ACTIV

This message consists of a ACTIV identifier.

SETPARAM

This message consists of a SETPARAM identifier, followed by a list of arguments (character string). The arguments will specify to the receiving process what particular parameter setting action to take. FIG. 23 shows the structure of the message. There are six types of parameter codes. They are: trace, log, step, breakpoint, alpha/beta and sf/nf. Trace, log and step are followed in the message with a status code. Alpha/beta and sf/nf are followed by two numbers representing floats that are the first and second parameter values. Breakpoint requires the user to interact with the receiving process to set breakpoints.

Input/Output Files

All files used by the shell are identified by type by the use of a particular suffix. The filename is filename suffix, where filename is a descriptive name supplied by the application developer, and suffix identifies the file type. Suffix identifiers are specified in the appropriate sections below. In general, suffixes can be in lower or upper case.

Input files are created outside of the shell, then supplied to the shell through specification of a system file.

The application development editors automatically create these files; the developer need not edit them outside the shell, and in fact may compromise the application if this is done.

The following conventions are used in the figures showing the syntax of input files in this section. Upright text (such as FUNCTION:) must appear exactly as shown. Italic text (such as object_name_1) denotes information that the user must supply. Text in the current text font (Helvetica) is explanatory information and does not appear in the actual file. Elements of a file that are optional are enclosed in < >. Generally, the order in which elements appear in files is important, and must be the same as shown here.

All whitespace characters (spaces, tabs, end-of-lines) can be expanded for clarity. Separation of entry elements by end-of-lines is recommended to make the file more readable. Comments can be inserted at any point in the file using the // comment-to-end-of-line format from the C++ language. . Lastly, all references to timestamps require the following syntax:

"mm/dd/yyyy hh:mm:ss"

This file, identified as filename.sys, contains a list of file names. The file names identify the Blackboard Structure Description File (BSDF), and all knowledge source files, both Rule Based Definition Files (RBDF) and Case Description Files (CDF) for a particular application. For knowledge source files, the form of display can also be defined here. If the file name is followed by ",NORMAL", then the knowledge source is allocated a standard size window. If the NORMAL switch is omitted, or if the ICON switch is used, then the knowledge source is only allocated as an icon in the upper left corner of the scren. FIG. 27 shows the syntax of the file. Note that all normal UNIX rules for the use of pathnames in file specifications apply. A valid system file must include exactly one BB file first, followed by a minimum of one knowledge source file. All rule based knowledge source file names must precede case based file names.

Blackboard Structure Description File

The Blackboard Structure Description File (BSDF) contains the information necessary to create internal structures used by the blackboard process. The information in the BSDF maps directly into the blackboard structures described herein. A BSDF is identified as filename.bb. The syntax of the BSDF is shown in FIG. 28.

Every object in the blackboard has a separate entry in the BSDF. For every object, all attributes of the object are identified by name. Each object must have a unique name. Attribute names are repeated as necessary. Choices for value types are shown in FIG. 6.

A valid BB file must include a minimum of one object, with a minimum of one attribute.

Rule Base Description File

The Rule Based Definition File (RBDF) contains the information necessary to set up a rule based knowledge source. The data in the RBDF maps directly into the rule base structures described herein. A RBDF is identified as filename.rb. The syntax is shown in FIG. 29.

There are three parts to an RBDF. The EVENTS portion of the RBDF is a list of expressions that are used by the event detector to determine if incoming data constitutes an event relevant to the rule base. The PRECONDITIONS portion of the RBDF is also an expression list, which is used by the activation/agenda manager to further determine if a knowledge source should be activated. For the EVENTS and PRECONDITIONS list of expressions, it is understood that the list is "OR"ed. That is, any of the expressions evaluating to true will indicate to the appropriate process (event detector or activation/agenda manager) that certain conditions have been satisfied. If there are no event expressions, then that knowledge source will execute only if the precondition part includes an every operator. If there are no precondition expressions, then the knowledge source will be activated whenever one of its events is true. The "EXPRESSION:" prefix must be followed by an expression (i.e., it must not be present unless an expression is present.)

The RULE BASE STRUCTURES portion of the RBDF contains the structural information needed by the rule based knowledge source process. The process starter provides the RBDF name to each of these three processes (i.e, event detector, activation/agenda manager and rule based knowledge source); it is their responsibility to extract the necessary information. Each section of the RBDF is separated by a string of '*' characters.

The evaluation expressions used for the EVENTS and PRECONDITIONS, as well as the expressions used in the RULE BASE STRUCTURE part of the RBDF are further discussed herein.

Other comments:

all references to nodes, contexts and piece-wise linears in rules, meta-rules and evaluators must be defined first in the earlier parts of the RULE BASE STRUCTURE of the file.

the * * * and - - - lines are required syntax, since they are used by the parsing software as separators between sections of the file.

a piece-wise linear's XY-LIST must have the X values in ascending order.

at least one context must have the value of 1 (i.e., when the file is loaded, at least one context must be TRUE; meta-rules can change this during execution.)

a valid rule base must contain a minimum of one data node, one malfunction node, one rule, and one context.

Case Description File

The Case Description File (CDF) contains the information necessary to set up a case based knowledge source. The data in the CDF maps directly into the case table structure described herein. A CDF is identified as filename.cb. The syntax is shown in FIG. 30.

The division of the CDF into three portions is similar to that for the RBDF. The EVENTS and PRECONDITIONS portions are identical to those for the RBDF. The CASE BASE STRUCTURE portion provides the structures necessary to set up a case table.

The CASE BASE STRUCTURE consists of two parts:

First, functions (equal, greater and less) are defined. Each function is defined in terms of two margins, expressed in percentage points. They work as follows.

equal function (FEQ): if two numbers are within (equal low_margin) % of each other, then the score is 1.0; if two numbers are more than (equal_high_margin) % different, then the score is 0.0; otherwise, a linear interpolation is performed between the two margins.

greater-than function (FGT): if the current number is greater that the case history value by more than (greater_high margin) %, then the score is 1.0; if the current number is less than the case history value by more than (greater_low_margin) %, then the score is 0.0; otherwise, a linear interpolation is performed between the two margins.

less-than function (FLT): if the current number is less that the case history value by more than (less_high margin) %, then the score is 1.0; if the current number is greater than the case history value by more than (less_low margin) %, then the score is 0.0; otherwise, a linear interpolation is performed between the two margins.

Second, the cases themselves are defined. Each case must be given a name. Each case in the case table must map into an object attribute in the blackboard. For each case, a set of object attributes is then specified, along with values and weights. The values are given as value, time pairs. Each pair is followed by an optional function name (FEQ, FGT, FLT) and weight. If the latter are omitted, FEQ and W1.0 (weight of 1) are assumed. The match-points-on-curve function, as defined herein, is thus invoked by omitting the function names and weights.

A valid case based knowledge source must have a minimum of one case point.

Input Data File

The Input Data File (IDF) contains the sets of data simulating incoming data to the system. The user interface process reads this file and supplies the data to the event detector process. An IDF is identified as filename.dat. The syntax is shown in FIG. 31.

Output Files

Output files are generated by the shell in the course of its operation.

"LOG" Files

LOG files are generated by rule based knowledge sources whose log flag has been turned on. The information in these files provides a relatively detailed trace through the execution of a rule base.

"OUT" Files

Each knowledge source that generates diagnostics writes to an OUT file. Each entry in OUT files generated by a rule based knowledge source represents a diagnostic message, with associated priority and severity measures. Each entry in OUT files generated by a case based knowledge source includes the calculated scores for its cases.

Additional information may be included in these files.

"DIA" File

The Diagnostics File (DIAF) contains the results of a session run. It is a list of the diagnoses and case matches that the shell has made during the just-completed session run. The diagnoses are the ordered combination of the diagnoses made by the individual rule based knowledge sources, followed by the ordered combination of case matches found by the individual case based knowledge sources. Basically, the results existing in the OUT files are merged and sorted by time.

Blackboard Status File

The Blackboard Status File (BSF) is similar to the BSDF in that it contains the structural information necessary to recreate the blackboard. It also contains a snapshot of all of the data values stored in the blackboard. Using the BSF file, the blackboard can be restored on a subsequent session run. Because of its compatibility with the BSDF, it also is identified as filename.BB. The syntax is the same as the BSDF.

User Interaction

All user interaction with the shell occurs through the user interface. The nominal sequence of interaction with the shell is described herein. Details for the user interface are described elsewhere in this document.

The domain shell program is designed for operation on the Hewlett-Packard 9000, Series 700 family of workstations. The workstation should run the HP-UX operating system, Version 8.05 or higher. The HP-VUE visual user environment should also be present. This environment is layered over a Motif-based X-window system. The domain shell uses xterm windows within this framework.

In order to use the shell, users must create input files to be used by the system. Therefore, it is helpful to be familiar with the shell's overall design concept as well as the individual input files' syntax and structure. Other sections herein contain the overall system design description and describe the operation of the components of the domain shell.

The creation of input files must be done prior to the operation of the shell. In order to use the shell, the following files must be created: system file, blackboard structure description file, one rule base description file for each rule base, one case description file for each case base, and at least one input data file. The uses of these files are described herein. The location of these files is not restricted; however, if they are not located in the same directory as the shell executable files then the full pathname of the file must be given in the system file.

The application development environment in the Version 1 software manages the naming and placement of files automatically. The developer only needs to name the application and the knowledge sources.

System File

The system file contains a list of filenames identifying the blackboard structure description file, and all rule base and case description files for the system. The system file is identified as such by the suffix .sys. The file format is shown in FIG. 27.

Note that the order of files named in the system file is important. The name of the blackboard structure description file should be specified first, then all rule base description files, and finally all case description files. This is the order that is shown in FIG. 27. Only one file should be specified per line. All of the files specified in the system file should exist or initialization errors will occur.

The shell assumes that the files specified in the system file reside in the same directory as the shell executable files unless full pathnames are used in the system file.

There is an option available to determine whether to fully open a knowledge source window or iconify it. The default system operation is to iconify all knowledge source windows. However, if a ,NORMAL is placed at the end of a knowledge source file specification line, then the window associated with that knowledge source's process will be fully opened. This feature is useful for making detailed observations of the operation of a particular knowledge source. If desired, all knowledge source windows can be fully opened by using the same ,NORMAL suffix on all knowledge source file specification lines. The default behavior (iconified knowledge sources) can be explicitly specified by using ,ICON at the end of a knowledge source specification line.

Blackboard Structure Description File

The blackboard structure description file (BSDF) contains the definition of all objects, and all attributes for each object. Objects and attributes are identified by names given by the user. The blackboard file is identified as such by the suffix .bb. The file format is shown in FIG. 28.

The names of the objects and associated attributes are used in the knowledge source description files, and in the input data files. Names must match exactly in spelling and case in order for the shell to operate properly.

There is no specific maximum history length. Since the blackboard will maintain data points it receives within this history length, excess memory will be used and the system will be slowed needlessly if the history length is longer than what is required by the knowledge sources. A good check on this is to review the history lengths required by knowledge sources and adjust the blackboard history lengths appropriately.

Significant data received by the blackboard can be forwarded to the user interface windows. Under the object's attribute, include the line, DEMON: MMI_ WRITE. When the blackboard receives a new value of this object attribute, the object and attribute names and the value will be forwarded to the man machine interface. The value will be shown in the man machine window. This is a powerful tool for working with the shell, since it allows any object?attribute to be tracked as the system is running. However, if too many object attributes have the DEMON turned on, the system will be slowed, and the number of values printed in the man machine window will be large. Once an application is tested, the use of the DEMON should be reserved for significant object attributes, such as those representing malfunctions. This is a feature of only the prototype. The user interface is the proper destination for blackboard data.

Rule Base Description Files

Each rule base is defined by a description file that is comprised of three sections. The first section is a list of event expressions, called EVENTS. These expressions are used by the event detector to determine if a knowledge source should be placed on a list of knowledge sources to be fired which will be sent to the agenda manager. The second section is a list of event expressions, called PRECONDITIONS. These expressions are used by the agenda manager to check if a knowledge source should be fired at a given time.

For the EVENTS section, care should be exercised in writing event expressions that depend on the arrival of new data. Each event expression should refer to new data arriving from one source only (either the user interface or one of the other knowledge sources). All data is sent through the event detector, but each source of data (a knowledge source or the user interface) sends it in separate batches. Therefore, the event detector can only recognize data in a particular batch as new, even if data arriving from another source has the same time stamp. In general, caution should be exercised in writing event expressions with more that one "new" data point in the expression.

The PRECONDITIONS section contains expressions that are similar to those in the EVENTS section. Also, a periodic precondition can be set to cause a knowledge source to fire at regular intervals. This is done by placing a statement "every n" as a precondition, where n is the interval duration in seconds.

The third section defines the rule base structure, including all components of rule base such as hypotheses, malfunctions, rules, etc. A rule base description file is identified as such by the suffix .rb. Details of the file format are shown in FIG. 29.

The blackboard structure description file should be referenced and edited as necessary so that all object attributes named in the rule base as blackboard elements exactly match the names in the blackboard; mismatches will cause the rule base to fail to properly initialize.

There are many operators available in constructing a rule based description file.

Case Description Files

Each case base is defined by a description file that also contains three sections. The first two sections are EVENTS and PRECONDITIONS sections as described above. The third section contains the case base itself, consisting of a set of cases with values. A case description file is identified as such by the suffix .cb. Details of the file format are shown in FIG. 30.

As for the rule based description files, the object attributes in the case based files must exactly match blackboard object attributes, or a loading error will occur.

Each case should be comprised of a set of object?attributes with associated case values. The time stamps used for the case values should reflect the required time intervals necessary for comparison; the absolute time is not important. For example, if in a particular case, an object attribute has a characteristic set of values over a 10 second period, the difference in the time stamps between the most recent and oldest values should be 10 seconds.

Input Data File

This file consists of the data that is to be used by the shell to simulate the arrival of actual data. The input data file is identified as such by the suffix .dat. The file format is shown in FIG. 31.

Input data is expected to be structured so that all data with a particular time stamp is grouped together in the same data set.

Object attribute names should exactly match the blackboard names. An error will be reported when the input data file is scanned if name mismatches occur.

The data in the input data file should appear in chronological order, from earliest data to latest data.

The input data file is intended only for testing purposes, to verify proper application operation.

Log Files

Each knowledge source that generates diagnostics writes to a Log File (RLOGF or CLOGF), with entries representing a diagnostic message with associated priority and severity measures. The syntax is shown in FIG. 32.

Diagnostic File

The Diagnostic File (DIAF) contains the results of a session run. It is a list of diagnoses with associated confidence factors. The syntax is shown in FIG. 33.

Blackboard Status File

The Blackboard Status File (BSF) is similar to the BSDF in that it contains information necessary to recreate the blackboard. Using the BSF file, the blackboard can be restored on a subsequent session run. The syntax is shown in FIG. 34

Use of the Program (Prototype)

The program is invoked by typing the program's name followed by the system file name. As currently installed, the program's name is user_int. This can be changed by the user if desired. However, the names of the other executable files should not be changed.

Windows will be opened for each of the domain shell processes: blackboard, event detector, agenda manager, man machine interface, and each knowledge source. All windows are xterm windows, and can be resized, moved, or iconified. Each window is appropriately titled in the title bar—knowledge source windows are identified by their respective description file names. All knowledge source files are initially iconified (unless the NORMAL window option was specified in the system file), but can be opened as desired by the user. Within a window, the user can select a variety of viewing and tracing options by placing the pointer within the window, hitting the left or the center mouse button while holding the Ctrl key down, and choosing the desired option. A scrollbar for the window can be enabled by hitting Ctrl-Center_Mouse_Button and choosing the option "Enable Scrollbar".

A window's title bar identifies the process running within it (with the exception of the user interface window, which is a standard terminal window that the user has previously opened). The knowledge sources are identified by the name of the knowledge source description file associated with it. When the windows are iconified, the knowledge source windows are still identified by the description file's name; the other processes are identified by two letter abbreviations—bb for blackboard, ed for event detector, am for agenda manager, and mm for man machine interface.

Most interaction with the user occurs in the first window, where the program was started. This window will present the user with a menu of top level options after the system is set up. There are four choices: Start Data, Continue Data, Set Operating Parameters, and End the Session.

Start Data—Option 1

This option, when chosen by the user, prompts him for the name of an input data file. It then notifies all knowledge sources to reset and prepare for a session run. After scanning the input data file, the program prints the length of time needed to run the data in seconds. The user is given the option of compressing the time scale in order to complete a data set run in a shorter or longer period of time. The compression factor is divided into time intervals extracted from the data file to determine the compressed interval. After the compression factor is set, data is read from the input data file and sent at the appropriate time to the event detector, which forwards it to the blackboard. The system will operate, firing knowledge sources as appropriate, until the input data is exhausted. Informational messages will appear in the shell windows as the data set run proceeds. When the run is over, the user is presented with the top level menu in the user interface window.

Evidence of the operation of the blackboard is shown by the use of the characters '>' and '<' in the blackboard window. When data is placed in the blackboard, the '>' character is printed; when data is retrieved from the blackboard, the '<' character is printed.

The event detector will print out a set of three '.' characters as it proceeds with the evaluation of event expressions. The agenda manager will also show a set of three '.' characters indicating the completion of an activity. The man machine interface will print received data in its window as the blackboard sends it. Each data point sent will be displayed along with the object and attribute names. Only those object?attributes with DEMON: MMI_WRITE will be displayed, and only when a new value is received by the blackboard.

If Start Data is chosen again after a data set has been run, then all data in the blackboard is discarded and all knowledge sources are reset. This, in effect, starts the session over. For continuing a run with further data, use Option 2, Continue Data.

Continue Data—Option 2

This option causes the system to run a data set in a manner identical to that for Option 1—Start Data. However, for the Continue Data option no messages are sent to knowledge sources to reset, and the blackboard data is retained from the previous run. This allows the rule bases to continue operation with current values that were set as a result of operations during a previous data set run. As for Option 1, the user is prompted for the name of an input data file. Data in this file should be begin with a time stamp that is chronologically later than the last data in the previous data set in order for this option to operate correctly. If further data is sent to the blackboard with time stamps earlier than data from a previous run, the blackboard will place the data in the blackboard as a current value for an attribute with no history. However, for attributes with non-zero history length, the blackboard will insert the value at someplace in the history other than as the latest value. This will cause indeterminate behavior as the event detector may fire a knowledge source based on the arrival of "new" data; when the knowledge source retrieves the data from the blackboard, the data is hidden and the knowledge source fires using possibly incorrect data points. When the data set is running, the appearance of the shell processes is identical to that for Option 1—Start Data.

Set Operating Parameters—Option 3

This option allows the user to set parameters for rule bases. If this option is chosen, the user is prompted for the name of a rule base. Only rule bases have the option of setting operational parameters. The case based knowledge sources have no Set Parameter options. There are six choices for setting parameters: Trace, Log, Step, Breakpoint, Alpha/Beta, and SF/NF.

If Option 3 is selected by the user, he is then prompted to enter the name of a knowledge source file. This specifies the knowledge source file for which the parameter is to be set. Currently, only rule bases have parameters that can be set. After the knowledge source file is specified, the user is then prompted to enter the code corresponding to the parameter to be set.

Trace—Parameter Option 0: If this option is chosen, the user is asked whether to disable or set a tracing capability. When set, this causes detailed descriptions to be displayed in the rule base window when each rule in the rule base is fired.

Log—Parameter Option 1: If this option is chosen, the user is asked whether to disable or set a logging capability. When set, this causes descriptions identical to those generated for the Trace option to be sent to a file. The file is named with a root name the same as the rule base description file that created it, with the .log extension.

Step—Parameter Option 2: If this option is chosen, the user is asked whether to disable or set the step functionality. When set, the Step option causes the rule base to stop after each rule is fired; the rule base will continue only when the user acknowledges the rule firing by responding in the rule base window. Therefore it is necessary for the user to change his focus of attention to the rule base window when this option is set. When the rule base fires, the processing will stop and the user will have options within the rule base. Data will continue to be sent to the blackboard, and all other shell processes will proceed. However, further knowledge source firings will be delayed until the user has completed stepping through the rules in the rule base. Execution of the rest of the shell will therefore be disabled. The purpose of the Step option is to allow the user to follow in detail the sequence of rule firings in a rule base. Since its use generally ruins the timing of process execution, it should only be used in configurations with only one knowledge source, for debugging purposes.

Breakpoint—Parameter Option 3: If this option is chosen, the user can set or remove breakpoints at rules in a rule base window. In order to use this option, the user must move to the appropriate rule base window in order to set the breakpoints. In the rule base window, the user can set and remove breakpoints for any rule in the rule base. Upon completion, the user must return to the first window to choose a top level option.

As with the Step option, rule base operation is suspended during firing if breakpoints are set. The use of breakpoints is for observation of rule base operation, rather than shell performance as a whole. In other words, it should only be used in configurations with only one knowledge source, for debugging purposes.

Alpha/Beta—Parameter Option 4: If this option is chosen, global values for alpha and beta cutoffs can be set for a particular rule base. The user is prompted to enter values for alpha and beta (from −1.0 to +1.0). These values are then passed to the rule base specified.

SF/NF—Parameter Option 5: If this option is chosen, global values for the sufficiency and necessity factors (SF and NF) for rules can be set for a particular rule base. The user is prompted to enter values for SF and NF (from −1.0 to +1.0). These values are then passed to the rule base specified.

End the Session—Option 4: If this option is chosen, the session is ended and the program exits. Output files are written as described elsewhere. Each knowledge source generated a log file that contains a list of diagnoses. The blackboard writes an output file that contains the structural information from the blackboard input file, and a snapshot of all data values currently stored in the blackboard.

Output Files

When the session is ended, each of the knowledge sources prints out at least one output file that contains the results of operation. A rule base may print out a log file if that parameter has been set through the set parameter option.

Each time a session has ended after a set of data has been run, every rule base for the system will create an output file with the results of diagnosis. This file has the same root filename as the rule base description file, but with the suffix .out. The results of diagnostics generated each time the rule base was fired are written into this file. The data written includes the diagnoses that are reached, the number of rules that were fired, and the number of rules fired per second.

If the LOG option has been selected for the rule base, then an output log file is created. This file has the same root filename as the rule base description file, but with the suffix .log. This contains detailed messages that indicate the sequence of operation of the rule base.

The case based processes will write out the results of scoring cases into a file with the same root name as the case description filename's root, and with the suffix .out. The file will contain a record of the results of scoring over a complete data set run.

The blackboard produces an output file that contains all of the object and attribute information from the input file plus all of the data currently stored in the blackboard. This file can be used as an input file for subsequent session runs. In this case, input data sets should contain time stamps chronologically later than the latest data in the blackboard, or indeterminate behavior will result.

Errors

Errors encountered in using the shell can generally be divided into two categories: syntax/loading errors and logical errors. If a particular knowledge source encounters an error, it will print an error message identifying the line number in the file where the error is located. An error message is sent to the user interface. This causes the user interface to try to kill the shell processes and exit.

Logical errors are causes when the information contained in the knowledge source files does not correspond to the desired performance due to incorrect rules, etc. These errors may be difficult to locate. The shell provides several tools to assist in following the operation of the individual shell processes. These include the Set Parameter Options for the rule bases. Also, the values of object attributes posted on the blackboard can be printed in the man machine window using the DEMON feature. All of the output files can be used to assist in discovering the error.

System Functional Specifications

This section details the functional specifications for the real-time plant diagnostics domain shell. Given the long term nature of the software development process, this section is necessarily preliminary in nature. Its purpose is to establish a long term vision as to what the shell functionality should be. As subsequent development phases are taking place, this section will be modified to more accurately fit the emerging requirements of this project.

There are four subsections. The successful implementation of the functionality described here is critical to the success of this work, and in this sense all subsections are very important. On the other hand, user acceptance is ultimately the deciding factor in the success of any product; the operating concept, as seen by the users, is therefore discussed first. The shell's ability to interface with the rest of the world is also critical to the usefulness of the shell, and hence to its success. Interface requirements are the next topic. The knowledge-based techniques subsection follows. Finally, hardware/software requirements close this section.

Operating Concept

This subsection deals with system functionality, as seen by its users. There are two categories of users: the plant personnel who use the application for diagnostic and monitoring purposes (End Users), and the personnel who develop applications of the shell (Application Developers). Each category of users may be further subdivided, in the case of the end users by information access level, and in the case of the application developers by the level at which they develop an application. Despite this, it is possible for the end users and the application developers to be the same individuals. The operating concepts therefore have to have the same intuitive nature for all categories of users. This translates into a requirement that all user interfaces have the same "look and feel."

Execution Environment (The End Users' View)

General

The processes which form the execution environment are completely separate from the application development environment processes. While the latter have access to on-going and currently executing runtime information, the converse is not true. This is required in order to prevent erroneous runtime performance due to incomplete or incorrect end user changes to the knowledge base.

In general, the end user interface consists of a hierarchy of windows. All users are allowed standard window operations (shrinking, dragging, expanding, etc.) Both the hierarchy and the contents of the windows, however, are defined by the application developer in a declarative manner, from a library of basic end user interface functions.

These functions include, but are not limited to:
data displays (graphs, tables)
system displays (of the model, rules, etc.)
messages
choice menus (pop-up, pull-down)
dialog windows
notebook The first three are information to the user; the last three contain information from the user to the system.

All graphical displays duplicate the graphical forms created by the application developer.

All user interface functionality is available to the users at all times. Nevertheless, it is expected that behavior should vary somewhat on circumstances related to the presence or absence of malfunctions.

When There Are No Malfunctions

Under normal circumstances, when no malfunctions are taking place, all diagnostics are taking place in the background and require no user interaction. Since observing the diagnostic process in this situation is uninteresting (even though it is possible), the user interface is basically a browser through the system. According to access level, the user will be able to select any part of the system: model, rules, current primary (measured) and secondary (calculated) data, historical data, data base of past cases, etc., for display and browsing. Under these circumstances, the only normal user input into the system will be into the notebook.

When Malfunctions Occur Or Are Believed To Occur

When the diagnostic process detects any abnormal condition, it displays messages of alarm/warning, as defined by the application developer, and automatically changes the end user's focus of attention, from wherever he was browsing, to the appropriate place in the model hierarchy. Appropriate color coding should be used (i.e., flashing red for new alarms, solid red for acknowledged alarms, etc.).

Even when the diagnostic process does not detect any abnormal condition, the user can request focus of attention, if the user suspects a malfunction is taking place but the system has not picked it up.

In the focused mode, users with the appropriate access level can perform a certain degree of system control, such as: focus the diagnostic process toward a malfunction (i.e., invoke backward chaining)
  use case-based reasoning knowledge sources
  use model-based reasoning knowledge sources
  invoke the explanation facility.

Other Interactions

Both during normal circumstances, and while malfunctions are occurring, the user may be requested by the system for additional input. This is done using procedure windows, a special case of the dialog window: the user is asked to perform a procedure (sequence of operations), and respond with the result (effect) of the procedure. Procedures are usually used to confirm or refute hypotheses created by rules using on-line information. The user may be asked to acknowledge alarms, the effect usually being a change in display color somewhere on the screen.

Application Development Environment (The Application Developers' View)

General

The development of the knowledge-based part of an application is always a very difficult process. In most applications this is the developmental bottleneck. The difficulty is present in each of the three phases of the process: knowledge extraction from experts, knowledge formulation using the paradigms available in the shell being used, and the entering of the knowledge in the computer. Formulating (formalizing) knowledge is helped by the availability of several knowledge paradigms, which are discussed in the section on knowledge sources. It is the entering of knowledge in the computer that is the subject here.

It is of utmost importance that the application development environment does not add any undue burden to the already difficult two tasks preceding the entering of knowledge in the computer. The fundamental principle behind the interface then is ease-of-use. In practical terms, this translates into two requirements: a graphical approach to user input, and richness in available tools. Furthermore, the tools have to be strongly intuitive in nature. At its highest level, the developers' interface consists of a menu driven series of options, from which the user (developer) selects the most appropriate tool for the current development step. The following sections briefly describe the functionality of a large number of tools. While they are described separately, based on perceived requirements, these tools could be implemented as separate entities, or as a smaller number of context sensitive tools.

Application development will be done in two steps: first the domain specific context is created; then the application specific knowledge is entered. The steps can be carried out by different developers, or by the same person. There is no clear boundary between steps, and, after some basic entities are defined, they can proceed in parallel. The totality of tools available to aid in these steps form the knowledge base management facilities.

Creating The Domain Specific Context

The domain specific context includes the vocabulary (abstractions) characteristic to the domain, as well as the control mechanisms (inferencing rules) associated with the reasoning process in the domain. As such, the main tool at this level is the associated basic-object editor. This tool is used to define the basic entities of the application domain. The basic-object editor is used to describe the attributes of these objects.

The control rule editor. This tool is used to create the application domain specific declarative portion of the inferencing process within the blackboard control module.

Creating Application Specific Knowledge

The application specific knowledge entering process uses the following tools:

Rule editors for each of the types of rule-based knowledge sources. Again using a graphical approach, rules are created which form the various rule-based knowledge sources. All parameters associated with the rules are defined using these tools.

Case structure editor. This tool is used to define the variables, attributes, features, etc. which will be saved as part of a case.

Rule editor for defining similarity rules (metrics) for case-based reasoning. This is a declarative approach to defining the application specific formulas which are used to measure similarity and utility among cases.

Plain text editor will cover the need to create free-form text for messages, descriptions, explanation facility text, developers' notes, etc.

Knowledge System Utilities

These are convenience utilities, designed to increase the efficiency of the application developers by allowing easier manipulation of the various blackboard and knowledge source entities.

The Copy and Move utilities provides basic cut-and-paste functionality to groups of one or more structures.

The List utility can be used to list types of structures, to any level of available detail.

Merge/Split can be used, as the names imply, to combine two rule bases into one, or break up one into several. This utility facilitates the transition from two to one developer and vice-versa.

Pre-Deployment Utilities

These tools are designed to help the application developer in generating efficient, compact and robust deployable knowledge systems, after rules have been developed. Although meant for the later phases of system development, these utilities can be used at any time.

Manual input is the simplest and most straightforward: the developer is responsible for giving input values in a dialog window. This is good for simple-minded tests of rule execution.

Regression approach: the developer creates a set of "good" data (using manual input), and a test plan which describes the time variation of the input data. This utility then uses the simulator functions described later in this section to generate sequences of test data, such that each sequence consists of a series of perturbations to one or more inputs, as defined in the test plan. Each sequence is then executed, and the results are kept for later analysis.

"Real" data sources are two:
1. archived (data-based) inputs are available for examination and modification, after which it can be played back into the rule base being tested, and
2. a window into a currently executing system can provide actual on-line input data.

Consistency checkers search the blackboard and knowledge sources for loose ends, incomplete information, etc. Some of the functionality of this tool may be application dependent. Consistency checkers are particularly useful when upgrading a deployed application to a new version of the knowledge system. Before switching to the new version, consistency checking will point out inconsistencies which may affect a "bumpless transition."

Compilers will provide the means by which the essential on-line parts of the application will be as compact and efficient as possible. These tools will convert the essential blackboard and knowledge source structures into memory resident structures. In order to maximize efficient memory usage, only those structures are compiled which are required for fast execution. The compilers will also generate information detailing memory usage.

Execution and debugging utilities allow the developer to fully exercise a system before deployment. These utilities provide the obvious functionality: tracing, setting breakpoints, stepping through the knowledge sources, as well as measurements of performance.

Configuration Utilities

Configuration tools will allow the developer to tailor the system to the application's needs.

One set of tools will allow the developer to describe the on-line data input/output into and out of the system. This will include: input sensor configuration, outputs to data base for long term storage, and external process interfaces for input/output.

Another set of tools will allow the developer to configure the various access levels for the end users. The developer will create a hierarchy of information that will be visible at each access level, and will define the degree of control that each access level will have, as described in the end users' view section.

Interface Requirements

Sensor Inputs (Data Collection and Preprocessing)

Figure 35:
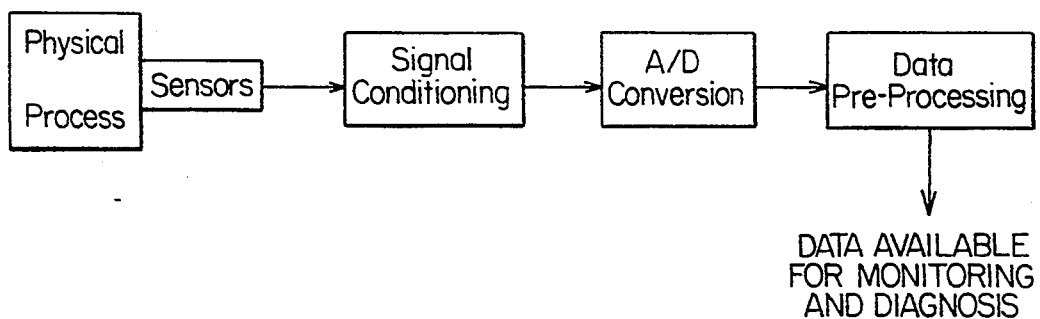
FIG. 35 is a block diagram of a typical data collection and preprocessing system.

FIG. 35 shows a conceptual block diagram of a typical data collection and preprocessing system, also refered to as a data acquisition system. The sensors, signal conditioning and A/D conversion modules are self-explanatory. The data pre-processing module can perform a variety of functions, varying widely from application to application. As a minimum, typically this module performs engineering unit conversions, digital signal processing (e.g., digital filtering, FFT), data archiving, feature extraction and display functions. Data acquisition systems can be stand-alone or integrated systems. In particular in large plants, data acquisition systems are connected by data highways, and are an integral part of a process control system. Accessing sensor information provided by data acquisition systems is an absolute requirement for the domain shell. From the domain shell's point of view the requirement is that sensor data be somehow written into the blackboard, via the control module's communications manager/event detector process, described herein. The issue is how to accomplish this.

The problem is that existing data acquisition systems were certainly not developed with this sort of capability built in. Instead the data is at best available on a data highway, and at worst, it is buried somewhere in the depths of the system. Furthermore, some data acquisition systems can be induced to make their data available to the rest of the world (volunteering data acquisition systems); others have to be interrogated by an outside proces (non-volunteering).

Figure 36:
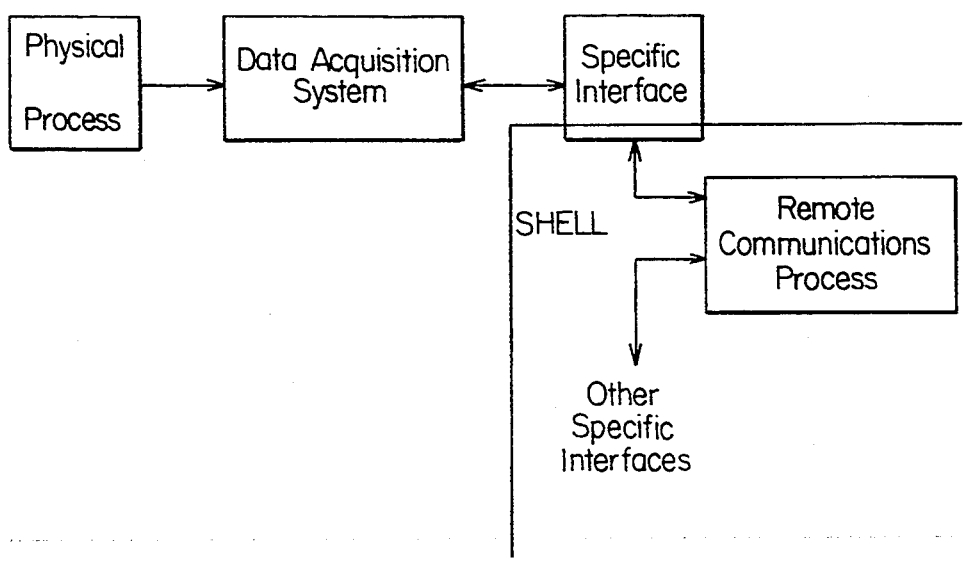
FIG. 36 is a block diagram showing the interface to a data acquisition system.

There is no uniform, generic or universal way to solve the problem of how to access the data. The most promising approach is shown in FIG. 36, where a clear boundary between the domain shell and the data acquisition system is defined. On the boundary is an interface which consists of two parts: one that is specific to each type of data acquisition system, and one that handles communications with the shell. The specific part of the interface is necessary to extract the available data, according to the characteristics of the data acquisition system (e.g., it could be a highway drop, or a small piece of software which knows where the data is kept, or a piece of software monitoring some communications path internal to the data acquisition system.) For non-volunteering types of data acquisition systems, the specific interface should also carry out the required data requests. The communications part of the interface uses a socket mechanism to send this data to a common remote communications process, which is part of the shell, and which is programmed to re-format the data using a protocol stack, and then communicate it to the communications manager/event detector process.

In this manner the problem has been reduced to one of developing a minimum specific interface to each type of data acquisition system.

External Processes

External processes are those which exist outside the immediate scope of the shell. They may include already existing applications which perform tasks of some perceived usefulness to a diagnostic application, or programs that will be developed in the future for purposes unrelated to a diagnostic application, but which can provide it with useful additional functionality. Ability to interface with such external processes is a fundamental requirement of the shell.

Two problems have to be resolved in order to accomplish this requirement: one is related to the transport level, i.e., the necessity of a physical connection augmented with a low-level protocol for message exchange; the other is related to the application level, i.e., the ability to understand the messages, once they have been exchanged. External processes can be divided into two types: those that will run on the same machine as the shell application, and those that will run on other machines.

Interfacing with processes on the same machine presents no particular problem at the transport level. UNIX pipes and streams are sufficient to provide connectivity. Interfacing with processes on other machines is only slightly more complicated, since protocols such as TCP/IP are sufficient, although at later times one may want to take advantage of emerging standards, such as the OSF Distributed Computing Environment, which incorporates TCP/IP, as well as other standards.

The issue of message understanding is a non-trivial one. The OSF standard provides a mechanism for remote procedure calling, which requires both ends of the communications channel to follow the standard. This may be applicable to future external processes, but it leaves the issue of already existing processes. An approach similar to that shown in FIG. 36 for interfacing with data acquisition systems will be implemented. Remote communications processes, as an integral part of the shell, know how to communicate with the shell, and they will exchange messages with specific interfaces, developed for each external process, as needed.

A viable development path thus will involve using the available resources on the HP/Apollo platform, because HP is committed to the OSF standard and will continue to provide support to the existing interfacing mechanisms. It is conceivable that the first few actual applications of the shell will require hand tailoring solutions to the external process problem, until more detailed, real requirements emerge.

A special case of external .process interfacing is when an external process has utility as a knowledge source. In such a case, in addition to solving the communications problem as described above, the application developer will have to define the events, preconditions and priority information, as described herein.

Control Outputs

There will be no control outputs from this shell. However, the issue could be reconsidered in the future, if the need arises.

Knowledge System Architecture

Figure 3:
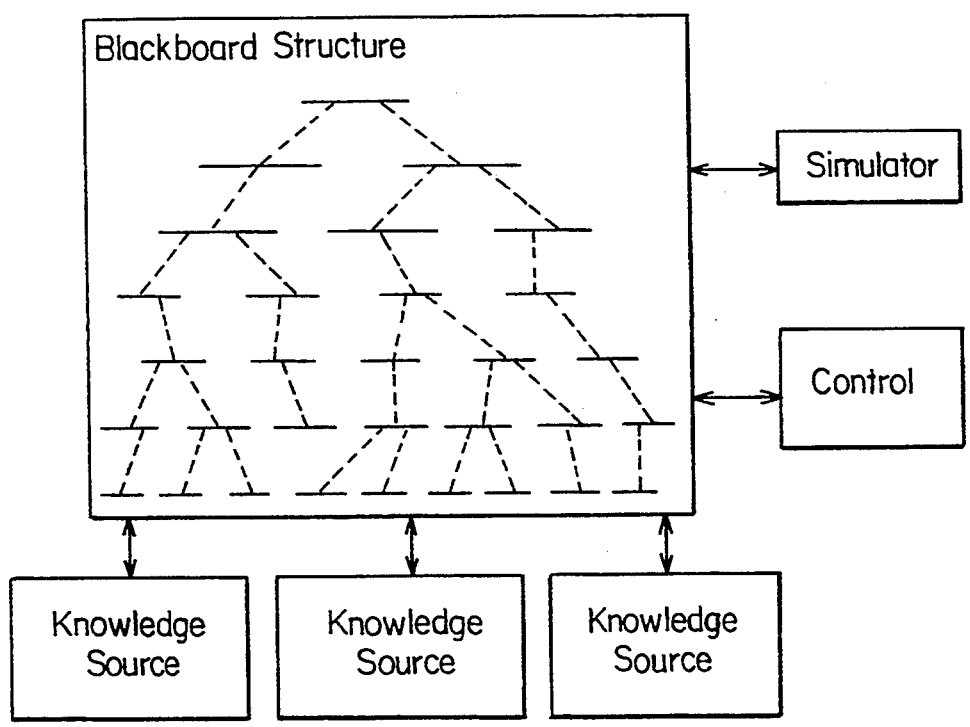
FIG. 3 is a block diagram of the blackboard architecture.

The overall knowledge system architecture has been shown in FIG. 3. It is fundamentally a blackboard architecture in which a variety of knowledge modules (sources) contribute towards a solution. The problem solving strategy is contained in a control module, which determines which knowledge sources contribute and in which order. The state of the "world" (plant) is maintained in a global structure, the blackboard, which is accessible to all components of the knowledge system. The following sections detail each building block, in a manner that stresses the functional requirements that will satisfy the characteristics of the real-time plant diagnostic domain.

The Blackboard

The blackboard is a global data base of objects which form the symbolic representation of a specific application's physical reality. As such, the objects in the blackboard generally correspond to physical objects, and describe the spatial and functional relationships between the physical objects.

Inter-relationships between blackboard objects are established at three different levels: two vertical hierarchies (IS-A and PART-OF) and one horizontal description of connectivity (LINKS). In addition, each object represents the behavior of the corresponding physical object. The totality of these relationships, together with the representation of behavior, allows for the creation of a model of the real world by decomposition into levels of abstraction. The model can be of any degree of complexity, limited only by the amount of knowledge available, by the amount of time spent developing the model, and, of course, by the available computer resources.

Each blackboard object has attributes, and each attribute has one or more values: some attributes are defined to be single valued, others multivalued. All objects begin with approximately the structure shown in FIG. 37.

The IS-A Hierarchy

This relationship partitions the objects into classes, types, etc. The IS-A attribute is multivalued, i.e., an object can belong to more than one class (or be of more than one type). The inverse relationship is HAS-INSTANCE. This attribute is, of course, also multivalued, and it lists all the objects which are instances of the object:

Object A HAS-INSTANCE Object B <=> Object B IS-A Object A

The usefulness of the IS-A hierarchy is in the process of model development. For each application a set of basic objects is developed, which form a basic vocabulary for that application. Each new object then inherits the attributes of its parent(s). The values of the parents' attributes are also inherited. This greatly simplifies the development process, by increasing the efficiency of the developer.

The inheritance mechanism however is not preserved during runtime, as it is an inherently slow process. Instead, each runtime object comes "equipped" with all the attributes and values it needs during execution.

The PART-OF Hierarchy

This relationship is a very simple description of physical structure. It only deals with composition of the objects, but it is sufficient (and necessary) for proper decomposition of complex structures. The PART-OF attribute is single valued, but its inverse, HAS-PARTS, is of course multivalued. It is conceivable that the PART-OF may have to be multivalued also.

The PART-OF hierarchy will be visible to the end user, one level at a time.

Behavior and LINKS

The model is completed by defining the behavior of the objects and the manner in which they are linked. Each object has inputs and outputs. The behavior is defined by specifying a function that represents how outputs are determined by the inputs. The elements of the function are described in the section on the simulator module toolbox. It should be noted that a function attribute need not be defined for every single object in the blackboard. It can be totally omitted, in which case the object cannot be used by model-based knowledge sources, or it can be deferred to lower decompositional levels, e.g., the object's behavior is described by the behavior of its components in the HAS-PART hierarchy.

The linking of objects is done by connecting one object's outputs to other objects' inputs. This is done by the use of LINKS, which themselves are blackboard objects, as shown in FIG. 38. The obvious exceptions are objects at the physical boundary of the system, i.e., where the inputs are entering the system under consideration from the outside world (for example, sensors), and terminus points (for example, shipping room).

Other Attributes

The application developer will have the ability to add other attributes and associated values to any object. Some of these attributes will be required by the knowledge sources, others may be desired simply to complete the "world" model. Note however that new attributes cannot be added at runtime (see next section).

Implementation

Different blackboard implementations will exist during application development and during runtime.

The development process is essentially one which requires a high degree of experimentation, hence a lot of changes. Also it is a process which for the most part is not time and resource critical. During this period, the blackboard will be represented as flexible structures (linked lists, C++ objects, etc.—to be determined during system design).

For runtime purposes the blackboard will be split into two parts: one, containing the data necessary for execution, is compiled into as compact and efficient memory resident structures as possible; the other one, containing information unrelated to performance, stays disk resident. While this will provide maximum performance, both in terms of execution time, and in terms of resource frugality, it will prevent the end user from making dynamic changes to the blackboard structure (attribute values can still be changed, of course).

The runtime blackboard will exist on one machine only, i.e., it cannot be distributed in the memory of different processors. For best performance, it is possible that knowledge sources executing on other CPU's (i.e., not the one containing the memory resident portion of the blackboard) will have to have their own copies of portions of the blackboard. In the future, it is highly probable that very large applications will eventualy require distributing the global blackboard among several machines. Given the difficulty of accomplishing this, it is better to follow an evolutionary path towards such a requirement, should it ever become necessary.

The Control Module

The control module is responsible for coordinating the activities of the shell for the purpose of diagnosing occurring or impending malfunctions. It is the repository of the problem solving strategy needed to accomplish an application's goals. Since different problems require different strategies, the control module will be largely application specific. Nevertheless, given common characteristics of the real-time plant diagnostic domain, several functional requirements can be described and implemented.

General Requirements

The real-time nature of the shell is reflected in the following control module requirements:

speed is the ability to execute a task in a short period of time, and with minimum control overhead responsiveness is the ability to react to changed conditions when the reaction is required timeliness is the ability to reach conclusions (diagnoses, or partial diagnoses) by the time they are needed adaptability is the ability to change strategy as conditions change.

General Characteristics

Speed depends strongly on the individual performance characteristic of each knowledge source. The control module contributes overhead. It is obviously desirable to maintain a small control overhead time to knowledge source execution time ratio. One way to do this is to minimize overhead, but this is only possible up to a point. Increasing the grain size of the knowledge sources is another way. Unfortunately, large grained knowledge sources tend to be unresponsive. This leads to one of the fundamental required characteristics for this system: large knowledge sources should be interruptible.

Interruptibility is also necessary for the adaptability requirement. Since blackboard architectures use essentially event driven mechanisms, it is possible that asynchronous events can change the execution environment (context) to an extent that the currently executing knowledge source is irrelevant or even inappropriate. The control module should be able to abnormally stop the current knowledge source and give control to other knowledge sources.

An aspect of interruptibility appears when asynchronous events change the context such that the currently executing knowledge source is superseded in importance by other knowledge sources. This situation introduces another fundamental required characteristic of this system: knowledge sources should be prioritized. Finally, a knowledge source which was interrupted because of higher priority tasks, may or may not be resumable.

These characteristics can be summed up in one expression: dynamic focus of attention.

Events

The fundamental aspect of the control mechanism is that it is strictly event driven. It has two modes of operation:

1. Under normal conditions, it is purely on-line, sensor data driven. The events that trigger the execution of the knowledge sources are simply the receiving of sensor data. The main characteristic of this mode is that no malfunctions are detected, i.e., everything is "normal", and no interaction is required with the end user. The control module basically allows the knowledge sources to execute in sequential fashion, without interruption, until.

2. ... asynchronous events take place which require immediate attention. Such events can be on-line generated, by sensor values leaving pre-defined normal ranges, or they can be the result of executing a knowledge source, or they can be end user generated, by specific requests for focus of attention. There may be yet other ways to generate events.

A special type of event is expiration of time. The system clock tick is a periodic data point.

Control Architecture

Figure 39:
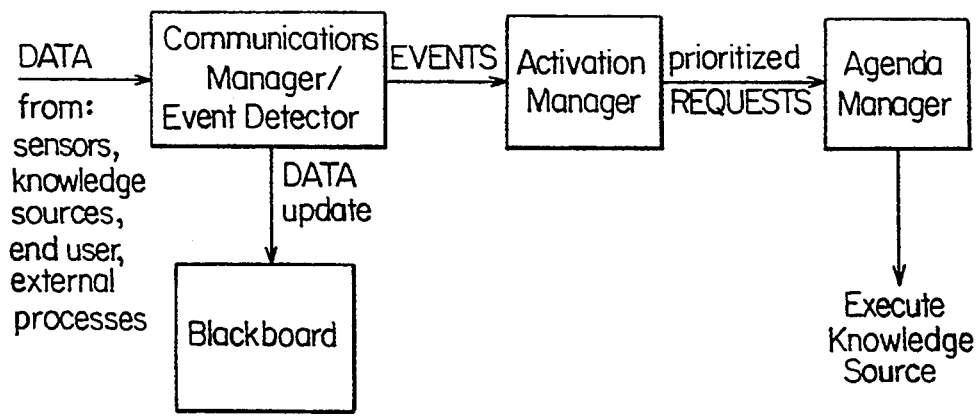
FIG. 39 is a block diagram of a blackboard control module.

Blackboard control mechanisms generally consist of the continuous repetition of a four step cycle:
 trigger
 precondition check
 schedule, and
 execute The block diagram in FIG. 39 shows an approach that closely matches these steps, while also showing some differences. Each module is described next.

The communications manager/event detector is similar, but not identical to the trigger mechanism found in common blackboard control. It performs the dual role of carrying out communications with sources of data, and determining if the incoming data forms an event. Data may originate external to the system, in which case the communications manager receives it from the I/O interfaces (discussed in the Interface Requirements section), or from local sources (knowledge sources, the user interface, or the system clock). In any case, once the data is received, it is written on the blackboard, if appropriate, and tested for event generation. The results of this last step are passed on to the next module.

The activation manager plays the role of the precondition check. In many applications of blackboard architectures this is a rather time consuming task, generating high overhead. A simple approach is necessary for improved system performance. A two-step method suggests itself: first use look-up tables to find the knowledge source(s) affected by the incoming event, and extract (from the table) its self-selecting precondition; second execute the precondition. If true, determine the task's priority and place the KSAR (Knowledge Source Activation Request/Record) onto the next module's agenda.

The agenda manager is the basic-scheduler, but it does more than just schedule the next knowledge source to execute: it also determines if the currently executing knowledge source should be interrupted (if it is interruptible), determines if it is resumable, in which case it is only suspended (and rescheduled for continuation), etc. Note that this module is not a full-blown agenda-based multi-tasking controller, but rather it only implements the specific required characteristics for this domain shell, as discussed here.

Implementation

As stated earlier, the control mechanism is largely application specific. While the architecture described above is quite general in nature, the tasks carried out by the various modules may contain numerous elements that are application specific. As always in this type of situations, an approach that uses a mix of procedural and declarative methods is most appropriate.

In particular, the event detector is highly specific to each application. A declarative syntax (rules) could be used to allow the application developer to tailor this module to each application. Typical examples of declarative descriptions are "whenever" and "every <time interval>" rules. On the other hand, a procedural component will inevitably be needed and has to be taken into account. The other two modules, the activation and the agenda managers, are purely procedural, since the approach described in the previous section is believed to apply accross all applications in the domain considered here.

Another implementation aspect is related to the partitioning of the modules shown in FIG. 39 into executable processes. Since incoming data arrives asynchronously, the communications manager/event detector module must form a process by itself. The other two modules could form one process, activated by the detection of an event. The execution of a knowledge source obviously forms a separate process.

Knowledge Sources

Knowledge sources are the actual repositories of domain knowledge in a blackboard architecture. This section details some general characteristics of knowledge sources, after which 2 different classes of knowledge sources are examined in some detail. For the first class, rule-based, two different ways to use them are described, essentially giving two types of rule-based knowledge sources. For the other class, case-based, one type is described. More classes, and more types for any class can be added, as long as the knowledge sources satisfy the interaction requirements with the control module and with the blackboard itself.

General Characteristics

In the most general terms, a knowledge source can be thought of as a very large rule:

IF (precondition) THEN (execute body of knowledge source).

Thus, in order to execute, a knowledge source must first meet a set of preconditions. These preconditions must be defined a priori. In many typical blackboard applications, each control cycle begins by checking each knowledge source's preconditions. This is a very inefficient approach. Since our domain shell is strictly an event driven one, a further prerequisite must also be defined a priori: a list of events that will trigger the checking of the preconditions.

The size of a knowledge source is unconstrained. As mentioned earlier in this document, very small knowledge sources execute very fast, but lead to poor control overhead to execution time ratios. Large knowledge sources improve this ratio, but lead to unresponsive characteristics. Since large size cannot be precluded, knowledge sources must be further characterized as interruptible and resumable. Interruptible knowledge sources have to make known to the agenda manager the conditions which must be occurring in order to be interrupted, and the conditions for it to resume. Both actions thus can be related to task priority or changing context.

Knowledge sources reason about the state of the "world", which is represented by the global data structures of the blackboard. As such, every knowledge source has direct read access to any data on the blackboard. All knowledge sources also have write access to the blackboard. This however is indirect, being done by the communications manager/event detector component of the control module. This is a necessary modification of the standard blackboard architecture, caused by the nature of the domain: one knowledge source may generate hypotheses which are triggering events for other knowledge sources. Since knowledge sources are independent of each other, a clearinghouse is needed to mediate these situations.

Furthermore, since knowledge sources may generate competing hypotheses, they must not obliterate each other. Hence, care needs to be used in developing the blackboard, such that the sources of hypotheses are recorded and further reasoning about the hypotheses can be carried out by yet other knowledge sources. Each knowledge source in turn may have to keep its own copy of some portion of the state of the "world", necessary to provide continuity in the next iteration.

As a general philosophy, a knowledge source should have to reason at a single level of abstraction (i.e., no vertical crossing in the HAS-PART hierarchy), and on a reasonable sized slice of the horizontal component of the hierarchy. On the other hand, there should be nothing to preclude it from doing otherwise.

The following subsections deal with the types of knowledge sources, solely from the point of view of the body that is executed.

Rule-Based

Rule-based knowledge sources implement rules of the IF ... THEN ... form. In most rule-based systems the rules are designed to reflect human heuristic knowledge (rules of thumb). That is also the case here, although there are no restrictions: any "chunk" of knowledge that can be represented as an IF ... THEN statement is allowed.

Rule-based systems can be organized as production systems, where each rule is an independent chunk of knowledge (example: OPS5), or the rules can be organized as trees, with definite beginning and terminus points. The latter approach is used here. The beginning points are those where data comes into the system, and the terminus points are the conclusions reached after all the rules have fired. Normally, the terminus points correspond to malfunctions in the real world.

Rule-based systems can be forward chaining (data driven), or backward chaining (hypothesis driven). To date, only the forward chaining paradigm has been implemented.

The following description of the rule-based knowledge source functional requirements is largely based on already existing systems currently in use within Westinghouse. It is not a complete description, but rather an outline of the principal requirements. Furthermore, the "as-is" use of the existing systems is precluded, at least partly, because of the use of the blackboard framework, into which the rule-based knowledge sources must fit.

Rule Base Tree Structure

The basic element of the rule base is, of course, the rule. In its simplest form, a rule is defined as follows:

IF (evidence-expression) THEN (hypotheses/actions)

The components of the evidence expression and the hypotheses corespond to nodes in a tree structure. The rules themselves are implemented as frames which describe directed links from one or more nodes in the left hand side, to one or more nodes on the right hand side. The right hand side can also incorporate actions which do not correspond to actual nodes in the tree.

The first layer of nodes are data nodes, i.e., the entry points of external information into the rule base (usually from sensors). Similarly, the last layer corresponds to terminus points: partial or final diagnostics. All intermediate layers of nodes represent hypotheses: intermediate steps in the reasoning process being represented. The first and last layers must have matching attributes in blackboard objects. The intermediate layers may also map into blackboard objects, but they don't have to.

In addition to the nodes described above, other nodes may be necessary to hold values of variables. These values, as well as the values in the data nodes, are time stamped, and have expiration times.

Each node in the tree has associated with it a confidence level CF, a measure of belief MB and a measure of disbelief MD. The relationship between them is:

$$CF = MB - MD$$

If MBs and MDs range from 0 (total lack of belief, or disbelief, respectively) to 1 (full belief, or disbelief), then the CFs range from $-1$ (absolute confidence in the falsity of the node) to $+1$ (absolute confidence in the truth of the node). Nodes start with all CFs, MBs and MDs set to zero. The values are then updated by the inference mechanism, described later in this section.

Rules have similar measures of belief, named sufficiency and necessity factors (SF and NF). Sufficiency represents the degree to which the truth of the evidence (left hand side) influences the hypothesis (right hand side), i.e., sufficiency is a measure of belief in the truth of the rule itself. Necessity is a reflection of the influence of false evidence on the falsity of the hypothesis: how necessary is that the evidence be true, for the hypothesis to be true. Unlike measures of belief associated with nodes, the sufficiency and necessity factors are a priori measures, defined by the application developer and domain expert.

Inference Mechanism

The basic inference process consists of belief calculation. In principle, a rule fires when its left hand side is true to some predetermined degree. Then the truth value of the evidence is combined with the belief in the rule itself (sufficiency, SF, or necessity, NF) and the result is used as the truth value of the rule's hypothesis. The combining algorithm is as follows:

if $CF(evidence) > 0$ then $MB(hypothesis) = SF * CF(evidence)$, and $MD(hypothesis) =$ unchanged if $CF(evidence) < 0$ then $MD(hypothesis) + NF * -CF(evidence)$, and $MB(hypothesis) =$ unchanged When more than one rule have the same hypothesis, then its truth value is incrementally updated by using union update rules from probability (add the individual contributions, and subtract their product).

Forward chaining is the normal mode of operation. It begins by extraction of the values for data nodes from the corresponding blackboard objects (usually sensor readings). The values are mapped into beliefs that readings are high, low, etc. Belief is then propagated throughout the rule network (tree), until no rules are left to be fired. The number of rules that fires depends on the degree of evidence truth required to activate the rules. A very narrow margin (for example, "only fire rules whose CF is greater than 0.8") will reduce the number of firings, and improve speed. On the other hand, diagnostics may be missed because relatively small contributions to incremental updates are neglected. An increased margin will increase the number of rules fired. The margins can be set separately for each rule, leading to a modified alpha-beta search method, totally under the control of the application developer.

A notable aspect of the inference mechanism is that rules can be written that dynamically, at runtime, modify the rule base itself. A typical use of this feature is to diagnose the trustworthiness of the input data itself (i.e., to determine if sensors are deteriorating or malfunctioning). If the belief in the input data is found to be less than satisfactory, the belief levels can be decreased accordingly, thereby providing for graceful performance degradation, rather than collapse. Another use of this feature may be for implementing a course of action when values have expired and new ones are not available.

Evidence Expressions

In order to propagate belief a rule needs the truth level of the evidence expression. The left hand side expression is defined as follows:

(evidence-expression)=(<operator>
    <argument1> ... <argumentN>)

Expressions can be written in prefix or infix notation, using parentheses. All expressions evaluate to a truth value (confidence level). Evidence expressions can be of any complexity, as long as the data types returned by nested operators match the required argument types. Operators are of several types:

algebraic: add, diff, times, divide, minus, abs, sin, cos, tan
asin, acos, atan exp, log, sqrt,
    avg, min, max, std-dev
boolean: fuzzy and, fuzzy or, weighted and, weighted or, not,
comparative booleans (less,
    equal, greater)
time-based: trend, average-trend, time-average, time-min,
time-max, time-min-t,
time-max-t, time-std-dev, integrate
change-based: time-when, value-when Arguments can also be of several types:
constants
values (of a variable)
confidence levels (of nodes)
functions that return one of the above
other expressions (recursive)

Boolean operators are the ones that are used in the actual belief propagation process. They combine the confidence levels of their arguments into new confidence levels, or, in the case of the comparative booleans, they calculate a confidence level in the truth of the comparison. The combining formulas are as follows:

fuzzy and: $CF(A$ and $B) = min(CF(A), CF(B))$
fuzzy or: $CF(A$ or $B) = max(CF(A), CF(B))$
weighted and: $CF(A$ and $B) = (CF(A)*W(A) + CF(B)*W(B))/(W(A) + W(B))$
weighted or: $CF(A$ or $B) = max(CF(A)*W(A), CF(B)*W(B))$
not: $CF(not\ A) = - CF(A)$ Comparative booleans can be strict comparisons, returning beliefs of $+1$, or $-1$, or they can use a mapping function to give a degree of fuzziness to the comparison. Algebraic operators take arguments that evaluate to numbers, and return numbers.

Time-based operators incorporate the concept of time into the rule base. One of the arguments to these functions is always a time variable, usually specifying a time interval. For example, the time-min operator will find the minimum of a node's value over a specified interval of time. Similarly, the time-min-t operator will return the time when the minimum node value occured. A side effect of using a time-based operator in a rule is that the system will automatically make sure that a history of sufficient length is kept. Limitations have to be enforced however, to prevent rules that refer to very old data (e.g., weeks, months) from turning the rule base into a data base. The automatic storage limits could be defined by the application developer either in terms of time (e.g., don't save data older than three days), or in terms of storage requirements (e.g., don't use more than 100 Kbytes of storage). Data base long term storage is then used to provide the appropriate information.

Change-based operators are similar to time-based operators except that they do not trigger data storage. Instead they record the most recent time of occurrence, or a value at the most recent time of occurrence of a specific change. A change is defined as the transition of some expression's truth value from true to false or vice-versa.

A mechanism exists for the application developer to define more operators. Within some constraints, this can be done in a declarative style, otherwise it requires programming.

Other Requirements

Contexts are provided to give the application developer some degree of control over the execution of rules. Specifically, by associating groups of rules with contexts, the developer can force the sequential execution of such groups of rules. This improves the efficiency of the inferencing process. A typical example would be a case where a machine has several modes of operation, each characterized by a different set of rules. The context mechanism then makes sure that only the rules corresponding to the current mode are fired. In a blackboard architecture this feature is not so important, because modes (contexts) could be associated with different knowledge sources. On the other hand, there are at least two situations where contexts may be useful: when sensors have to be diagnosed, and value expiration times have to be checked before executing the rest of the rules. Thus, three different default contexts are provided: "diagnose-sensors", "check-expiration-times", and "normal".

Procedures are provided for situations where not all the necessary information is available on-line. In many cases, rules using strictly on-line sensor information are unable to distinguish between competing hypotheses. A procedure to perform, by hand, a sequence of operations by the end user, can be requested. The result of the procedure is then automatically used by the rule base to refute or reinforce hypotheses.

Generic rules are rules of the form "for all . . . if . . . then . . . " In most systems, these types of rules are instantiated dynamically, at runtime. This is not always a good idea, because of the overhead involved. In particular, in a real-time system, these rules should be instantiated during rule base development. Doing so also presents the substantial advantage that, after instantiation, the application developer can edit the instances, as slight differences between them may be desired. Furthermore, static instantiation allows deletion of instances, the equivalent of "for all . . . except . . . " type rules, which are common, yet few systems provides them.

Priority and Severity are parameters associated with diagnoses. They are needed to distinguish between malfunctions with high confidence levels. A broken thermocouple, CF of 1, and a broken bearing, CF of 0.9, certainly do not have the same priority, in terms of requiring attention. A severity measure is also required to account for the fact that a maximum confidence level can be reached a long time before a malfunction becomes critical. In the example above, a bearing may be broken for a long time before a shaft breaks, hence a bearing broken for several hours is a more severe malfunction than one broken for a few seconds. Severity also comes into play when values continue to change. For example, some high temperature may lead to a malfunction with a CF of 1; as the temperature continues to increase, the severity of the malfunction increases too, while its CF cannot exceed 1.

Actions are associated with the right hand side of rules. The common action, already discussed, but not named, is update-hypothesis-belief. In addition, a variety of other actions can be performed when rules fire. Most of them are related to updates of the end user displays. For example, colors and numbers can be changed, new displays opened, etc. A very useful action is the display of messages. These are free-form text that is displayed to the end user when certain events occur. Typically, they are associated with a node's confidence level falling within a predefined range.

Case-Based

Figure 40:
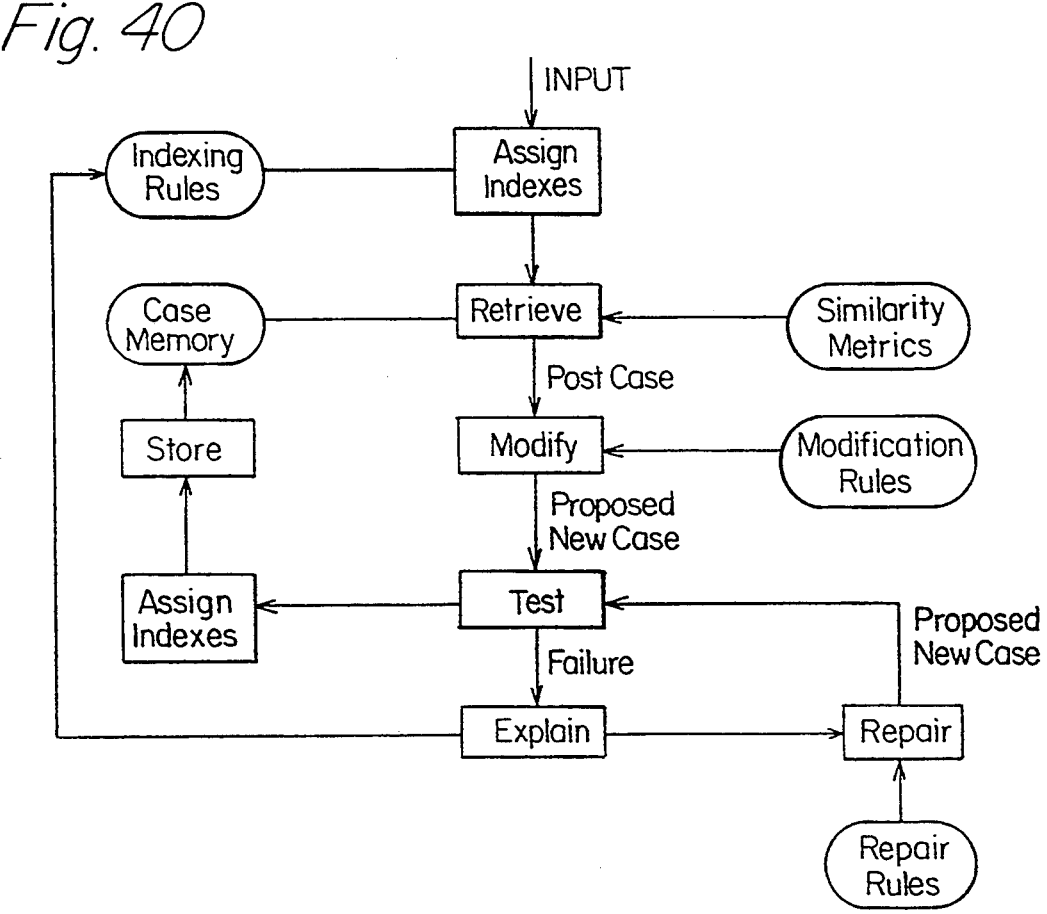
FIG. 40 is a flow chart of a case-based reasoning process.

Case-based reasoning is a full fledged area of research in the field of Artificial Intelligence, concerned with the theory of human cognition. It addresses issues of memory, learning, planning and problem solving. Its practical goal, as reflected in the various attempts at developing case-based reasoning systems, is the automated interpretation and learning of events. The approach is illustrated in the flowchart of FIG. 40. Very briefly, the following steps are required by a full implementation of case-based reasoning:

1. Features of a new event are assigned as characteristic indexes.
2. The indexes are used to retrieve similar past cases.
3. An old case is modified to better conform to the new event.
4. The new case is tested.
5. If the test succeeds, indexes are assigned and the new case is added to memory.
6. If the test fails, the failure is explained, the new case is repaired and tested again.

As seen in FIG. 40, there are 5 types of knowledge required for such an implementation: indexing rules, similarity metrics, modification rules, repair rules, and the case memory itself.

While research is proceeding in the academic world, a partial implementation of these concepts is attempted here. In particular, automated modification and repair are not implemented, since these concepts require more research (i.e., they don't work too well). A simple, straightforward approach will be used instead, which has been used successfully before (see elsewhere in this document for an example application). In this approach, modification and repair are left as the responsibility of the system user(s). Indexing is also partially the responsibility of the user(s), in that the definition of a case requires the definition of the variables (features) that make up the case. Since this approach can not be considered a full application of case-based reasoning, the term case-based diagnostics will be used.

The body of a case-based knowledge source consists then of a collection of previously stored cases (knowledge base), and an algorithm which can rank them by "closeness" to a given situation (inference engine).

Figure 41:
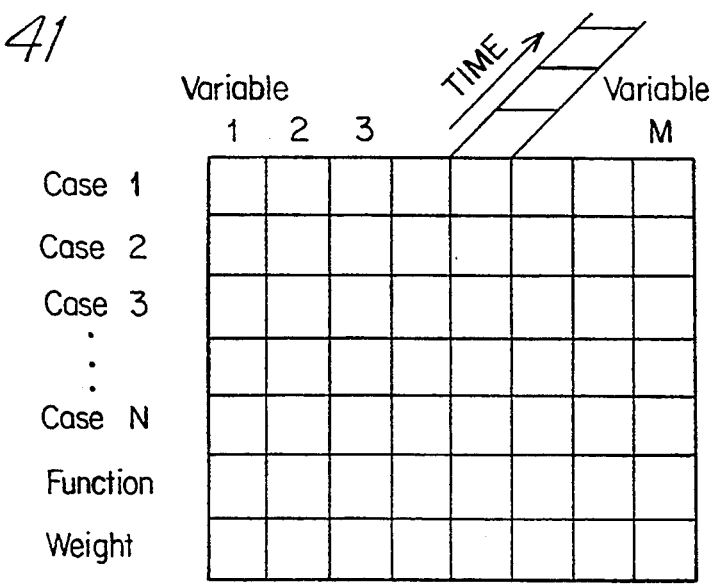
FIG. 41 is a case-based diagnostics table.
Figure 42:
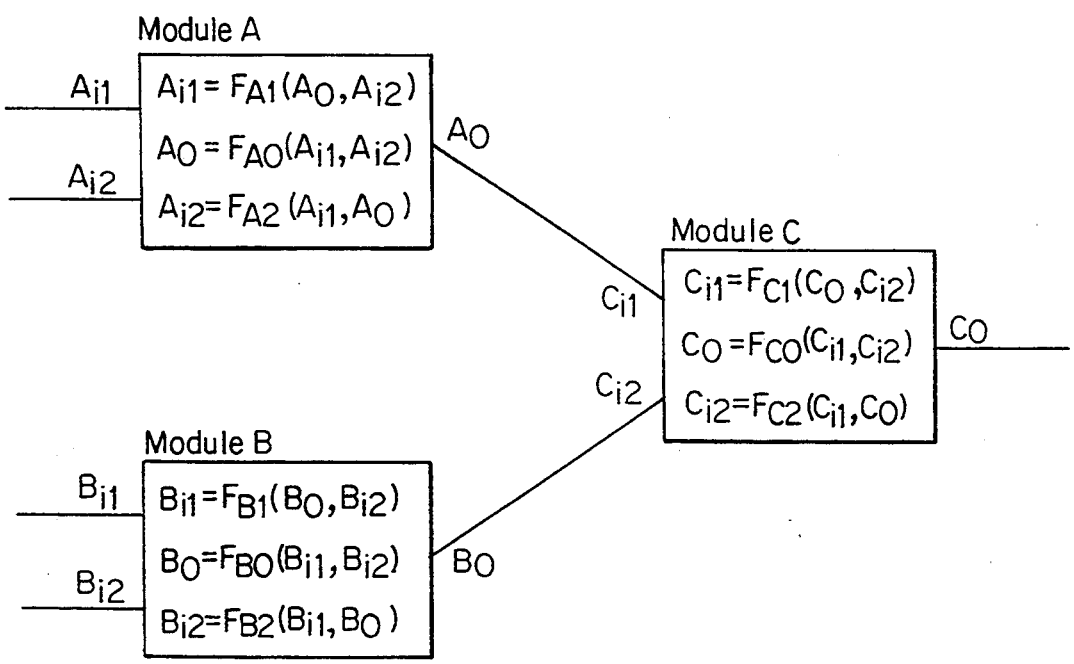
FIG. 42 is a diagram of a simple example of model-based reasoning.

Each case in a knowledge source is an instantiation of a generic case frame which is defined by the application developer. A frame can have any number of variables. An instance (case) is obtained by assigning values to the variables. Since, within a knowledge source all cases are defined to be instances of the same frame, a tabular method of storage lends itself as the method of choice for case memory. In addition, the concept of time must be represented. One way of doing this is by using a table, as shown in FIG. 41. Each row in the table corresponds to one case frame. Columns correspond to variables whose values form a case. Any variable can have a third dimension, time. A case's historical values are stored along this dimension. These values are matched against current historical values by a similarity measuring algorithm. If a variable doesn't have a third dimension, it is assumed that similarity is measured against the current value of the variable, and no history is kept.

In addition to this information, FIG. 41 shows that each variable var will have a function f and a weight w attached to it. A similarity measurement (matching) algorithm would calculate a similarity value as follows:

$$\text{Similarity Value} = F(w_i, f(var_i(t)))$$

The matching functions F and f can be used in principle to perform various weighted "fuzzy" and exact operations (i.e., comparisons) or a combination of both. Ideas for matching formulas can be found in pattern recognition, fuzzy logic, or they can be ad-hoc. A library of such functions will be provided; others may have to be added by the user.

In general, the storing of new cases can be automatic, or under end user control. For the purpose of this work, the storing of new cases will be manual. In some applications, if an algorithm that measures the "interestingness" or the "utility" of a new case can easily be defined, an automated approach could be considered. Utility measures, such as the number of times a case has been used, can also be used to determine less useful cases, which can then be replaced by new ones, after some pre-defined storage limit is exceeded.

Implementation

The way knowledge sources are used during runtime is strictly dependent on the control module. Nevertheless, it is reasonable to make the following practical assumption: some knowledge sources will have to be able to execute in true real-time, others will not be able to. This leads to a decomposition of the diagnosis process into two levels: one that is purely on-line and real-time, and one which is essentially off-line, and which usually involves some sort of end user interaction.

The on-line knowledge sources will generally be data driven, the data will come from sensors, and will have no end user interaction. Of the various types discussed above, the rule-based forward chaining, and perhaps some case-based knowledge sources, will belong to this category. A great deal of attention must be paid to improving the real-time (speed) performance of these knowledge sources. For example, compilers will convert the rule networks, and the case tables into compact and efficient memory resident data structures.

The off-line knowledge sources, will take over where the other ones stop: they can examine the problem in much greater level of detail, but they require potentially long periods of time to do so, since they usually involve elaborate searches through vast problem spaces. Included in this category will be case-based knowledge sources which have very large case memories, hence potentially long search times, and end user controlled backward chaining rule-based modules (that we developed outside of the domain shell).

Hardware/Software Specification

The technological advance that the domain shell will be based on is the application of the blackboard approach in a true real-time environment.

From a software engineering standpoint, this system continues the trend in expert system technology of development and operation on industrial standard machines, using widely understood and accepted programming languages and engineering concepts.

Computers

For the hardware environment, the Hewlett-Packard/Apollo workstation, HP 9000, Series 700, will be used as the host for the software system. Both the application development environment and the execution environment shall operate on this platform. However, the scope of the software system includes the capability of communication with external processes. For these processes, any platform that can maintain communication with the domain shell may be connected as well. This ensures the widest compatibility with current and future platforms.

Programming Language Issues

As mentioned in the introduction, the use of expert systems has been growing in the plant environment. Historically, expert systems had been developed using languages such as LISP because of advantages in knowledge representation. However, LISP is not an efficient language from an execution speed perspective. Therefore, early expert systems were limited to user interactive question and answer type environments, where there are no critical speed constraints. To improve performance, specialized LISP machines were developed. Using one of these machines for a real-time system is currently not a viable approach. Because of the inherent time dependencies of the environment, it is necessary to create faster systems. Thus, the domain shell specified here will be implemented using C and/or C++. Only through this change can expert systems operate quickly enough in a real-time manner.

Portability will be maximized by the use of languages complying with the ANSI standard (i.e., ANSI-C).

Overview

Figure 44:
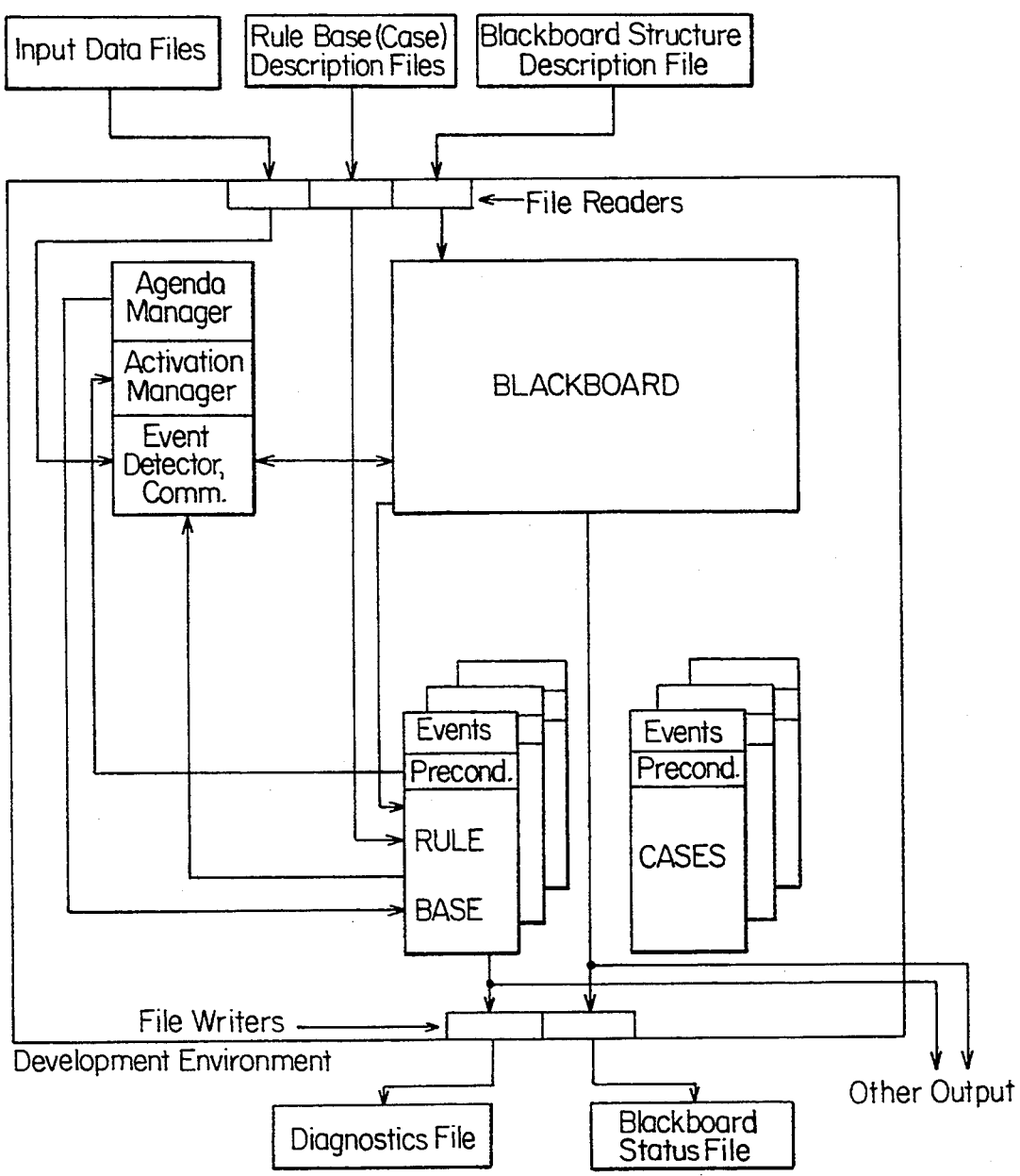
FIG. 44 is a detailed system prototype block diagram.

FIG. 43 shows a detailed conceptual block diagram of overall system operation with further details shown in FIG. 44.

Input/Output Files

There will be three types of input files:

Blackboard Structure Description File. This file will contain information necessary to construct the blackboard structures. The information will consist basically of object names, and attribute/value(s) pairs for each object.

Rule-Base Description File. This file will enumerate the rules which form the body of a rule-based knowledge source. There will be one file for each rule-based knowledge source. Each file will also contain a descriptor of the knowledge sources' triggering event(s) and preconditions.

Case Description File. This file will be similar to the Rule-Base Description File, except that it will enumerate the cases which form the body of a case-based knowledge source. There will be one file for each case-based knowledge source. Each file will also contain a descriptor of the knowledge sources' triggering event(s) and preconditions.

Input Data File. This file will be used to enter simulated data sets. Each set will consist of a time stamp, and a list of sensor name/sensor value pairs. The data will cause a continuous series of diagnostic cycles, which stops at the end of the file.

For each Input Data File, the system will create two output files:

In addition, this file will contain a sorted list of cases. Each list element will consist of:
case rank number
similarity metric value
case name
originating knowledge source Blackboard Status File. This file will contain the same information as the Blackboard Structure Description File, except it will contain values modified by the execution of the knowledge sources. The file can be used in subsequent execution cycles as a Blackboard Structure Definition File.

The exact syntax of the input/output files will be determined as part of the system design task.

User Interface

A very simple user interface will be provided. After starting the system, the following steps will take place:

1. get Blackboard Structure Description File name; check for file's existence.
2. get knowledge source file name.

3. repeat step 2 until user says that there are no more knowledge sources.
4. begin loading files; check syntax—if error found, display message and stop.
5. ask user to set execution parameters (step, trace, breakpoint, etc.).
6. get data file name.
7. load data; check syntax—if error found, display message and stop.
8. a. execute diagnostics according to the parameters set in step 5.
   b. perform other output.
9. write output files (use the same name as input file, but with extension .OUT)
10. present option to change parameters, reset system.
11. repeat steps 6 through 10 until user decides to stop.

Step 8.b is necessary in order to provide further demonstration of system capabilities. The receiving software of the other output will be developed by Mitsubishi. The exact nature and format of the information, as well as the means of communications will be determined at a later time.

The Blackboard

The blackboard will consist of objects (frames) as shown in FIG. 37. In addition to the attribute/value pairs shown in FIG. 37, blackboard objects can have any other attribute/value pairs. For the prototype, the usefulness of the IS-A and PART-OF hierarchies, and of the LINK connectivity descriptions is less important than the requirement that objects have attributes which are used by the knowledge sources. For example, if reference is made in a rule or a case to some physical object's temperature, then the frame that is the symbolic representation of the physical object must have a temperature attribute. This attribute will be used to store the temperature value, including its history, if needed.

The Control Module

Referring to FIG. 39, the control module consists of three main components: the communication manager/event detector, the activation manager and the agenda manager. These could be implemented to the extent necessary to allow operation of the system in the development environment.

The event detector will generate events using event forms taken from a small procedural library of event types, such as sensors going out of range or knowledge source generated events. Asynchronous events will be simulated by the presence in the Input Data File of data values that satisfy the corresponding event definitions from the rule-based or case-based description files. Asynchronous events will also be simulated by rule-based knowledge sources by using a predefined action in the right hand side of rules, generate-event.

The activation manager and agenda manager will together act as a first-in-first-out (FIFO) queue, which will permit system operation when knowledge source preconditions are met.

Knowledge Sources

As stated earlier in this document, only a limited form of triggering knowledge sources will be implemented. Furthermore, only two types will be implemented: rule-based and case-based. These two types are further discussed below.

Rule-Based

The rule-based knowledge source framework will be implemented essentially as described herein. Thus, rule-based knowledge sources will show the following functionality:

Rule base tree structure, exactly as described herein: nodes will have confidence factors, rules will have a priori sufficiency factors and necessity factors.

Inference mechanisms, as described herein, fully implementing a forward chaining mode of operation which will include pruning of the search tree by means of alpha-beta cutoff values. Self modifying features (meta-rules) will be implemented to change context and rule SF's and NF's.

Evidence expressions, as described herein will be implemented. In addition to the operators described in the referenced section, a small number of new operators will be added if required by the first application of the shell. User defined operators will not be implemented for the prototype.

Other requirements: Two contexts will be provided: "diagnose-sensors" and "normal". Procedures will not be implemented since they require a user interface. However, a method for displaying diagnostic information will be determined at a later time. Generic rules will not be implemented for the prototype. Priority and severity will be fully implemented. Actions for the right hand side of rules will be the main mechanism for outputting information for the Mitsubishi developed user interface. The nature and format of the information, as well as the means of communication will be determined at a later time. In addition, a generate-event action will be provided to simulate asynchronous events.

Rule macros will not be implemented for the prototype.

Case-Based

A tabular form for storage of relevant parameter values for a set of cased will be developed. This form will allow sufficient speed, for a reasonably sized case memory, to operate in real-time. Similarity measures will be calculated procedurally. The individual data slots will have limited time dependency to show real-time functionality.

Figure 45:
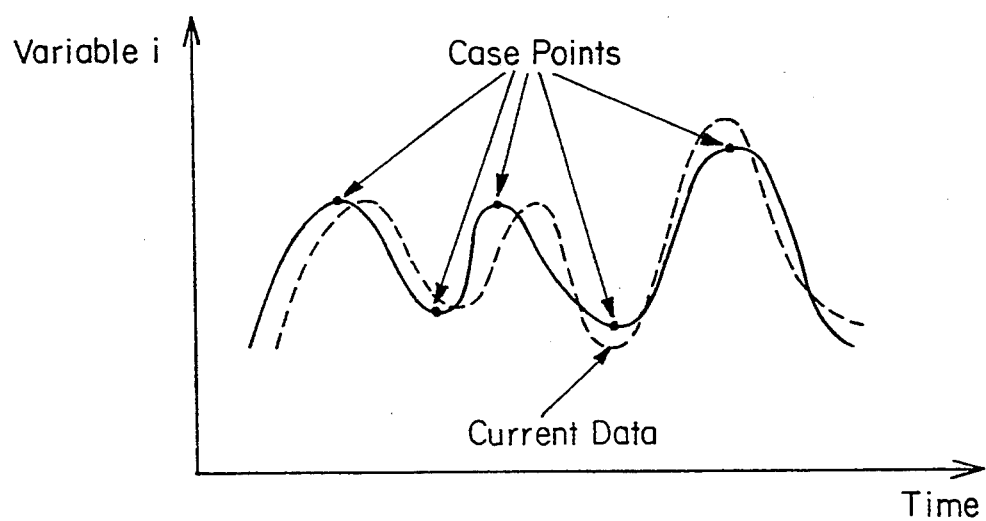
FIG. 45 is a time curve for case-based diagnostics.

FIG. 41 shows a representation of a knowledge source's case memory. For each case composed of variables vari, the similarity measure will be calculated. Four functions f will be provided in the prototype: equal, less-than, greater-than, and match-points-on-curve. This last function will demonstrate the functionality of matching selected points on a time curve with current historical points, as shown in FIG. 45.

Performance Measurements

Of particular significance is the fact that the structures that form the components' frameworks will not be compiled. Performance and resource utilization will be relevant only to this context.

It is expected that performance and resource utilization will be greatly improved for the runtime environment.

Shell Applicability

The intended area of application is the plant environment. Two principal characteristics of such environments are specifically being addressed by the design of the shell:

Complexity of most plant environments limits the ability to develop comprehensive plant models. The use of computer technology is present in a fragmented manner, related to the availability of knowledge about particular areas of the plant. This knowledge exists in different forms, ranging from analytical models to heuristics. The shell's ability to integrate different knowledge paradigms is an attempt to tackle the complexity problem.

Real-time operation is an aspect that arises due to the dynamic nature of plant operation. The shell's ability to incorporate the concept of time, as well as its high performance are the means by which a well developed application can provide its end-users with time relevant information.

To identify specific areas of applicability of the shell is quite difficult. This is because the shell is intentionally designed to provide flexibility in a manner that would make it easily adaptable to different complex and real-time domains. The question of applicability can be viewed in two different ways: if the shell is considered on a strict as-is basis, then the applicability is limited by the existing functionality. The application developer would have to match the capabilities of the shell to the requirements of the problem, and he would have to make sure that problems are not tackled which require features that the shell does not have. This approach is not the way the shell was meant to be used.

On the other hand, if it is recognized that, in the real world, all applications require some amount of application specific development, then the applicability of the shell is greatly extended. The software is designed with extensibility as a goal. The ability to integrate different paradigms is made even more powerful by the relative ease with which the shell can make use of external programs, and by the relative ease with which new paradigms can be added. Similarly, the ability to tailor the end-users' interface adds to the flexibility discussed here.

To summarize then, the applicability of the shell is limited only by the amount of effort that goes into an application. By its very design, the shell allows the addition of new paradigms, should the existing ones be inadequate for handling the problem at hand, and it allows the addition of new functionality without requiring basic software re-writes.

Functions

The shell's main functions are monitoring and diagnosis. Monitoring is the ability to receive and display information in a manner that is useful to the user.

Diagnosis is the ability to identify the cause of existing or impending malfunctions. From the application developer's point of view, the shell also has an application development function. This function gives the developer the necessary tools which are used to define the way the other two functions will be performed for the end-user.

From the end-user's point of view, the shell's main function is one of information display. The displayed information can be primary data (received from outside the shell), secondary data (resulting from numerical processing of primary data), or results of diagnostic processes (a special case of secondary data). Given the importance of the way data is presented, the shell gives the application developer a variety of ways in which to organize the display of both monitored information and the results of diagnostics.

The shell is not intended to have a data acquisition function. Rather, it is expected that various means of connectivity are used to access data collected by systems external to the shell. The intended audience for this section is the application developer. The material in this section is oriented toward helping the developers carry out their tasks.

It provides background on the principles of operation of the shell during runtime. Understanding the concepts explained in the section is an absolute prerequisite to any development effort. This is also required reading before starting development. The information in this section is general background material, as it gives an overview of the application development process, in terms of terminology, basic resources, how to get started, and various notes and guidelines.

This section also covers the various editing tools available for the creation and modification of the main components of an application: blackboard, control, rule-based knowledge source, case-based knowledge source, and the end-user interface.

It also describes the means available to the software developer to test the application, in part or in whole, before deployment. Other parts of this document describe the various procedural functions, such as operators and actions that are available and used throughout the shell. They are grouped separately because more functions can, and should be added by developers.

Principles of Operation

This section describes the principles of operation of the shell. More precisely, it presents the concepts which are reflected by the shell software. Understanding of the material in this section is a requirement for the application developer. On the other hand, full understanding of these concepts is not required of the end-users, although selected parts may be useful, in particular regarding the diagnostic functions.

This section has two parts: first is a very broad overview of the basic architecture of the shell. Next, its main components are described in sufficient level of detail to allow the application developers to carry out their tasks.

Basic Architecture

The basic design of the shell implements a blackboard architecture, in which all subsystems revolve around a common data base of information, the blackboard. This architecture is implemented in two versions: the runtime software, and the development environment. The runtime software consists of several modules:

The end-user interface implements the monitoring functions of the shell. It provides the, end-users with the ability to view information in a variety of ways: graphics, such as drawings, or digitized pictures, graphs and tables of data, etc. The information is hierarchically organized; the interface allows the end-users to navigate via choice menus (pop-up and pull-down) and hot-spots, which are portions of a graphical display that are linked to other displays. In addition, the end-users can provide information back to the rest of the system, via dialog windows; or they can receive messages via message windows.

The control software determines the activities taking place during execution, andtherefore its principal role is to implement the problem solving strategy for the diagnostic functions.

The knowledge sources implement the diagnostic knowledge and/or generally contribute to the diagnostic process. Two types of knowledge sources are implemented:

rule-based knowledge sources provide a "traditional" forward-chaining belief-propagation expert system paradigm. The application developer writes rules in the standard "if-then" form, with associated levels of belief. As rules are fired, belief propagates through the rule net, ultimately resulting in calculated measures of belief in the various diagnostics.

case-based knowledge sources provide a basic comparison engine paradigm. In many applications, a specific condition can be identified by the occurrence of a certain pattern in the data. The application developer specifies the conditions and patterns. The incoming data are compared against the patterns, and if the data matches a pattern to a given standard of closeness, the condition defined by that pattern is inferred to be true.

The external interfaces are links to software external to the shell itself. Such external software could perform a variety of functions, such as data sources, specialized data displays, data pre-processing, etc. External software can also be knowledge sources, if all proper conventions are followed.

Finally, the blackboard is the common data base that ties together all the other components. It is the central repository of the data received from outside the shell, and of all the data generated by the shell, including the results of the diagnostics processes.

The development environment consists of series of tools which allow the application developers to configure and test each one of the the modules that make up the runtime software. These tools are described in subsequent sections of this manual. The remainder of this section describes the basic operation of the runtime modules.

System Operation

The Blackboard

The blackboard is a global data base of objects. There are two general kinds of blackboard objects: those which are symbolic representations of a specific application's physical reality, and those which represent abstract concepts. The former generally correspond to physical objects, and may describe the spatial and functional relationships between the physical objects. The latter are generally abstract information which needs to be passed between the system's modules.

Blackboard objects have attributes, and each attribute can have one or more values: some attributes are defined to be single valued, others are multivalued (lists). Two special attributes which all objects can have (although they are both optional) are the IS-A and the PART-OF attributes. They establish the inter-relationships between blackboard objects, i.e., they can be used to define a hierarchical organization of the blackboard objects.

The IS-A attribute partitions the objects into classes, types, etc. The IS-A attribute is multivalued, i.e., an object can belong to more than one class (or be of more than one type). An inverse relationship, HAS-INSTANCE, is automatically created for each IS-A attribute value. The usefulness of the IS-A hierarchy is in the process of blackboard development: once a set of basic objects is developed for a class of applications, they can form a basic vocabulary for many different applications, and thus be reused several times. Each new object then inherits the attributes of its parent(s). The values of the parents' attributes are also inherited. This greatly simplifies the development process, by increasing the efficiency of the developer.

The PART-OF relationship is a very simple description of physical structure. It only deals with composition of the objects, but it is sufficient (and necessary) for proper decomposition of complex structures. The PART-OF attribute is single valued, but its automatically created inverse, HAS-PARTS, is of course multivalued. The primary purpose of the PART-OF hierarchy is to guide the end-user while navigating through the system model, one level at a time.

In addition to the IS-A and PART-OF attributes, application developers have the ability to add any other attributes and associated values to any object. Some of these attributes will be required by the knowledge sources, others may be desired simply to complete the "world" model. Note however that new attributes cannot be added at runtime.

Attributes that dynamically receive values can have two associated entities: the history-length specifies the amount of data, in terms of time, or number of values, that should be retained for the attribute; the demon slot specifies the name of a function which is to be executed every time the attribute receives a new value.

The runtime blackboard is allowed to exist on one machine only, i.e., it cannot be distributed in the memory of different processors.

The Control Mechanism

The control module is responsible for coordinating the activities of various parts of the shell. Its design is intended to allow the application developer to specify control actions that may lead to applications that exhibit the following characteristics:

speed: the ability to execute a task in a short period of time, and with minimum control overhead responsiveness: the ability to react to changed conditions when the reaction is required timeliness: the ability to reach conclusions (diagnoses, or partial diagnoses) by the time they are needed adaptability: the ability to change strategy as conditions change.

Note that these characteristics are not inherently built into the control module software; rather it is the application developer's responsibility to make judicious use of the features of the control module and thereby accomplish the desired results.

Speed depends strongly on the individual performance characteristic of each knowledge source. The control module contributes overhead. It is obviously desirable to maintain a small control overhead time to knowledge source execution time ratio. One way to do this is to minimize overhead, but this is only possible up to a point. Increasing the grain size of the knowledge sources is another way. Unfortunately, large grained knowledge sources tend to be unresponsive. Thus knowledge sources are interruptible.

Interruptibility is also useful for adaptability. Since this blackboard architecture is essentially event driven, it is possible that asynchronous events can change the execution environment (context) to an extent that the currently executing knowledge source is irrelevant or even inappropriate. The control module can then abnormally stop the current knowledge source and start executing other knowledge sources.

An aspect of interruptibility appears when asynchronous events change the context such that the currently executing knowledge source is superseded in importance by other knowledge sources. This situation is resolved by the use of priority levels associated with each knowledge source. A knowledge source which was interrupted because of higher priority tasks can be defined to be resumable.

The fundamental aspect of the control mechanism of the shell is that it is strictly condition driven. It has two modes of operation:

1. Data driven: the conditions that trigger the execution of the knowledge sources are the asynchronous receiving of data. This data can be from outside the system (usually from on-line sensors), or it can be the results of executing another knowledge source. Usually, it is not just the receiving of data that defines a triggering condition, but rather that the received data satisfy more specific conditions, such as leaving a pre-defined normal range.
2. End-user requested: the condition that leads to the execution of a specific knowledge source is caused by an end-user request. This would usually happen if high quality triggering conditions are not known, and thus a knowledge source should execute strictly under end-user control, or if the condition definitions are incomplete, and the end-user suspects that a specific knowledge source can contribute to the on-going diagnostic process.

The control mechanism needs the following information in order to operate:

1. A set of conditions that cause a process (knowledge source, or external) to execute. For performance reasons, the triggering conditions are divided in two groups: events and preconditions. The difference between them is artificial, and it is the application developer's responsibility to divide the conditions among the two groups in such a way that the performance is optimal.
2. Each process (knowledge source, or external) must be charcterized as interruptible or not. Each interrubtible process must have a priority level.
3. Each interruptable process (knowledge source, or external) may have a set of refire conditions defined, which will allow the control mechanism to determine if an interrupted knowledge source should be reactivated or terminated upon completion of the interrupting action.
4. Each process can time-out or not. For those processes that can time-out, a running time must be specified, at the expiration of which, the process is suspended, terminated, or continued.

The checking of conditions can be thought of in terms of a rule base paradigm:

IF condition-is-true THEN perform-action

The conditions on the left hand side of control rules are represented in terms of expressions, consisting of operands, which are data points (expressed as blackboard object/attributes) and operators, described in Appendix A.

The only right hand side action is to activate a process, which can be a knowledge source, or an external process.

The control mechanism consists of the continuous repetition several steps:

1. Event detection: all data going to the blackboard passes through the event detector module. Every time a data packet is received by the event detector, it evaluates the truth of the event preconditions that involve information in the packet. For each true condition, the corresponding process activation request is passed on to the next step.
2. Activation: the requests received from step 1 are processed by the activation manager module. For each knowledge source or external process activation request, its preconditions are evaluated. Those found to be true are also passed on to the next step.
3. Scheduling: the requests from step 2 are received by the agenda manager. This module keeps track of the currently executing module, and it schedules the new requests according to priority levels. This may require the suspension of the current activity. This module also determines if a suspended task should be resumed (refired) or not, and if a running task should be timed-out or not.

As stated earlier, the control mechanism is largely application specific. While the architecture described above is quite general in nature, the tasks carried out by the various modules may contain numerous elements that are application specific. As always in this type of situation, an approach that uses a mix of procedural (control actions) and declarative (control rules) methods should be implemented in the future.

Rule-Based Knowledge Source

Rule-based knowledge sources implement rules of the IF ... THEN ... form. In general, rules are intended to reflect human heuristic knowledge (rules of thumb). In reality, there are no restrictions: any "chunk" of knowledge that can be represented as an IF ... THEN statement is allowed.

Note that the rule base paradigm discussed here is not a standard production system, in the OPS5 style. Instead, it is a propagation of belief type rule base, where the primary purpose of the inference process is to calculate the certainty factors in the conclusions of the rule base. It is also a classification type program, in which all possible outcomes must be defined a priori. Furthermore, the process of writing rules is equivalent to developing a rule net. Therefore, there is no need to compile the rules into a network, since the rules are already defining a network.

The rule net has multiple entry (beginning) and multiple ending (terminus) points. The beginning points are those where data comes into the system, and the terminus points are the conclusions reached after all the rules have fired. Normally, the terminus points correspond to malfunctions in the real world.

The rule-based knowledge source in this version of the shell is strictly forward chaining (data driven). A backward chaining (hypothesis driven) version can be added in the future.

Rule Base Tree Structure

The basic element of the rule base is, of course, the rule. In its simplest form, a rule is defined as follows:

IF (evidence expression) THEN (hypotheses/actions)

The components of the evidence expression and the hypotheses correspond to nodes in a tree structure. The rules themselves are implemented as frames which describe directed links from one or more nodes in the left hand side, to one or more nodes on the right hand side. The right hand side can also incorporate actions which do not correspond to actual nodes in the tree.

The first layer of nodes are data nodes, i.e., the entry points of external information into the rule base (usually, but not necessarily from sensors). Similarly, the last layer corresponds to terminus points: partial or final diagnostics. Thus, the name for the nodes in the last layer is malfunctions. All intermediate layers of nodes represent hypotheses: intermediate steps in the reasoning process being represented. The first and last layers must have matching attributes in blackboard objects. The intermediate layers may also map into blackboard objects, but they don't have to.

In addition to the nodes described above, other nodes may be necessary to hold values of variables and constants. The fundamental difference between the various types of nodes is in the numerical value of the node that is used during inferencing. Data nodes, variables and constants have unrestricted floating point values, which differ by the origin of the value: data nodes receive it from the blackboard, variables receive it as a result of numerical calculations in the rule base, while constants have values given by the application developer. A constant value can not be changed during execution. In addition, data nodes are allowed to have string values, for comparison purposes against the string values of other data nodes, or against predefined strings.

Hypotheses and malfunction nodes have values that are confidence levels CF. The CF is actualy a composite number, involving a measure of belief MB and a measure of disbelief MD. The relationship between them is:

$$CF = MB - MD$$

MBs and MDs range from 0 (total lack of belief, or disbelief, respectively) to 1 (full belief, or disbelief); CFs therefore range from $-1$ (absolute confidence in the falsity of the node) to $+1$ (absolute confidence in the truth of the node). Hypotheses and malfunctions start with all CFs, MBs and MDs set to zero. The values are then updated by the inference mechanism, described later in this section.

Rules have similar measures of belief, named sufficiency and necessity factors (SF and NF). Sufficiency represents the degree to which the truth of the evidence (left hand side) influences the hypothesis (right hand side), i.e., sufficiency is a measure of belief in the truth of the rule itself. Necessity is a reflection of the influence of false evidence on the falsity of the hypothesis: how necessary is it for the evidence to be true, for the hypothesis to be true. Unlike measures of belief associated with nodes, the sufficiency and necessity factors are a priori measures, defined by the application developer and domain expert.

Contexts are provided to give the application developer some degree of control over the execution of rules. Specifically, by associating groups of rules with contexts, the developer can force the sequential execution of such groups of rules. This improves the efficiency of the inferencing process in certain situations. A typical example would be a case where a machine has several modes of operation, each characterized by a different set of rules. The context mechanism then makes sure that only the rules corresponding to the current mode are fired. Note that in a blackboard architecture this feature is not so important, because modes (contexts) could be associated with different knowledge sources. On the other hand, there are at least two situations where contexts may be useful: when sensors have to be diagnosed, or when value expiration times have to be checked before executing the rest of the rules. Thus, besides a "normal" context, which should always exist, two other contexts could be defined, "diagnose-sensors" and "check-expiration-times".

Inference Mechanism

The basic inference process consists of belief calculation and propagation. A rule firing consists of the following steps:

1. Check if the rule's context evaluates to true. If yes, proceed; otherwise, discard this rule, try later, if context changes.
2. Check if all the rule's evidence is available (i.e., that all the nodes that participate in the evidence expressions have had their beliefs updated). If yes, proceed; otherwise discard this rule, try later if more evidence becomes available (in other words, as nodes that were not updated during this step become updated, this rule is tried again).
3. Calculate the rule's evidence CF (see "Evidence Expressions," below).
4. Calculate the rule's contribution towards the hypotheses confidence level (see "Calculating A Rule's Contribution," below).
5. Check if the rule's contribution is within certain pre-defined margins as defined by the alpha and beta cutoff values (margins). If yes, proceed; otherwise discard this rule; this rule will not fire during this run of the knowledge source.
6. Update the hypotheses' confidence level (see "Updating Hypotheses," below).
7. Fire any actions associated with this rule (see "Actions," below).

To recap, in this strictly forward chaining mode of operation, the process begins by extraction of the values for data nodes from the corresponding blackboard objects (usually, but not necessarily, sensor readings). The first layer of rules normally map these values into beliefs that readings are high, low, etc. Belief is then propagated throughout the rule network (tree) according to the steps described above, until no rules are left to be fired. The number of rules that fires depends on the degree of evidence truth required to activate the rules. A very narrow margin (for example, "only fire rules whose contribution is greater than 0.8") will reduce the number of firings, and improve speed. On the other hand, diagnostics may be missed because relatively small contributions to incremental updates are neglected. An increased margin will increase the number of rules fired. The margins can be set separately for each rule, leading to a modified alpha-beta search method, totally under the control of the application developer.

Evidence Expressions

As part of the propagation of belief process, the inference program calculates the truth level of the rule's evidence expression. The use of expressions permeates the shell. More details are given herein. In this section, only certain specific information is given, which is particularly relevant to their use in the rule-based knowledge sources.

A rule's left hand side expression is defined as follows:

(evidence-expression)=(<operator>
 <argument1> ... <argumentN>)

Expressions can be written in prefix or infix notation, using parentheses. All expressions used by rules must evaluate to a truth value (confidence level). Evidence expressions can be of any complexity, as long as the data types returned by nested operators match the required argument types. Operators are of several types:

algebraic (e.g., add, diff, times, divide, minus, abs, sin, cos, tan, asin, acos, etc)
boolean (e.g., fuzzy and, fuzzy or, weighted and, weighted or, not), and comparative
 booleans (less, equal, greater)
time-based (e.g., trend, average-trend, time-average, time-min, time-max, etc)
change-based: time-when, value-when Arguments can also be of several types:

constant numbers
values (of input, variable, and constant nodes)
confidence levels (of hypotheses and malfunction nodes)
functions that return one of the above other expressions (recursive)

Algebraic operators take arguments that evaluate to numbers, and return numbers.

Boolean operators are the ones that are used in the actual belief propagation process. They combine the confidence levels of their arguments into new confidence levels, or, in the case of the comparative booleans, they calculate a confidence level in the truth of the comparison. The combining formulas are as follows:

fuzzy and: $CF(A \text{ and } B) = \min(CF(A), CF(B))$
fuzzy or: $CF(A \text{ or } B) = \max(CF(A), CF(B))$
weighted and: $CF(A \text{ and } B) = (CF(A)*W(A) + CF(B)*W(B))/(W(A) + W(B))$
weighted or: $CF(A \text{ or } B) = \max(CF(A)*W(A), CF(B)*W(B))$
not: $CF(\text{not } A) = - CF(A)$ Comparative booleans can be strict comparisons, returning beliefs of $+1$, or $-1$, or they can use a mapping (piece-wise linear) function to give a degree of fuzziness to the comparison.

Time-based operators incorporate the concept of time into the rule base. One of the arguments to these functions is always a time variable, usually specifying a time interval. For example, the time-min operator will find the minimum of a node's value over a specified interval of time. Similarly, the time-min-t operator will return the time when the minimum node value occurred. A side effect of using a time-based operator in a rule is that the system will automatically make sure that a history of sufficient length is kept in the blackboard, if the blackboard history length has been specified as a time interval (i.e., the time-based operators do not work with history lengths specified in the blackboard as number of records). Limitations have to be enforced however, to prevent rules that refer to very old data (e.g., weeks, months) from turning the blackboard into a huge data base. Automatic storage limits should be considered by the application developer either in terms of time (e.g., don't save data older than three days), or in terms of storage requirements (e.g., don't use more than 100 Kbytes of storage).

Change-based operators are similar to time-based operators except that they do not trigger data storage. Instead they record the most recent time of occurrence, or a value at the most recent time of occurrence of a specific change. A change is defined as the transition of some expression's truth value from true to false or vice-versa.

Calculating A Rule's Contribution

Once the left-hand-side evidence expression has resulted into a combined confidence level CFevidence, this value is combined with the belief in the rule itself (sufficiency, SF, or necessity, NF) and the result is used to update the truth value of the rule's hypothesis. The combining algorithm is as follows:

if CFevidence$>0$ (i.e., evidence is true), then the rule's contribution is the product of the rule's SF and CF evidence. If SF$>0$, then the hypothesis MB is updated, if the SF$<0$, then the hypothesis MD is updated. The rule's contribution is always positive.

if CF evidence$<0$ (i.e., evidence is false), then the rule's contribution is the product of the rule's NF and CF evidence. If NF$>0$, then the hypothesis MD is updated, if the NF$<0$, then the hypothesis MB is updated. The rule's contribution is always positive.

Updating Hypotheses

If a hypothesis is supported by only one rule, then the hypothesis' belief level is updated by assigning the value of the rule's contribution to the hypothesis' MB or MD as described in the previous section.

When more than one rule have the same hypothesis (incrementally acquired evidence), then the truth value of the hypothesis is incrementally updated by using union update rules from probability, i.e., add the individual contributions, and subtract their product:

$$\text{Belief}_i = \text{Belief}_{i-1} + \text{Belief}_{rule-i} - (\text{Belief}_{i-1} * \text{Belief}_{rule-i}),$$

where

Belief is the hypothesis' MB or MD, as indicated in the previous section,

Belief$_i$ is the newly calculated value of the hypothesis' MB or MD,

Belief$_{i-1}$ is the previous value of the hypothesis' MB or MD, due to other rules that support the hypothesis, and which already fired, Belief0 is 0.0, and Belief$_{rule-i}$ is the contribution of the ith rule, calculated as described in the previous section.

Meta-Rules

A notable aspect of the inference mechanism is that rules can be written that dynamically, at runtime, modify the rule base itself. A typical use of this feature is to diagnose the trustworthiness of the input data itself (i.e., to determine if sensors are deteriorating or malfunctioning). If the belief in the input data is found to be less than satisfactory, the belief levels can be decreased accordingly, thereby providing for graceful performance degradation, rather than collapse.

Structurally, metarules are similar to regular rules: they have a left-hand-side expression, and a right-hand-side part. The right hand side, named source, contains an expression which is evaluated. The result of the evaluation is passed on to an optional piece-wise linear function. If such a function is not present, then the result of the expression evaluation is used directly; otherwise, the result of applying the function is used. The result is then placed in the entity specified in the right-hand-side of the rule. This entity is described by a target-list, which contains the names of rules or contexts. If the targets are rules, then a target-slot must also be specified, so that the inference engine knows if to modify the rules' NF's or SF's. If the targets are contexts, then the context value is changed. Note that if the targets are rules, then the value placed in the SF or NF slot must have evaluated into the range $-1.0$ to $+1.0$. If the targets are contexts, then the result must have evaluated to 1 or 0.

Metarules, while useful in certain circumstances, must be used carefully, because they have strong side effects which affect the performance of the rule base. When a metarule changes a context, all the rules that have already fired, and whose context is no longer true are "unfired" (i.e., their effects are removed). The program then re-checks rules that couldn't fire before the context change, for the possibility that they are in context now. Similarly, when a metarule changes the SF or NF of a rule, all the effects of this rule are undone, and the rule is fired again. In order to prevent the introduction of infinite loops, each metarule has an associated counter, that limits the number of times it will be used.

Evaluators

A mechanism similar to rule firing, but which does not actually propagate belief propagation, is available to carry out simple calculations. This type of "rule" is named an evaluator, and it also has a left-hand-side and a right-hand-side. The expression in the left-hand-side can be any expression, i.e., it can evaluate to any value. The result of the evaluation is placed in the value slot of the node name contained in the right-hand-side, which must be a variable type node. After the evaluator is executed, the variable node is marked as updated, and thus it can be used on the left-hand-side of subsequent rules, meta-rules or other evaluators. Evaluators essentialy perform a set operation: set variable value to evaluation expression.

Actions

Actions are associated with the right hand side of rules, metarules and evaluators. Actions are procedural in nature, thus allowing the application developer to tailor the application to specific needs. The functionalities provided by actions are hard-coded in software that implements them. Actions can not be added by the application developers; they are added by the software developers.

A variety actions can be performed as side-effects when rules fire. The existing actions are described herein.

Priority And Severity

Priority and Severity are parameters associated with diagnoses. They are needed to distinguish between malfunctions with high confidence levels. A broken thermocouple, CF of 1, and a broken bearing, CF of 0.9, certainly do not have the same priority, in terms of requiring attention. A severity measure is also required to account for the fact that a maximum confidence level can be reached a long time before a malfunction becomes critical. In the example above, a bearing may be broken for a long time before a shaft breaks, hence a bearing broken for several hours is a more severe malfunction than one broken for a few seconds. Severity also comes into play when values continue to change. For example, some high temperature may lead to a malfunction with a CF of 1; as the temperature continues to increase, the severity of the situation increases too, while its CF cannot exceed 1.

Case-Based Knowledge Source

The case-based knowledge source provides a partial implementation of the complete concept of case-based reasoning. Automated modification and repair of cases are not implemented.

The body of a case-based knowledge source consists of a collection of previously stored cases, and a set of algorithms which will rank them by "closeness" to a given situation. In operation, the inference engine compares the current "live" data with the previously stored cases, and if the live data matches the case data within a given standard of "closeness", it can be inferred that the condition that the case represents is true.

Case Definition

Each case is an instantiation of a generic case frame which is defined by the application developer. A frame can have any number of variables. An instance (case) is obtained by assigning values to the variables. Within a knowledge source all cases are defined to be instances of the same frame. The case memory can then be thought of as a three dimensional table. The rows in the table correspond to one case frame. The columns correspond to variables whose values form a case. Any variable can have a third dimension, time. A case's historical values are stored along this third dimension. These values are matched against current historical values by similarity measuring algorithms. If a variable doesn't have a third dimension, it is assumed that similarity is measured against the current value of the variable.

A measure of the number of times each case score has been generated and an approximation of the score of each case is maintained internally. These measures can be used to determine whether a case is useful, requires modification, or if it should be removed.

Case Addition

Theoretically, the storing of new cases can be entirely automatic, or under end user control. In this version of the shell, the storing of new cases will be partially automated. A knowledge source or external program may instruct a case-based knowledge source to add the current values as a case. From that point, the cased-based knowledge source will automatically retrieve the data, construct the case, and modify the case base.

The case-based knowledge source must perform the following actions to add a case. The case frame is examined to determine what object attributes are contained in the case. Then the knowledge source will retrieve that data from the blackboard and use them to generate the new case. If the maximum number of cases has been reached, a predefined utility function will be called to identify the case that should be discarded. That case is deleted, and the new case is added to the case base.

Case Scoring

Several scoring mechanisms are available. Each of the following will be discussed in more detail below:

1. Magnitude-based.
2. Time and magnitude based.
3. Exact match.
4. Symbol-to-symbol.

Magnitude-Based Scoring

This type of scoring uses a weighted average formula. In the formulas, the index i moves accross the variables that form the case, and the index t moves across the third dimension, time.

Three comparison functions f are available: equal-to, greater-than, and less-than. Each of these functions uses associated constants that define a piecewise linear curve which is used in determining scores. These constants may be specified on a per-case basis.

Time-Magnitude Scoring

The magnitude-based scoring discussed above acknowledges that exact matches between live data and case data are not likely in an actual application. Therefore a degree of "fuzziness" is permitted when comparing the magnitudes of the data. However, magnitude-based scoring does not allow a similar degree of "fuzziness" along the time dimension.

In some circumstances it might be desirable to have flexibility along the time axis. For example: assume a case is specified where sensor S has value X at time T1, and value Y at time T2, and T1 and T2 are 60 seconds apart. In the live data, sensor S attained value X but did not attain value Y until 62 seconds later. In many applications, the two second difference may not be meaningful, and the case should be scored as a match.

In time-magnitude scoring, the user can specify a "window" of time for the comparison. This window is specified in terms of a given number of seconds before and after the specified time. If a data source has more than one value stored in that window of time, the value used for the comparison is be selected as follows:

for the equal-to operator, the value closest to the case value for the less-than operator, the minimum value for the greater-than operator, the maximum value Similar to the operator constants, the time windows can be specified on a per-case basis.

Exact Match Scoring

Similar to magnitude scoring, this type of scoring also makes use of the operators equal-to, greater-than, and less-than, except that no "fuzziness" is used. All operators generate discrete scores of zero or one.

Symbol-to-Symbol Scoring

This type of scoring allows the comparison of string data. When a case-base is developed, the application developer defines a table of string pairs. One of the strings represents a possible value of a case datum, the other string represents a possible value of a live datum. For each such pair, a score is defined. When defining a case, the operator symbol is used to denote a symbol-to-symbol comparison. When a particular case is evaluated at runtime, the current string value and the case string value are searched for in the table. If the pair is found, the defined score is used as the raw score. If the pair is not in the table, the score is zero.

Actions

Simply detecting that a particular condition is true is not typically useful. Usually it is desired to perform some action when a condition is detected. Therefore, a mechanism is provided to perform some specified action when data matches a case sufficiently closely.

For each case, a user can specify a set of actions. Each action has an associated minimum score. When a new score for a case is generated, the list of the actions is tested. For each action where the case score is greater than the action score, the action will be performed.

External Interfaces

All applications will have to interface with external software, since the shell has no built-in data acquisition capabilities. In addition, the use of other software external to the shell itself can greatly enhance the power and functionality of the shell.

In general, external software interfaces are created by linking subroutine calls provided with the shell with software provided by the application developer. The subroutine calls initialize communication channels, and send and request (receive) data. It is the responsability of the application developer to provide software which knows how to deal with the external software.

For example, assume that the shell is installed in a plant which has a data highway, and that the computer on which the shell runs is a highway drop. In order to access the information on the highway, the application developer would have to write a small piece of software that can extract the data from the highway drop software, reformat it, and send it to the blackboard by calling routines provided by the shell. If results from the shell are to be placed back on the data highway, the the custom software has to request it from the shell, using one of several provided subroutine calls, reformat it, and pass it on to the highway drop.

A separate issue is the case where external software is desired to be used as a knowledge source. The situation is complicated by the fact that, by definition, a knowledge source is under the strict control of the shell's control module. Specifically, the shell must be able to start, interrupt, resume and stop a knowledge source. The shell software provides in this case, in addition to data exchange software, software that can interface with the shell's control module. The additional requirement is that the external software, when linked with the shell software, is subordinate to it.

End-Users Interface

The end-user interface is fully specified by the application developer. The resources available include graphics, graphs, tables, menus, and dialog/message windows. These resources can be combined in almost any way, as appropriate to the application at hand. The data displayed by the various resources is based on blackboard data.

The application developer is expected to define a hierarchy of views, where each view contains some combination of resources, mapped into blackboard data. The end-user then can navigate through the hierarchy, and thereby access whatever information is of interest at the time.

Application Developer's Overview

This section contains an overview of the Application Development Environment. The purpose is to give the reader a basic understanding of how the development environment is used to create an application. Features that are common to several parts of the shell development environment are described. The commands used to start the development environment and open the Top Level Developer Window are also explained here. Detailed information for use of the specific editors in the development environment is given in subsequent sections of this document.

The Development Process

The process of application development for the Domain Shell involves entering information into the system through editors. This information is in several forms: rule-based knowledge source descriptions, case-based knowledge source descriptions, blackboard specifications, end-user interface configurations, and application-wide system settings. The developer enters this information by using the appropriate shell editors.

Note that the actual process of development will be iterative. Learning from the results of testing and modification of individual portions of the application will occur on a continuing basis. Even after the application is deployed, results can be analyzed, and adjustments made to the application. For such an iterative process to yield a successful application, it is important that the developers actually perform the implementation in reasonably-sized steps. If the developer enters too much information into the application without testing it, the results of testing may be too complicated to understand, thereby making repair difficult.

The X Window System

The user interface of the Domain Shell (both Development Environment and Runtime Environment) is based on the Motif window manager operating within the X Window System. The Motif window manager is responsible for the look and feel of the shell. The application developer should be familiar with the standard operations of sizing, moving, iconifying and closing windows in the Motif environment. End users who interact with the shell should also have some experience with Motif-style windows.

Domain Shell Window Basics and Terminology

There are many different windows that will appear on the display in the process of application development. Each window has been designed to allow the developer to enter specific types of information into the shell. The details of each window's appearance are described in the remainder of this document. The following are general definitions (terminology) that apply to all of Domain Shell windows.

The term windows is used to refer to a rectangular box that appears on the computer display. This box contains information for the user (as text, graphs, tables, or other graphics), requests the user to enter data to describe parts of the shell (through text entry fields or selection boxes), or gives the user options to choose (action buttons).

Menus are displayed to give the user (either the application developer or the end user) a list of actions that can be executed. In the application development environment, the developer tells the shell which portion of the environment to activate next through a menu selection.

The term top level window refers to the base window that is associated with a major portion of the shell environment. Top level windows are used for the following purposes. They display information about the current state of the entity being edited or tested. For example, in the application development environment, the top level window shows the name of the application currently being edited or tested, as well as the current directory. The top level window also gives the developer access to all major functions that can be executed. This access is in the form of pull-down menus listed along the top of the window. The layout of all top level windows is similar for all of the operating portions of the development environment. This layout and the associated menu choices are described in the following section.

Information that is entered into the shell is in the form of entities that are created by the developer. An entity is a specific type of item or object that exists as part of the application. Examples of entities are: rules in a rule base, cases in a case base, objects in the blackboard, and views in the run-time environment. Entities can also be rule bases or case bases, or the entire application. What is defined as an entity depends on the window (or UNIX process) that is currently active.

The shell's development environment is designed so that the creation and editing of entities is done in a similar manner for all entity types. This is done through a particular type of window that is called an editor window. An editor window is actually a form of a dialog window. These terms are defined below.

Dialog windows are windows that contain sections, or fields, into which the user can enter information. Note that a dialog window may not require that the user enter information. All major actions defined within a dialog window are executed by depressing buttons.

Each dialog window provides buttons at the bottom that specify the action to be taken. In general the "OK" button should be clicked with the pointer if the developer wishes to accept the information displayed in the window. "Cancel" is used if the developer does not want the information displayed in the window to be utilized. The "Help" button provides a text message that gives information about the purpose of the window.

In the application development environment, dialog windows appear that allow the developer to create and edit entities. These dialog windows are called editor windows. Each editor window is a form that has a set of data fields. These data fields are filled with specification data that defines a particular entity. The developer enters and edits these data fields to create the entity.

Many examples of editor windows can be seen in subsequent sections of this document.

In general, the following actions are available to the developer to work with entities: create a new instance of an entity, edit a currently-existing entity, delete a currently-existing entity, and save the current entity. These actions are selected by the developer through a menu that appears within a particular editor window.

Selection lists are a type of window that commonly will appear in the development environment. The selection list is used to display a list of items. The items that are listed could be files, or other entities that have been defined within the shell. The purpose of a selection lists is to give the developer quick access to a specific entity without having to memorize the exact name of the entity. Associated with a selection list is a set of actions that can operate on the selected entity. These actions are context dependent, but are generally editing actions such as "delete" or "modify", or general selection actions (OK or cancel).

Figure 46:
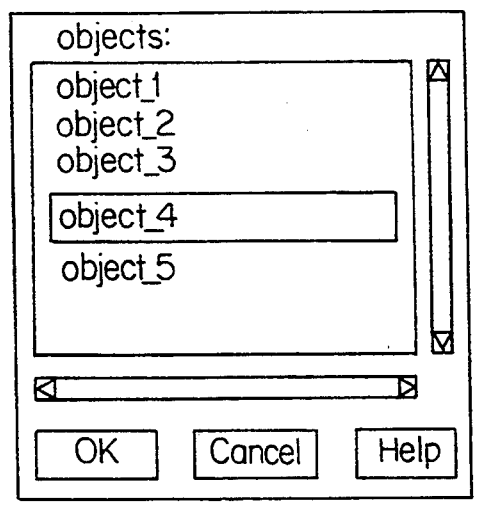
FIG. 46 is a diagram of a typical selection list window.
Figure 47:
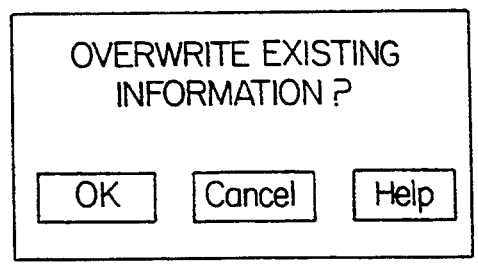
FIG. 47 is a diagram of a typical warning window.

FIG. 46 shows the appearance of a typical selection list window. In general, the shell dialog windows will prompt the developer if an entity is created that would result in overwriting a previously-entered entity. This is a type of dialog window that is called a warning window. The developer is asked to confirm the action. This protects against inadvertent loss of information. This appears as a dialog window; the "OK" or "Cancel" button must be pressed to proceed further. An example of a warning window is shown in FIG. 47.

Editing Notes

There are many editor and dialog windows that can appear within the application development environment. Despite the variety of operations that can occur, the use of the pointer to activate the operations is consistent.

Double-clicking on a menu selection with the pointer will activate the selection. A menu selection can also be activated by highlighting it by single-clicking on it with the pointer, then depressing the OK button in the window, or hitting the Enter key on the keyboard.

The developer can enter text into any of the data entry areas of a window by moving the pointer to the area. This text can be edited or deleted as desired by the developer.

Push button selections are used in a window to allow the developer to quickly select a specific item. The developer can select a push button option by clicking on the appropriate button with the pointer.

PICK button selections are used in a window to allow the developer to quickly select a specific item from a selection list. A PICK button is associated with a data entry field; when the PICK button is pressed, a selection list window is opened. This selection list contains a list of all of the currently allowable values for the data field. This list is updated and is context dependent, meaning that the list is dynamically created. For example, PICK buttons are used most often to let the developer choose an object-attribute. Only the currently defined object-attributes in the blackboard are displayed in the PICK selection list.

Radio button selections are used in a window to allow the developer to quickly set a value to one and only one value in a set. Each of the possible values is displayed in the window, along with a button. If the button is set, then the value of the option is set appropriately, to the exclusion of the other values.

Dialog windows may pop up if the development environment detects a situation where insufficient information has been provided to execute the command or an action has been requested that could possibly overwrite data. This dialog window reports the failure of the shell to successfully execute the desired action; the application developer must correct the cause of the failure and retry the action.

Quick buttons give the developer access to other portions of the development environment in a rapid manner. For example, quick buttons are used to quickly open the blackboard editor, or to move from a specific knowledge source editor window to a testing window.

Getting Started

The Domain Shell application development environment is started by typing appdev at the UNIX command line prompt.

Figure 48:
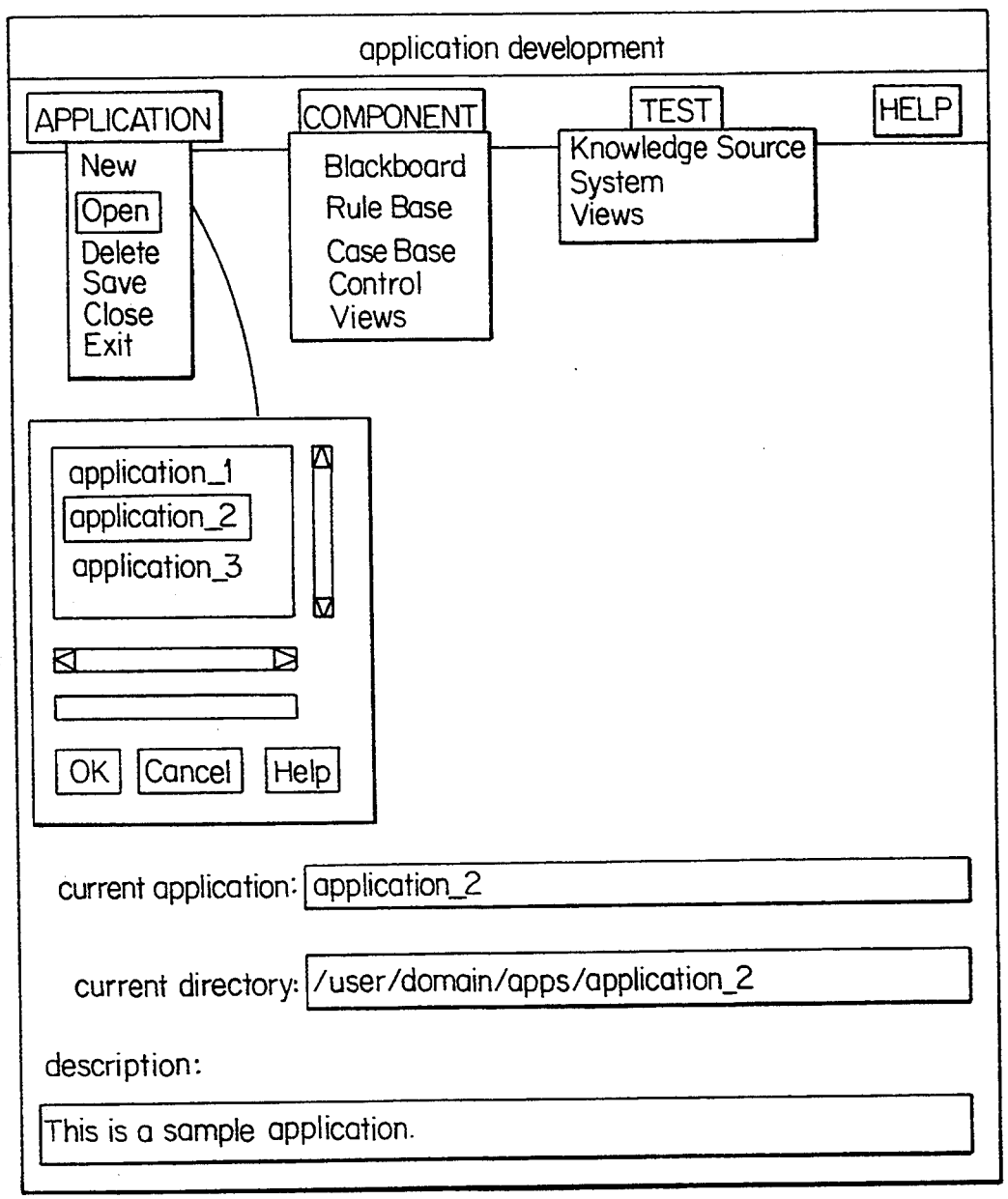
FIG. 48 is a diagram of a top level developer's window.

Upon starting the program, the developer is presented with the Top Level Developer's Window. This window contains all of the options that are available to the developer. A representation of the Top Level Developer's Window is shown in FIG. 48.

APPLICATION Menu

The APPLICATION menu allows the developer to create a new application, open an old application, save the current application, or exit the development environment.

APPLICATION—New

Figure 49:
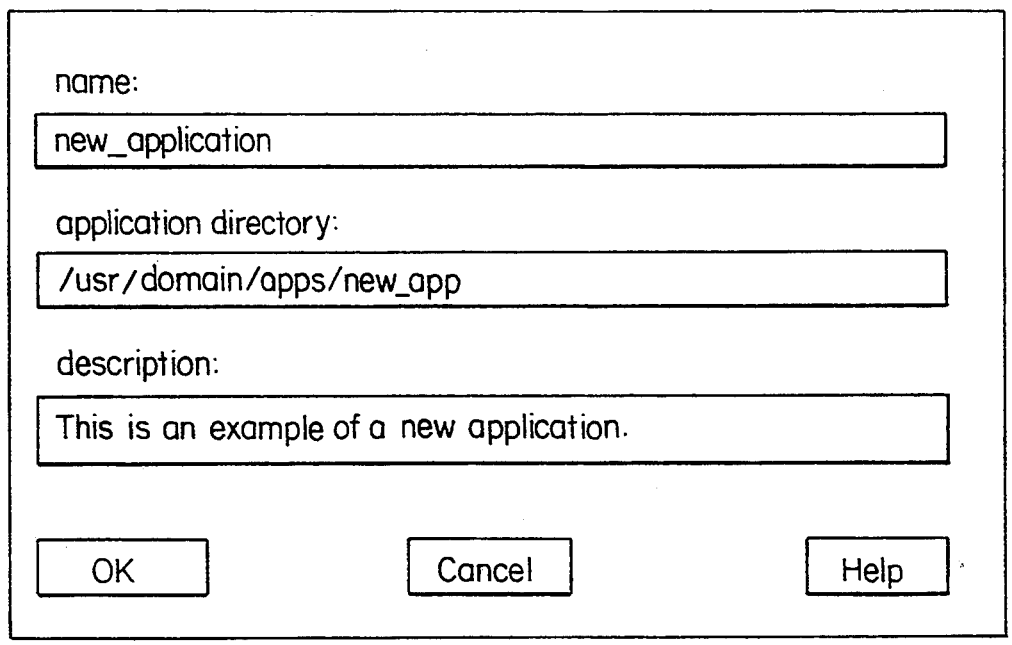
FIG. 49 is a diagram of a new application dialog window.

The New menu selection is chosen to begin the creation of a new application. When this menu selection is chosen, a dialog window is opened (FIG. 49). This dialog window contains fields that must be specified for the application. The Name field is used to identify the application. The developer specifies the directory in which all of the application system files are to be stored in the Directory field. The Description field allows the developer to enter a brief description of the application. Information such as a brief explanation of the application and the developer's name should be placed here.

When the OK button is pressed, the shell checks for the presence of the specified directory, and stores the initial application system information there. The Current Application and Description fields of the Top Level Application Development window are updated.

APPLICATION—Open

Choosing the Open menu selection opens a window that contains a selection list of the current applications that exist in the current directory. One of these applications can be opened by the developer double-clicking on the desired application's name, or by entering the application name in the data entry window. The directory can be changed by double-clicking on another directory name.

APPLICATION—Save

Choosing the Save menu selection causes the shell to save the current specifications for the application. This information is saved in files that are stored in the specified application directory.

APPLICATION—Close

The Close menu selection closes all of the files associated with the current application, and removes the application information from the fields in the Top Level Developer's Window.

APPLICATION—Exit

Choosing this option causes the development environment to be closed. This selection ends the development process.

COMPONENT Menu

The COMPONENT menu allows the application developer to edit the specific parts of the current application.

COMPONENT—Blackboard

Choosing this menu selection causes the blackboard editor to be started, and its top level window to be opened. The blackboard editor is used to enter the objects, attributes and history lengths that will define the application's blackboard. This information is always available on a read-only basis to other development editors. Note that other parts of the development environment have Quick Buttons to activate the blackboard editor.

COMPONENT—Rule Base

Choosing this menu selection causes the rule base editor to be started, and its top level window to be opened. The rule base editor is used to create and modify rule-based knowledge sources.

COMPONENT—Case Base

Choosing this menu selection causes the case base editor to be started, and its top level window to be opened. The case base editor is used to create and modify case-based knowledge sources.

COMPONENT—Control

Choosing this menu selection causes the control editor to be started, and its top level window to be opened. The control editor is used to define the system components (knowledge sources and external processes), and to create and modify control elements such as priorities, events, preconditions, and refire rules.

COMPONENT—Views

Choosing this menu selection causes the runtime environment editor to be started, and its top level window to be opened. The runtime environment editor is used to create a set of graphical displays that end-users of the shell (e.g. plant operators) will see. It defines the views, the windows and the set of allowable operations that will be seen by the end-users.

TEST Menu

The TEST menu allows the application developer to perform tests on portions of the application, or the complete application, for the purpose of verifying correct behavior.

TEST—Knowledge Source

Choosing this menu selection causes the knowledge source test portion of the development environment to be activated. Testing at the knowledge source level allows the developer to observe the operation of a knowledge source under controlled conditions.

TEST—System

Choosing this menu selection causes the system test portion of the development environment to be activated. Testing at the system level can be used by the developer to observe the overall behavior of an application under controlled conditions.

TEST—Views

Choosing this menu selection causes the runtime views test portion of the development environment to be activated. Testing the runtime views consists of reviewing the view configuration information, and observing the appearance of specific end user views.

Guidelines for Use

The domain shell has many features and options that can be utilized, The application developer's environment presents a variety of windows. While many of the development features have intuitive behavior, it is still necessary that the application developer understand the development and testing process for development to proceed efficiently.

To create a complex application, the developers will have to work in a pre-planned, coordinated manner. Pre-planning tasks that are appropriate include a careful division of the work tasks that are assigned to individuals developing the application. In particular, all developers should understand how their portion of the application fits in with the remaining parts, and the required end user interfaces that must be set up to effectively interact with the end user.

It is likely that there will be several developers working on the same application. Note that Version 1 is not a multi-user system. Therefore, coordination of development efforts is critical to ensure success. Two areas of particular concern should be the blackboard and the control portion of the application. The blackboard is fundamentally a common database, so all developers will have to interact with the blackboard editor, even if only on a read-only basis. Similarly, the prioritization of knowledge sources for control purposes will require access to all knowledge sources from the control editor.

The development environment will permit simultaneous development of its components by allowing simultaneous execution of multiple copies of its executable. However, since it is not a multi-user environment, it does not contain the necessary lockout mechanisms for preventing inconsistencies. Thus, in order to delete or rename blackboard objects, the developer should "freeze" blackboard access to other developers. When this occurs, checking of data elements of the blackboard should prevented until the blackboard editor is released. If the editing results in an inconsistency in a knowledge source, that inconsistency is flagged eventually by the software, and must be resolved.

Even with the flagging of inconsistencies, it is clear that blackboard deletions can cause large portions of the shell to become invalid. Therefore, the developers should approach blackboard editing with caution.

The involvement of multiple developers means that naming conventions for objects and attributes should be standardized. If a knowledge source developer tries to create a new blackboard object-attribute, only to find that it already exists, he should carefully consider whether the current object-attribute is the one desired, or a new one is needed. Adherence to strict naming rules should reduce the likelihood of occurrence of the problem.

The development of a complex application will require testing and tuning to maximize performance. Discussion and analysis of testing and ongoing operational results will provide input that will allow performance enhancements to be implemented.

Blackboard Development

A blackboard is created or modified by using the Blackboard Editor. The blackboard editor provides the tools needed to specify all of the information necessary to create blackboard data structures.

Getting Started

Blackboard development is one of the major parts of the application development process. Before using the blackboard editor the application developer should have a good concept of the data required by the other shell modules (e.g., knowledge sources, control, user interfaces). Collectively, this data represents the blackboard structure. The blackboard editor is designed to assist the application developer in entering the needed information; the process will proceed more efficiently if the developer also understands the blackboard functionality itself.

The blackboard editor is invoked either from the top level window of the application development environment (FIG. 48), or via quick buttons, from various other editors, where references to blackboard objects are made. The blackboard editor is closed by the developer when the editing process is completed. The individual windows that comprise the blackboard editor can also be used as a browser to inspect parts of the blackboard that have already been created.

Blackboard Editor Displays

Object Menu Display

Figure 50:
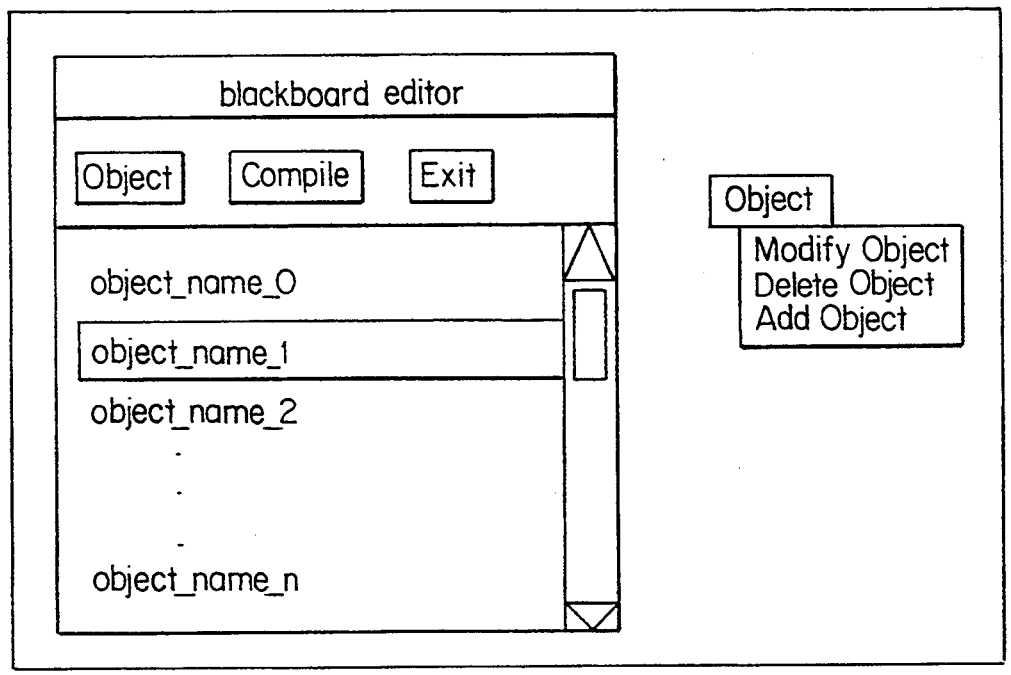
FIG. 50 is a diagram of a top level blackboard editor window.

When the blackboard editor completes reading the blackboard file into memory, a window is displayed containing a menu of the object names contained in the blackboard, along with the function buttons "Object", "Compile" and "Exit" (see FIG. 50).

Clicking on an object name selects the object. Clicking on "Object" calls up a menu of actions "Modify Object", "Delete Object", and "Add Object". Clicking on one of these functions performs the function on the selected object. The default (double-click) action is "Modify Object". These actions are described in more detail below. Clicking on "Compile" will compile the blackboard. Clicking on "Exit" closes the blackboard editor.

Object/Attribute/Value Window

When an object is selected for modification or a new object is to be entered, a window is created that contains the following (see FIG. 51):

1. an object name field,
2. a list of the attribute names associated with that object and function buttons "Attribute Add", "Attribute Delete" and "Attribute Modify",
3. an attribute entry area with fields for the attribute name and history length, and function buttons "Attribute OK" and "Attribute Cancel",
4. a list of the values (if any) associated with a selected attribute, and function buttons "Value Add", "Value Delete" and "Value Modify", and
5. function buttons "Object OK", "Object Cancel" and "Help".

The object name field is used for object name display and entry. The attribute list contains the names of any attributes defined for the current object. Clicking on a name "selects" that attribute. Clicking on one of the buttons performs the given function on the selected attribute. Selecting "Attribute Add" or "Attribute Modify" allows an attribute to be created or modified using the attribute entry area. Clicking on "Attribute Delete" displays a dialogue box that requests confirmation.

The attribute entry area is used for displaying or entering the attribute name, history length and demon. When the attribute information contained in the area is correct, clicking on "Attribute OK" saves the attribute. Clicking on "Attribute Cancel" aborts the entry.

The value list contains any values defined for the selected attribute. Clicking on a value "selects" that value. Clicking on one of the buttons performs the given function on the selected value. Selecting "Value Add" or "Value Modify" allows a value to be created or modified using the value form (described below).

Clicking on "Value Delete" displays a dialogue box that requests confirmation.

When all object/attribute/value information is complete, clicking on "Object OK" saves the object to the blackboard. Clicking on "Object Cancel" aborts the changes.

Value Window

When a value is added or modified, the value is entered or displayed through a window containing the value, type and timestamp, and function buttons "Pick", "OK", "Cancel", and "Help" (see FIG. 52).

When adding or modifying a value, the value, type, and timestamp can be entered in the given fields. The "Pick" button displays a selection list of the supported types. Clicking on "OK" saves the value and returns to the object/attribute/value form. Clicking on "Cancel" returns to the object/attribute/value form without saving the value.

Blackboard Editor Functions

Modifying an Object

To modify an existing blackboard object, select the object by clicking on the object name in the object menu, then click on the "Object" button and select the "Modify Object" function from the menu. This will display the object/attribute/value window for the selected object. The attribute list will display all attributes currently defined for the selected object. The attribute entry area and value list will be empty.

The object name can be changed to any name not currently used by another object in the blackboard. If a name is selected that is already in use, the name will be refused. Processing attributes and values will be described below.

When modifications are complete, clicking on the "Object OK" button saves the changes to the blackboard. Clicking on "Object Cancel" aborts all changes made.

Deleting an Object

To delete an existing blackboard object, select the object by clicking on the object name in the object menu, then click on the "Object" button and select the "Delete Object" function from the menu. This will display a dialogue box that requests confirmation from the developer. Clicking on "OK" deletes the object and returns to the object menu. Clicking on "Cancel" aborts the operation.

Adding an Object

To add an object to the blackboard, click on the "Object" button of the object menu, then select the "Add Object" function. An empty object/attribute/value window will be displayed. Enter the object name in the object name field. If the name is already in use by another object, the name will be refused. Adding attributes and values will be described below.

When complete, clicking on "Object OK" saves the object to the blackboard, and returns to the object menu. Clicking on "Object Cancel" aborts the operation.

Modifying an Attribute

To modify an attribute of a selected object, first select the desired attribute by clicking on the attribute in the attribute list, then click on the "Attribute Modify" button. This will display the attribute's data in the attribute entry area, and any values defined in the value list. The attribute name and history length may be modified. If a name is entered that is already in use the name will be refused. Processing values will be described below.

When modifications are complete, click on "Attribute OK" to save the attribute. Click on "Attribute Cancel" to abort the changes.

Deleting an Attribute

To delete an attribute from a selected object, first select the desired attribute by clicking on the attribute in the attribute list, then click on the "Attribute Delete" button. This will display a dialogue box that requests confirmation from the developer. Clicking on "OK" deletes the attribute and returns to the object form. Clicking on "Cancel" aborts the operation.

Adding an Attribute

To add an attribute to a selected object, click on the "Attribute Add" button. The developer may enter the attribute name and history length in the attribute entry area. If the name has already been used by another attribute in the current object, the name will be refused. When entering the history length, use the values or seconds radio buttons to select the history type. Adding values will be described below.

Clicking on "Attribute OK" saves the attribute to the blackboard, and adds the newly defined attribute to the attribute menu. Clicking on "Attribute Cancel" aborts the entry.

Modifying a Value

To modify an existing value in a selected attribute, first select the value to be modified by clicking on the value in the value list, then click on "Value Modify". The selected value will be displayed in an value window. Any of the fields may be modified. When modifying the type field, clicking on the "Pick" button will display a selection list of all types available. Clicking on "OK" saves the modified value to the value list and returns to the object/attribute/value window.

Note that the value list is always maintained in chronological order, newest value first. Modifying a timestamp will cause a reordering of the values in the value list.

Deleting a Value

To delete an existing value from a selected attribute, first select the value to be deleted by clicking on the value in the value list, then click on "Value Delete". A dialogue box will be displayed that requests confirmation from the developer. Clicking on "Confirm" deletes the value and returns to the object/attribute/value window. Clicking on "Abort" to returns without deleting the value.

Adding a Value

To add a value to a selected attribute, click on the "Value Add" button. An empty value window will be displayed. The developer may then fill the fields. Clicking on "OK" saves the value, "Cancel" aborts the operation.

Compiling the Blackboard

Selecting the "Compile" function when blackboard development is complete performs the conversion of the blackboard from the development representation to the runtime representation. The runtime representation is more compact and allows for faster storage and retrieval by other shell components.

Control Module Development

The specifying of the control mechanism of the shell is done with the Control Editor. The control editor provides the tools necessary to specify shell control information.

Getting Started

Once the system components (blackboard, knowledge sources and external processes) have been defined, controlling their actions becomes the most important aspect of application development. Before using the control editor, the application developer must have a good understanding of the control process and the interactions between knowledge sources.

The control editor is invoked either from the top level window of the application development environment (FIG. 48), or from the knowledge source editors, via quick buttons. The control editor may also be used as a browser to inspect the control rules.

Control Editor Displays

Control Display

The control display consists of a list of processes (knowledge sources and external processes), and the function buttons "System", "Control Rules", "Save", and "Exit" (see FIG. 53). Clicking on a process name "selects" the process. Clicking on "System" calls up a menu of actions "Modify", "Delete" and "Add". Clicking on one of these items performs the function on the selected process. The default (double-click) action is "Modify". Clicking on "Save" has the effect of writing to file(s) the control specifications which were not saved from within the system process display(s). More details of these functions will be given below. Clicking on "Exit" returns to the original calling place.

System Process Display

The system process display is used to add, delete or modify the control characteristics of a process (knowledge source or external process). The display consists of the following (see FIG. 54):

1. A process name, type and description entry/display area. If a new process is added, the fields are empty, and the user is expected to type in the appropriate information. The process name will be used for the file name where the control information (and other information) will be stored. The type (rule-based, case-based, external) is used to determine the file name extension (rb, cb, ep).
2. Interruptibility information. If the process is interruptible, a priority level is expected to be entered.
3. Time-out information. If the process should time-out after some time interval, then the time-out period, and the action to be taken at time-out (terminate, suspend, etc) must be specified here.
4. Triggering control information is entered by "pushing" one of three buttons for the "Event", "Precondition" and "Refire" expressions. Selection of any one of these buttons will bring up an expression editor screen (not shown, see Section 6, Rule Base Development, for expression editing). Preconditions and refire conditions are optional (not required for runtime execution). Events must be defined, unless the process is defined to execute periodically.
5. The function buttons "Save", "Cancel" and "Help".

Notes on Control Rule Development

The application developer must be aware that proper control rule development is the most important activity in assuring that an application will function properly. The following are some of the more important aspects for the developer to know in developing control strategies.

The application developer must understand the operation of the knowledge sources before attempting to assign priorities for activation of those knowledge sources. If a knowledge source that may require a considerable length of time to complete is specified with a high priority, that knowledge source can effectively block execution of all other knowledge sources of lower priority. In such cases, it is highly desirable to use the time-out feature, which will give other processes a chance to execute.

Also important is the division of triggering expressions into events and preconditions, as this has the potential of greatly affecting performance.

Rule Base Development

A rule-based knowledge source is created or modified by using the rule base editor. The rule base editor provides the tools needed to specify all of the information necessary to create a rule-based knowledge source.

Getting Started

Knowledge source development is a significant part of the application development process. Before using the rule base editor, the application developer should have a concept of the rules that will comprise the rule base. The rule base editor is designed to assist the application developer in entering information; the editing process will proceed more quickly if the developer also understands the rule base functionality itself.

The rule base editor is started from the top level developer's window of the application development environment (FIG. 48). The rule base editor is closed by the application developer when the editing process is completed. The individual editor windows that comprise the rule base editor can also be used as a browser to inspect parts of a rule base that have already been created.

Developing a Rule Base

Figure 55:
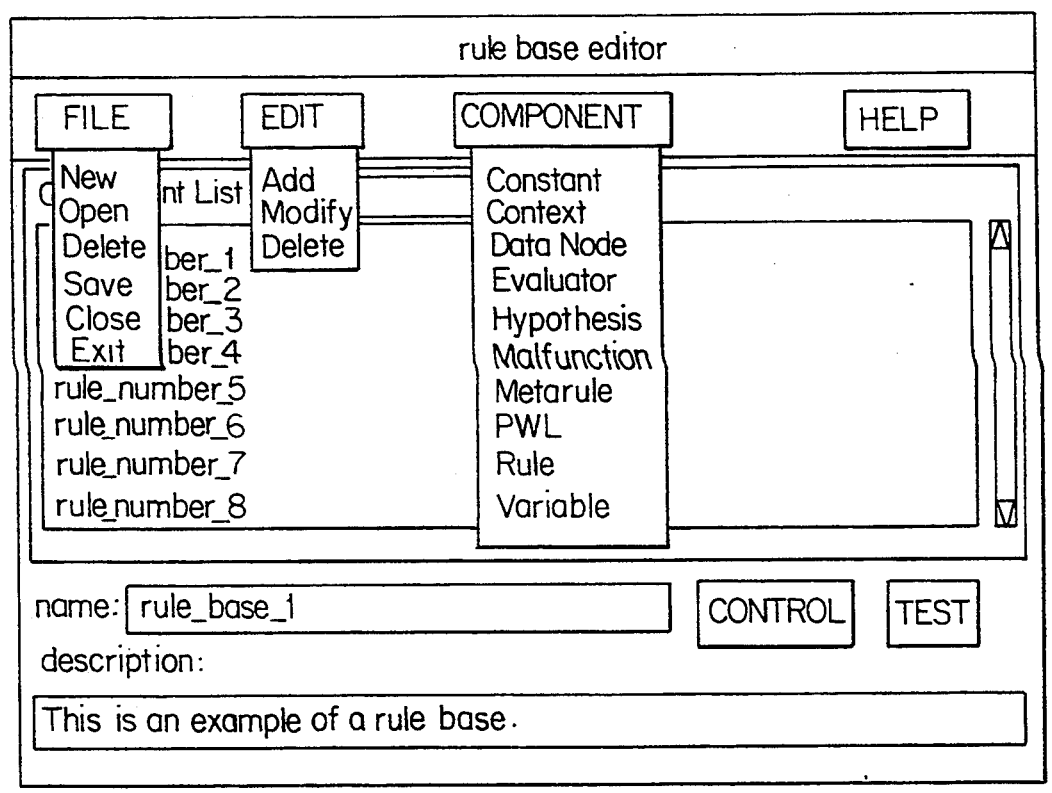
FIG. 55 is a diagram of a top level rule-based editor window.

To start a rule base editing session, the developer chooses the selection, "COMPONENT—Rule Base" from the top level developer's menu. When chosen, this selection opens the top level rule base editor window on the developer's display. This is shown in FIG. 55. This window contains the overall rule base editing session management options. These options are: FILE (actions to work with different rule bases), COMPONENT (to edit specific components of a particular rule base), and HELP. There are also quick buttons labeled TEST and CONTROL. The former is a link to the testing functions that allow a rule base to be tested. See Section 9 for details. The latter is a direct link to the control editing function, described in Section 5.

FILE Menu

If FILE is selected, a drop-down menu appears with the following choices: New, Open, Delete, Save, Close, and Exit.

FILE—New

The New menu selection is chosen to begin the creation of a new rule base. When this menu selection is chosen, a dialog window is opened. This dialog window contains two fields. The first field is the Name: field, which must be filled with a name that will be used to identify the rule base. The second field is the Description: field, which should be filled with a brief description of the purpose of the rule base. If the "OK" action button is pressed, the new rule base is created. This rule base becomes the current rule base for the rule base editor top level window. The name and description of the rule base are displayed in the appropriate fields in this window.

FILE—Open

Choosing the Open menu selection opens a window that contains a selection list of the current rule bases that are defined within the current application. One of these rule bases can be opened for editing by double-clicking on the desired rule base's name, or by entering the rule base name in the data entry window. The directory can be changed by double clicking on another directory name.

FILE—Save

Choosing the Save menu selection causes the shell to save the current rule base into a rule based description file.

FILE—Close

The Close menu selection closes the current rule base, and removes the rule base specific information from the fields in the top level rule base editor's window.

FILE—Exit

Choosing this option causes the rule base editor to be closed.

COMPONENT Menu

The COMPONENT menu gives the developer access to edit specific parts of the current rule base.

COMPONENT—Constant

Figure 56:
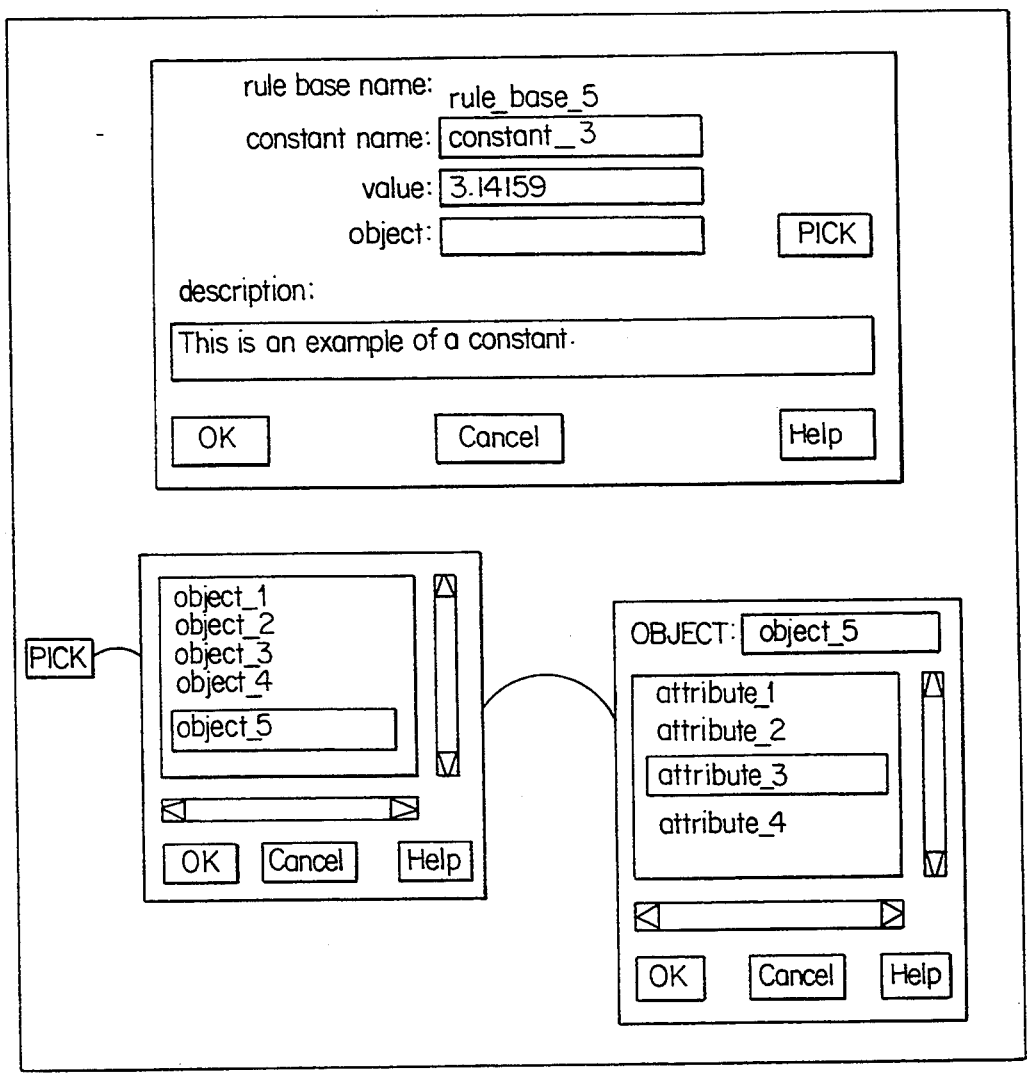
FIG. 56 is a diagram of a constant editor window.

To create a constant, the Constant menu selection is chosen. This opens a constant editor window that has the following fields: name, object, value, and description. The object field does not have to be filled (associating an object-attribute with a constant allows the constant value to be posted to the blackboard.) FIG. 56 shows the appearance of the constant editor window.

COMPONENT—Context

To create a context, the Context menu selection is chosen. This opens a context Editor window that has the following fields: name, value, and description. The value field is a binary selection; it is displayed as a set of two radio buttons, with the values of 0 or 1. When the window is opened, this field assumes a default value of 1. FIG. 57 shows the appearance of the context editor window.

COMPONENT—Data Node

To create a data node, the Data Node menu selection is chosen. This opens a Data Node Editor Window that has the following fields: name, object, and description. FIG. 58 shows the appearance of the data node editor window.

COMPONENT—Evaluator

To create an evaluator, the Evaluator menu selection is chosen. This opens an Evaluator Editor Window that has the following fields: name, variable, expression, context, and description. The variable and context fields can be filled by using the PICK button, which will display a selection list of the allowable names. The expression can be entered directly into the field or the EDIT button can be pressed to give access to the expression editor. FIG. 59 shows the appearance of the evaluator editor window.

COMPONENT—Hypothesis

To create a hypothesis, the Hypothesis menu selection is chosen. This opens a Hypothesis Editor Window that has the following fields: name, object, and description. The object field does not have to be filled. FIG. 60 shows the appearance of the hypothesis editor window.

COMPONENT—Malfunction

Figure 61:
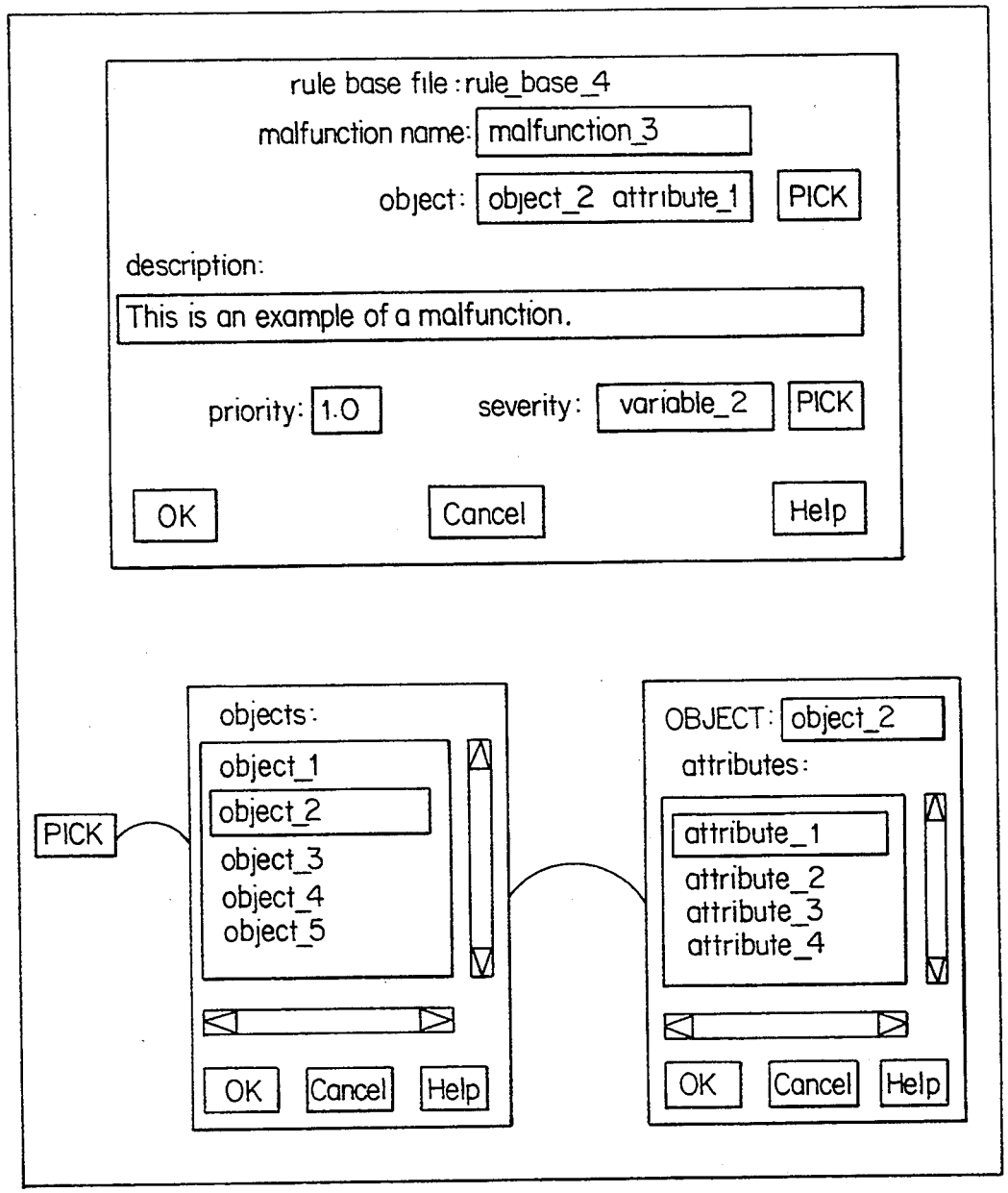
FIG. 61 is a diagram of a malfunction editor window.

To create a malfunction, the Malfunction menu selection is chosen. This opens a Malfunction Editor Window that has the following fields: name, object, description, priority, and severity. The priority and severity fields must each be filled in with a number between 0.0 and 1.0. FIG. 61 shows the appearance of the malfunction editor window.

COMPONENT—Metarule

To create a metarule, the Metarule menu selection is chosen. This opens a Metarule Editor Window that has the following fields: name, source, target list, target slot, target function, context, counter and description. FIG. 62 shows the appearance of the metarule editor window.

Each entry in the target list has an associated slot and function. The allowable values for slot are limited to SF, NF, or value. SF and NF are allowable only for target rules, and value is allowable only for target contexts.

COMPONENT—PWL

To create a piecewise linear function, the PWL menu selection is chosen. This opens a piecework linear editor window that has the following fields: name, X-Y list, and description. The application developer fills the X-Y list with a set of ordered pairs of real numbers that represent the breakpoints of the piecework linear. FIG. 63 shows the appearance of the PWL editor window.

COMPONENET—Rule

To create a rule, the Rule menu selection is chosen. This opens a rule editor window that has the following fields: name, action list, alpha, beta, SF, NF, context, and description. The evidence expression field requires that an expression be entered which is syntactically valid. Access to the expression editor is available by using the EDIT button next to the evidence field. The hypothesis list must be comprised of all valid hypotheses in the rule base. These can be added or deleted by use of the appropriate action button next to the list.

Figure 65:
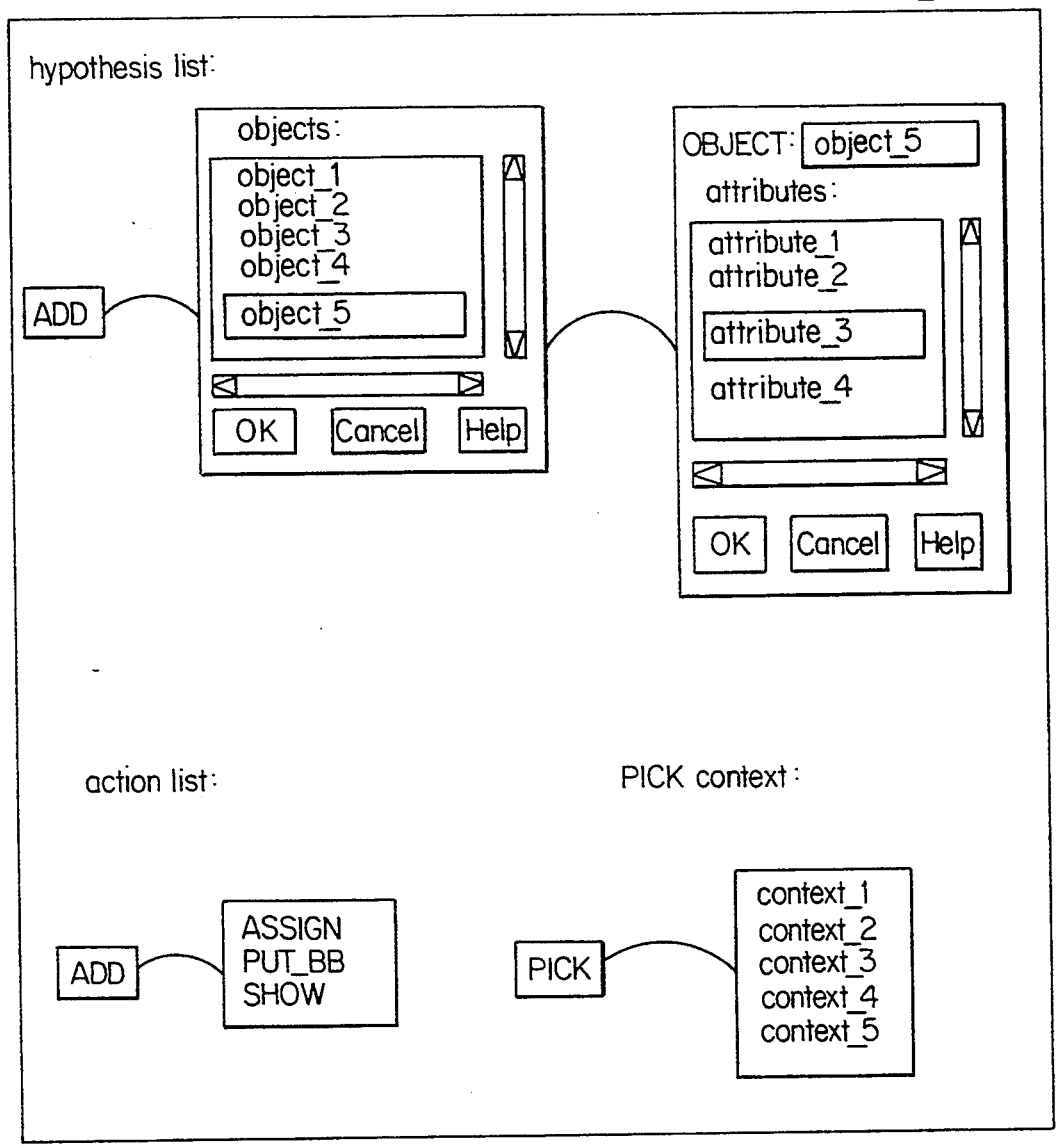
FIG. 65 is a diagram showing rule editor window options.

The appearance of the Rule Editor Window is shown is FIG. 64. Associated menus that appear in the Rule Editor Window are shown in FIG. 65. The available actions are described in Appendix B.

COMPONENT—Variable

Figure 66:
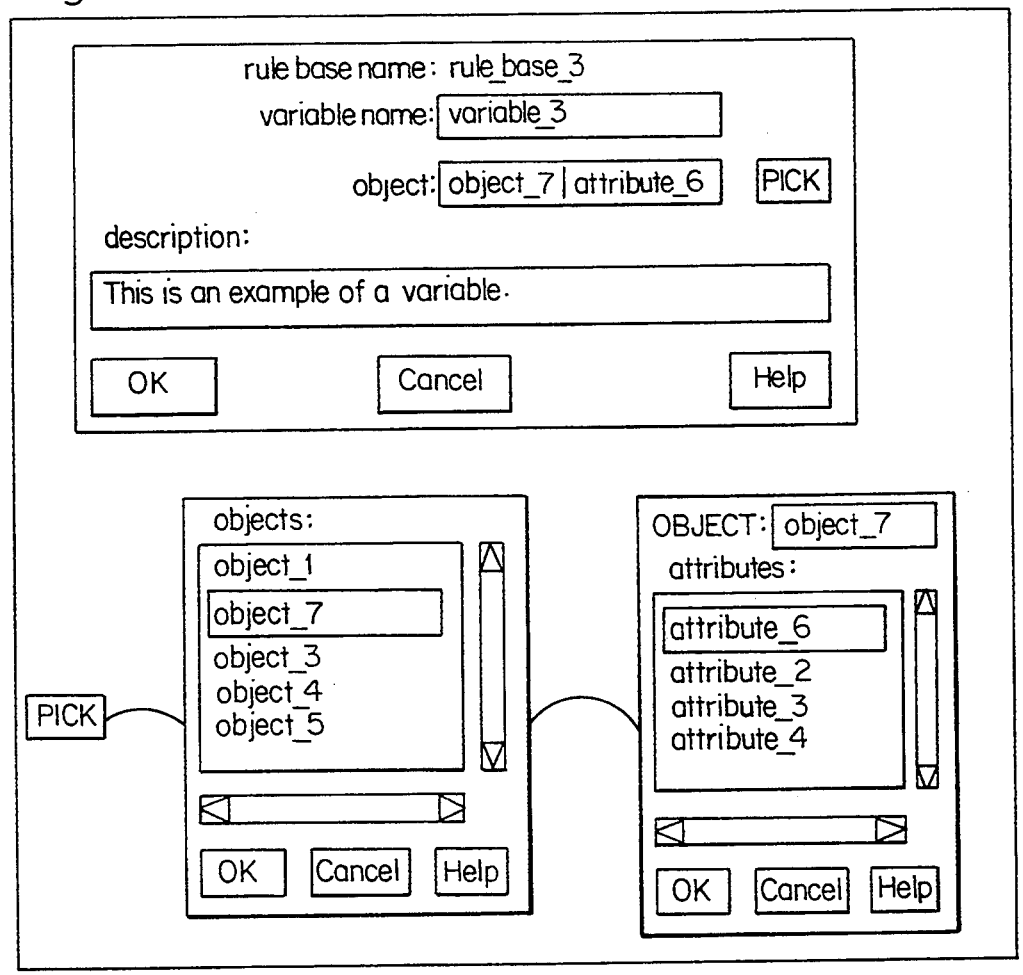
FIG. 66 is a diagram of a variable editor window.

To create a variable, the Variable menu selection is chosen. This opens a variable editor window that has the following fields: name, object, and description. The object field does not need to be filled. FIG. 66 shows the appearance of the variable editor window.

Tools

Blackboard Checker

The development of a rule base involves specification of object-attributes as input, intermediate, and output nodes. In order to ensure that the rule base being edited is up to date with the current state of the blackboard, the rule based editors check for the existence of referenced object-attributes when they are entered into the rule base.

If the blackboard is being edited, it is possible that the developer may delete or rename object-attributes that are being used by a rule base. If the rule base is not currently being edited, then the inconsistency is not noted. Once the rule base is invoked, the inconsistency will be recorded either through the editor or by being specified in the run-time environment.

Rule Base Testing

After a rule base is created, it can be tested by activating the TEST portion of the development environment. For convenience, a quick button to activate the knowledge source portion of the test environment is provided in the top level rule base editor window. Pressing this test button activates the test environment with the current rule base "pre-loaded". This allows the application developer to quickly test the rule base that has just been created. Details of the knowledge source testing environment are given herein.

Case Base Development

A case-based knowledge source is created or modified by using the Case Base Editor. The case base editor provides the tools needed to specify all of the information necessary to create a case-based knowledge source.
Getting Started Knowledge source development is a significant part of the application development process. Before using the case base editor, the application developer should have a concept of the cases that will comprise the case base. The case base editor is designed to assist the application developer in entering information; the editing process will proceed more quickly if the developer also understands the case base functionality itself.

The case base editor is invoked from the top level window of the application development environment. The case base editor is closed by the application developer when the editing process is completed. The individual windows that comprise the case base editor can also be used as a browser to inspect parts of a case base that have already been created.

The case editor displays are somewhat complex, when compared with other displays in the application development environment. In some instances, there are two very similar displays; which display is used depends on the scoring method selected. In the descriptions to follow, displays that are described with "(magnitude)" are screens used for magnitude and time-magnitude scoring, those with "(symbol)" are used for symbol-to-symbol scoring.

Figure 67:
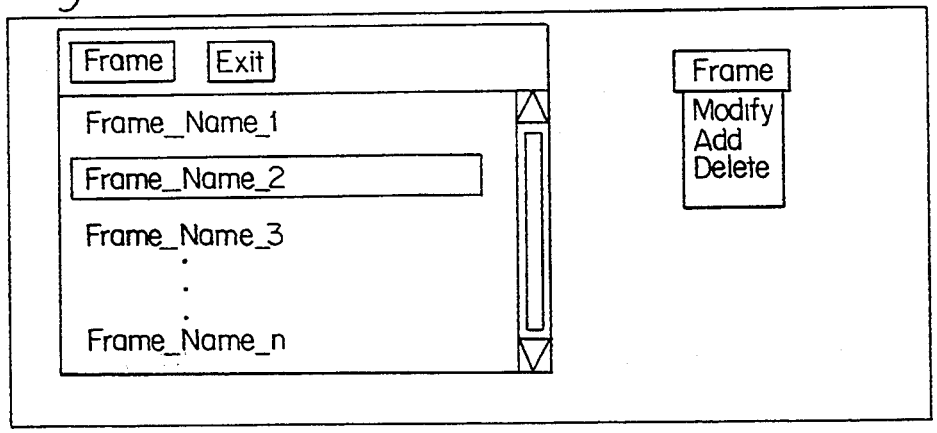
FIG. 67 is a diagram of a frame library display.
Figure 68:
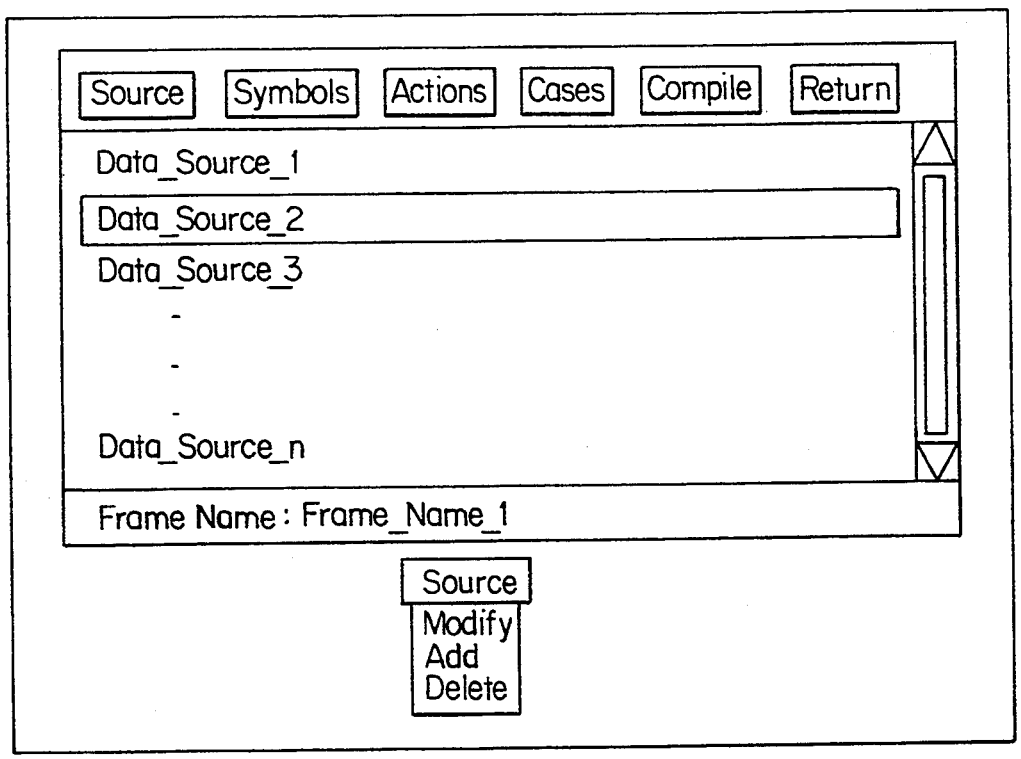
FIG. 68 is diagram of a frame display.
Figure 69:
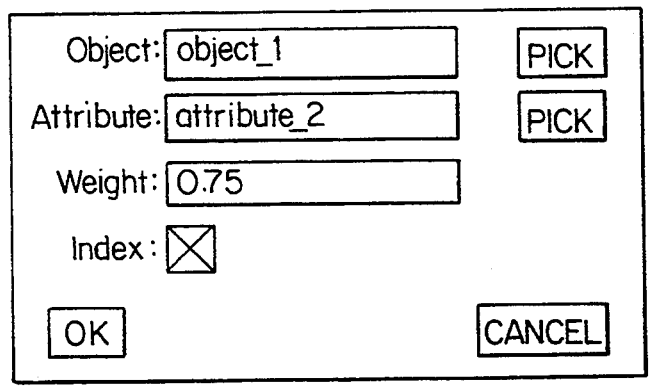
FIG. 69 is a diagram of a data source display.
Figure 73:
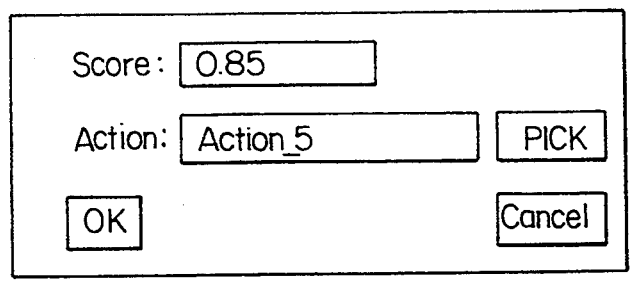
FIG. 73 is a diagram of an action display.
Figure 74:
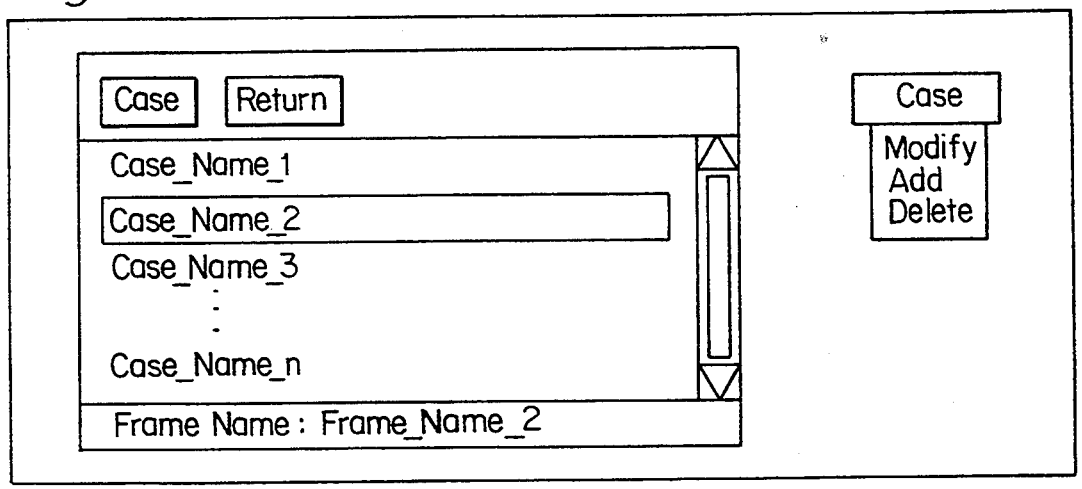
FIG. 74 is a diagram of a case-based display.
Figure 75:
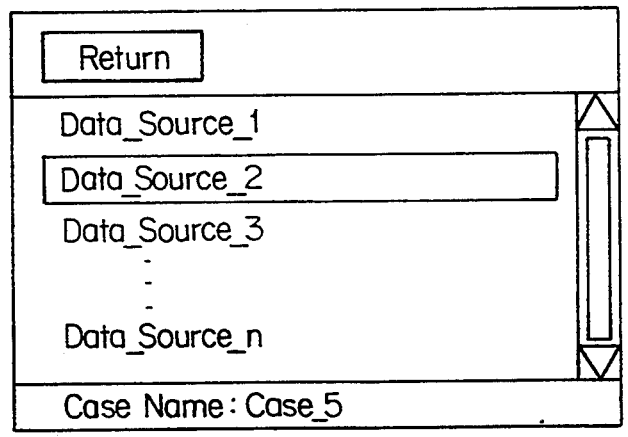
FIG. 75 is a diagram of a source select display.

There are two sets of data involved in case base development. The case frame library is a file which contains the definition (frame) of each case base in the shell, specifically, which object/attributes are used to represent a case. There is only one case frame library in the shell. For each frame, a corresponding case base contains instantiations of that case frame, each instantiation representing one case. These instantiations are what the current data are compared against. Each case base is contained in its own file.
Case Base Editor Displays
Frame Library Display When the case base editor is started, a display is opened that contains an area for the display of all case frames in the frame library, and the function buttons "Frame" and "Exit" (FIG. 67). Clicking on a frame selects that frame. Clicking on "Frame" displays a menu of actions: "Modify Frame", "Add Frame", and "Delete Frame". Clicking on one of the items performs the associated action. The default (double-click) action is "Modify Frame". Clicking on the "Exit" button exits the Case Base Editor.
Frame Display When a case frame is added or modified, a display is opened (FIG. 68) that contains the list of data sources that are defined for the selected frame, and the function buttons "Source", "Cases", "Compile", "Symbols", and "Actions". Clicking on a data source selects that source. Clicking on "Source" displays a menu of actions: "Modify Source", "Add Source", and "Delete Source". The user clicks on one of these items to perform the desired action. The default (double-click) action is "Modify Source". Clicking on "Cases" calls up the Case Base Display for the current frame. Clicking on "Compile" performs compilation of the case base. Clicking on "Symbols" calls up the Symbol Table Display. Clicking on "Actions" calls up the Case Actions Display. These actions will be described in detail below.
Data Source Display When a data sources is added or modified, a display is opened that contains the entry fields for the object, attribute and weight (FIG. 69). A button is available to indicate that this data source is to be an index. "Pick" buttons are available for selection of the object and attribute names. Clicking on the "OK" button saves the changes, "Cancel" aborts the changes.
Symbol Table Display The Symbol Table Display, (FIG. 70) contains the list of all string pairs that are usable when scoring by the symbol-to-symbol comparison operator, and the function buttons "Symbol", and "Return". The first column contains the strings which a case datum may contain, the second column contains the strings which a live value may contain, the third column contains the score for that combination. Clicking on "Symbol" displays a menu of actions: "Modify Symbol", "Add Symbol", and "Delete Symbol". The user clicks on one of these items to perform the desired action. Clicking on the "Return" button returns to the Frame Display.
Symbol Display When a symbol is added or modified, a display is opened that contains entry fields for the case string, live string, and score (FIG. 71). Clicking on the "OK" button saves the changes, "Cancel" aborts the changes.
Case Actions Display The Case Actions Display (FIG. 72) contains a list of the actions defined for the current case frame, along with the scores above which each action is taken, and the function buttons "Action" and "Return". Clicking on "Action" displays a menu of actions: "Modify Action", "Add Action", and "Delete Action". The user clicks on one of these items to perform the desired function. Clicking on the "Return" button returns to the Frame Display.
Action Display When an action is added or modified, the Action Display is shown (FIG. 73). This display contains entry fields for the action (for which a "Pick" button is available) and the score above which the action is to be taken. Clicking on the "OK" button saves the change, the "Cancel" button aborts the changes.
Case Base Display When a case base display is selected, the window (see FIG. 74) is filled with the list of the cases defined for the selected case frame, and function buttons "Case" and "Return". Clicking on a case selects that case. Clicking on "Case" displays a menu of actions: "Modify Case", "Add Case", and "Delete Case". The user clicks on one of these items to perform the desired action on the selected case base. The default (double-click) action is "Modify Case". Clicking on "Return" returns to the Frame Display. These actions will be described in detail below.
Source Select Display When a case is to be added or modified, the Source Select Display is shown (see FIG. 75), to permit the user to select the data source that should be modified. The display contains the list of data sources defined for the current frame, and function buttons "Return" and "Cancel". Clicking on a data source selects that source and calls the Case Data Display. Clicking on "Return" returns to the Case Base Display. "Cancel" also returns to the Case Base Display, but aborts any changes that were made to case data.

Note that this is different from the data source display associated with the frame library. At this point in the process, the user is not permitted to modify the data source list in any way. This list is used only for the purpose of selecting a data source and anchoring the case data for each data source.

Case Data Display

When a data source is selected, a display is opened (see FIG. 76) that contains the list of the values that are defined for the selected source, and the function buttons "Value" and "Return". Clicking on a value selects that value. Clicking on "Value" displays a menu of actions: "Modify Value", "Add Value", and "Delete Value". The user clicks on one of these items to perform the desired action. The default (double-click) action is "Modify Value". Clicking on "Return" returns to the Source Selection Display. These actions will be described in detail below.

Case Datum Display

When a case datum is to be added or modified, a display is opened that contains entry fields, and function buttons "OK" and "Cancel" (FIG. 77). The entry fields permit selection of the value type (for which a "Pick" button may be used), the value, timestamp, and weight. In addition the scoring operator and operator-specific values must be entered. This will be described in detail later.

Case Base Editor Functions

Modifying a Case Frame

To modify a case frame, select the frame to be modified by clicking on the desired frame in the Frame Library Display. Then click on the "Frame" button and select "Modify" from the menu. The selected frame will be displayed in the Frame Display. When the modifications are complete, click on the "Return" button to return to the Frame Library Display.

Adding a Case Frame

To add a case frame, click on the "Frame" button of the Frame Library Display and select "Add" from the menu. An empty Frame Display will be displayed where the frame information may be entered. When complete, click on the "Return" button to return to the Frame Library Display.

Deleting a Case Frame

To delete a case frame from the library, go to the Frame Library Display and click on the desired frame. Then click on the "Frame" button and select "Delete" from the menu. A dialogue box will be displayed requesting confirmation. Clicking on "OK" deletes the frame, clicking on "Cancel" aborts the operation.

Modifying a Data Source

To modify a data source, select the source to be modified by clicking on the desired source in the Frame Display. Then click on the "Source" button and select "Modify" from the menu. The selected source will be displayed in the Data Source Display. When the modifications are complete, click on the "OK" button to return to the Frame Display. Clicking on "Cancel" aborts the operation.

Adding a Data Source

To add a data source, click on the "Source" button of the Frame Display and select "Add" from the menu. An empty Data Source Display will be displayed where the source information may be entered. When complete, click on the "Return" button to return to the Frame Display.

Deleting a Data Source

To delete a data source from a case frame, go to the Frame Display and click on the desired object/attribute in the data source list. Then click on the "Source" button and select "Delete" from the menu. A dialogue box will be displayed requesting confirmation. Clicking on "OK" deletes the data source, clicking on "Cancel" aborts the operation.

Modifying a Symbol Pair

To modify a symbol pair, select the pair to be modified by clicking on the desired pair in the Symbol Table Display. Then click on the "Symbol" button and select "Modify" from the menu. The selected pair will be displayed in the Symbol Display. When the modifications are complete, click on the "OK" button to return to the Symbol Table Display. Clicking on "Cancel" aborts the operation.

Adding a Symbol Pair

To add a symbol pair, click on the "Symbol" button of the Symbol Table Display and select "Add" from the menu. An empty Symbol Display will be displayed where the strings and score information may be entered. When complete, click on the "OK" button to return to the Symbol Table Display.

Deleting a Symbol Pair

To delete a symbol pair from the symbol table, go to the Symbol Table Display and click on the desired pair. Then click on the "Symbol" button and select "Delete" from the menu. A dialogue box will be displayed requesting confirmation. Clicking on "OK" deletes the data source, clicking on "Cancel" aborts the operation.

Modifying a Case Action

To modify a case action, select the action to be modified by clicking on the desired action in the Case Action Display. Then click on the "Action" button and select "Modify" from the menu. The selected action will be displayed in the Action Display. When the modifications are complete, click on the "OK" button to return to the Case Actions Display. Clicking on "Cancel" aborts the operation.

Adding a Case Action

To add an action to a selected case, click on the "Action" button of the Case Action Display. An empty Action Display will be displayed into which the action data can be entered. A "Pick" button is available for entering actions. When complete, clicking on "OK" saves the action. Clicking on "Cancel" aborts the operation.

Deleting a Case Action

To delete an action from a selected case, first select the desired action by clicking on the entry in the Case Action Display, then click on "Action" and select "Delete" from the menu. A dialogue box will be displayed requesting confirmation. Clicking on "OK" will delete the action, clicking on "Cancel" aborts the operation.

Modifying a Case

To modify a case in the current case base, select the desired case by clicking on its entry in the case menu. Then click on the "Case" button and select "Modify" from the menu. This will display the Source Selection List from which the data to be modified may be selected. Processing the case data will be described below.

Note that only case data may be changed via this method. Modifying the data sources, actions, and symbols must by done by editing the case frame.

Adding a Case

To add a new case to the current case base, click on the "Case" button and select "Add" from the menu. The Source Selection List will be displayed, where the user can specify the first data source to be added. Processing the case data will be described below. When complete, clicking on "Return" saves the case and returns to the Frame Display. Note that only case data may be changed via this method. Modifying the data sources, actions, and symbols must by done by editing the case frame.

Deleting a Case

To delete a case from the current case base, select the desired case by clicking on its entry in the Case Base Display. Then click on the "Case" button and select "Delete" from the menu. A dialogue box will be displayed that requests confirmation. Clicking on "OK" deletes the selected case and returns to the case menu. Clicking on "Cancel" aborts the operation.

Modifying a Case Datum

To modify a case value, select the value to be modified by clicking on the desired value in the Case Data Display. Then click on the "Value" button and select "Modify" from the menu. The selected value will be displayed in the Case Datum Display. When the modifications are complete, click on the "OK" button to return to the Case Data Display.

Adding a Case Datum

To add a case datum, click on the "Value" button of the Case Action Display and select "Add" from the menu. An empty Case Datum Display will be displayed into which the data can be entered. A "Pick" button is available for entering data types and scoring operators. When complete, clicking on "OK" saves the action. Clicking on "Cancel" aborts the operation.

Deleting a Case Datum

To delete a case datum, select the desired value by clicking on its entry in the Case Data Display. Then click on the "Value" button and select "Delete" from the menu. A dialogue box will be displayed that requests confirmation. Clicking on "OK" deletes the selected case and returns to the Case Data Display. Clicking on "Cancel" aborts the operation.

Compiling a Case Base

To compile the current case base, click on the "Compile" button from the Frame Display. Compiling a case base involves several steps. First, a list of all object/attributes used in the case base is generated. Second, a similar list is generated from the current blackboard configuration. The two lists are compared to assure that all object/attributes that are referenced in the case base are contained in the blackboard. If there are discrepancies, the list of case/data source pairs that are affected will be displayed, and the compile is aborted.

If there are no problems, the development case base will be reformatted into a faster, more compact representation to be used at runtime. When this process is complete, control is returned to the Frame Display.

Exitting the Case Base Editor

To exit the case base editor, click on the "Exit" button from the Frame Library Display.

Development of the Runtime User Interface

This section describes the portion of the Domain Shell used to develop the runtime end-user interface. By using the tools described here, an application developer defines the appearance of the displays that are shown to end-users.

Views

A view is a composite display which communicates information to the end-user via a mix of display resources: pictures, graphs, tables, menus, etc. The basic intent is that a view presents to the end-user a graphical representation of some physical item, together with associated information. There may be multiple views for an item. If the item is represented in the blackboard, then the developer can specify the object and attribute which this view represents.

It is desirable to provide the end-user with a mechanism by which different, yet related views can be quickly examined. Two such mechanisms are available: menus, and graphical hot-spots.

A hot-spot is a rectangular area on a display that becomes 'hot' when the cursor is moved over it. When the area becomes 'hot' it is marked by a dotted line around it. As the mouse moves out of this region, then the dotted rectangle disapears. Other types of resources (as described in the following subsections) can be associated with hot-spots or with menu selections.

As views are linked in this manner, a hierarchy of graphical information is developed. Note that this hierarchy closely mirrors the hierarchy of the blackboard. The two however do not overlap.

Getting Started

Figure 78:
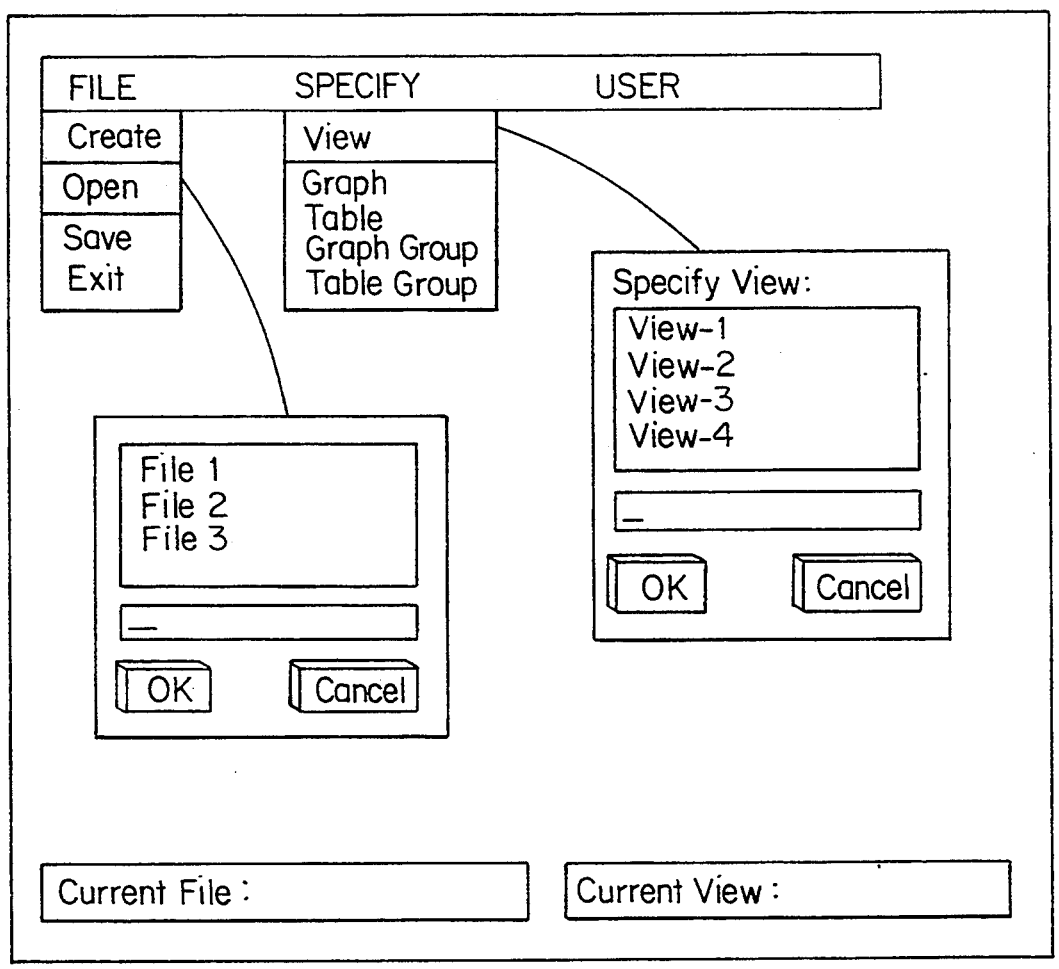
FIG. 78 is a diagram of a run time interface editor top level screen.

In order to start the development of the runtime user interface, the application developer chooses the "COMPONENT—Views" selection of the top level menu (FIG. 48). This selection opens the top level views editor window, shown in FIG. 78.

The options available at this point are as follows:

1. FILE: The file command permits the developer to create a new file, open an old file, or to save the current file. The file specified is a view database file. Each view database file contains all of the end-user view specifications for a particular application, and a particular end-user. This pull-down selection pops up a menu with the following selections:

Create: start a new view database file. This would be the first thing to do anytime new view database is desired. If currently editing an old database, then be sure to save it before selecting the 'Create' menu selection. Once 'Create' is selected, a selection box is displayed. This box permits the specification of the name of the new database file. Once the 'ok' button is pressed, the program is now ready to start with the specification of new views, graphs, tables, etc. One additional entry field permits the selection of a user or a group to be associated with this application (the specification of users and groups is defined later). If a user or a group is chosen then only that user or the set of users belonging to the group will be permitted to run the particular interface being defined.

Open: use an already existing view database. The selection box permits the selection of a view database from a list of currently existing ones, or by typing the name of the desired database file in the text entry area. This selection box is essentially the same as the 'create' selection box, except that the application will be loaded from disk first, rather than a new one being created. At this point information in the view database is loaded and is available for editing.

Save: writes the current view file to disk. This selection must be used before the 'Create' and 'Exit' selections, in order to save the specified views.

Exit: terminate the development window and all associated windows. Return to the top level window.

2. SPECIFY: This pull-down menu allows the developer to choose which type of resource to work with next. Each of the SPECIFY choices will first pop up a selection box enabling the application developer to pick from a list of the available items, or to enter the name of a new item. One example of this is shown in the 'Specify View' portion of the above FIG. 75. Each one of the following choices is described in more detail in subsequent sections:

View

Graph

Table

Graph Group: a group of graphs is a list of multiple graphs which will be displayed together.

Table Group: a group of tables is a list of multiple tables which will be displayed together.

Specifying The Runtime User Interface

Views (System Displays)

Figure 79:
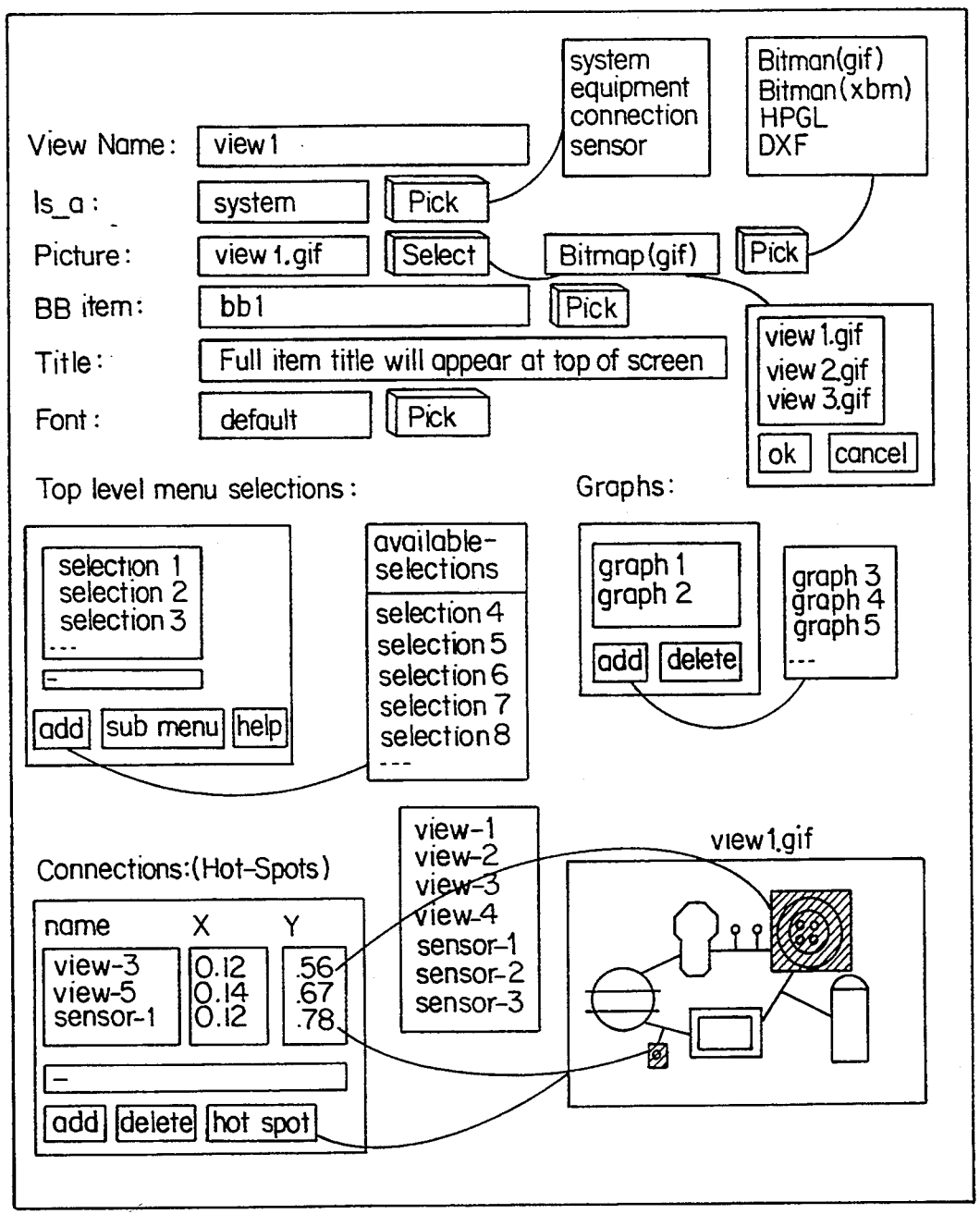
FIG. 79 is a diagram of a system display specification.

This section describes how composite displays are specified by the application developer. The view editor screen, shown in FIG. 79, is reached by selecting 'SPECIFY—View' in the runtime user interface editor. The following fields can be defined for each view (note that some entries are optional):

View Name

The view name is the name associated with a new view being created or an old one being edited. The name should be a unique name associated only with this view. However, the name of a view can be the same name as the name of an object in the blackboard.

View Type

The view type is specified in the is-a attribute. Although the name of the attribute was chosen in order to suggest its similarity to the blackboard 'is-a' attribute, it should be noted that there is no concept of inheritance, as far as views are concerned. The main purpose of the attribute is to specify a grouping of the views in one of several predetermined types. A PICK button is provided, which will offer one of the following choices (more can be added): Sensor: A sensor would typically be any device located on or near equipment for the purpose of measuring information. Typically, the hotspots associated with sensors do not expand to further graphical views, but rather to actual sensor information.

Equipment: Equipment would be any component which can be represented as a picture or a view.

Connection: A connection is typically one of the following: pipes, wires, supports, or anything used to connect one component to another. The connection itself is also represented as a view.

System: A system is usually specified as a collection of equipment, connections, sensors, and other systems. The system is also represented as a view.

Again, it is important to note that the principal purpose of the is-a attribute in this case is to provide a natural grouping of the displays, in a way that would facilitate searches for specific views. On the other hand, sensors are not typically represented by graphical views, but are represented by 'data display' type views.

View Picture

In order to select a background picture to be displayed with a view, the application developer must specify the name of the file in which the graphical image is stored. It is recommended practice that all the disk files containing images related to an application be stored in one default subdirectory of the application directory. In this way, a selection window of all the existing pictures can be perused if the PICK button associated with the picture selection is clicked. (The default subdirectory name 'picture' is used, but it can be changed by the application developer if desired.) Pressing the PICK button associated with the picture type field causes a menu of graphic format choices. Here the choices are bitmapped images, or one of two types of vector based images (HPGL files or DXF files). Each choice is explained below.

Bitmapped Images

Bitmapped images are created by the application developer using external software packages such as paint programs, or by scanning an image with a digitizing scanner. The types of images that the shell accepts are GIF (Graphic Interchange Format), XWD (Xwindows Dump), and XBM (Xwindows Bitmap). Other image types can be used to create the image using external packages; conversion utilities are available that translate various other types to one of the three formats understood by the shell.

Vector Based Images: HPGL Files

Like bitmapped images, the application developer must create HPGL images using an external package. Most CAD (Computer Aided Design) packages provide the application developer with the ability to plot to HPGL devices. Instead of plotting to the device, the application developer should plot to a file with the extension '.hpgl'. The advantage of HPGL files over bitmapped images is that if the runtime user scales the window containing the image, then the image resolution does not diminish as it does for bitmapped images. The window is redrawn using the vector information, rather then absolute bitmapped information. The disadvantage is that the image tends to look simplified, especially if the bitmapped image was scanned. Scanned images are much better represented using bitmaps. Also, vector based images tend not to have color shading information as do drawn or converted bitmapped images (converted from vector form to bitmapped form, and then color shaded). Another disadvantage is that vector based images tend to take much longer to display on the screen.

Vector Based Images: DXF Files

Like HPGL files, the application developer must create DXF images using whatever external CAD package is available that is compatible with DXF images. One example package is Autocad.

DXF images have the characteristic that they support the inclusion and scaling other DXF images. Included images are interpreted as hot-spots, and they correspond to separate views. The advantage of using DXF files therefore is the ease with which the developer can define new views by using components of already existing views.

Blackboard Item

The mapping between the hierarchy of views and that of the blackboard is established by specifying a blackboard object/attribute in this field.

Display Title

The text entered in this field will be displayed as the title of the Motif-style window of the view.

Menu Selections

Top level menu selections can be associated with a view. If the 'add' button is clicked, then a pop-up menu containing all of the possible menu selections is displayed, and when one is picked, it is added to the list of current menu selections for this view. The selections may also contain the name of predefined sets of submenus. This is done by clicking on the sub-menu button and picking a predefined sub-menu. Sub-menus specification will be described herein. Also, a list of the available menu selections is provided in that section.

Connections (Hot-Spots)

Hot-spots can be associated with a view once the picture has been chosen.

Creating a hot-spot is a two step process. First, the 'add' button of the 'connections' portion of the editor must be clicked, in order to select the view that will be displayed during runtime when this hot-spot will be activated by the end-user. Second the application developer has to define the area of the hot spot. This is done by positioning the mouse cursor over the upper left hand side of the desired region, followed by clicking the left mouse button, then dragging the mouse to the lower right hand side of the desired area of the hot spot being defined, and releasing the mouse button.

A hot spot is deleted by clicking on its name and then clicking on the 'delete' button. Modifying the area of an existing hot-spot requires selecting the name of the hot-spot (its associated view), followed by a click on the 'hot-spot' button. Then the application developer would proceed to define the new area of the hot-spot as described above.

Graphs

Adding or deleting existing graphs is done with the 'add' and 'delete' buttons. Adding a new (unspecified yet) graph, invokes the graph specification editor, described herein.

Data Displays

Graphs

Figure 80:
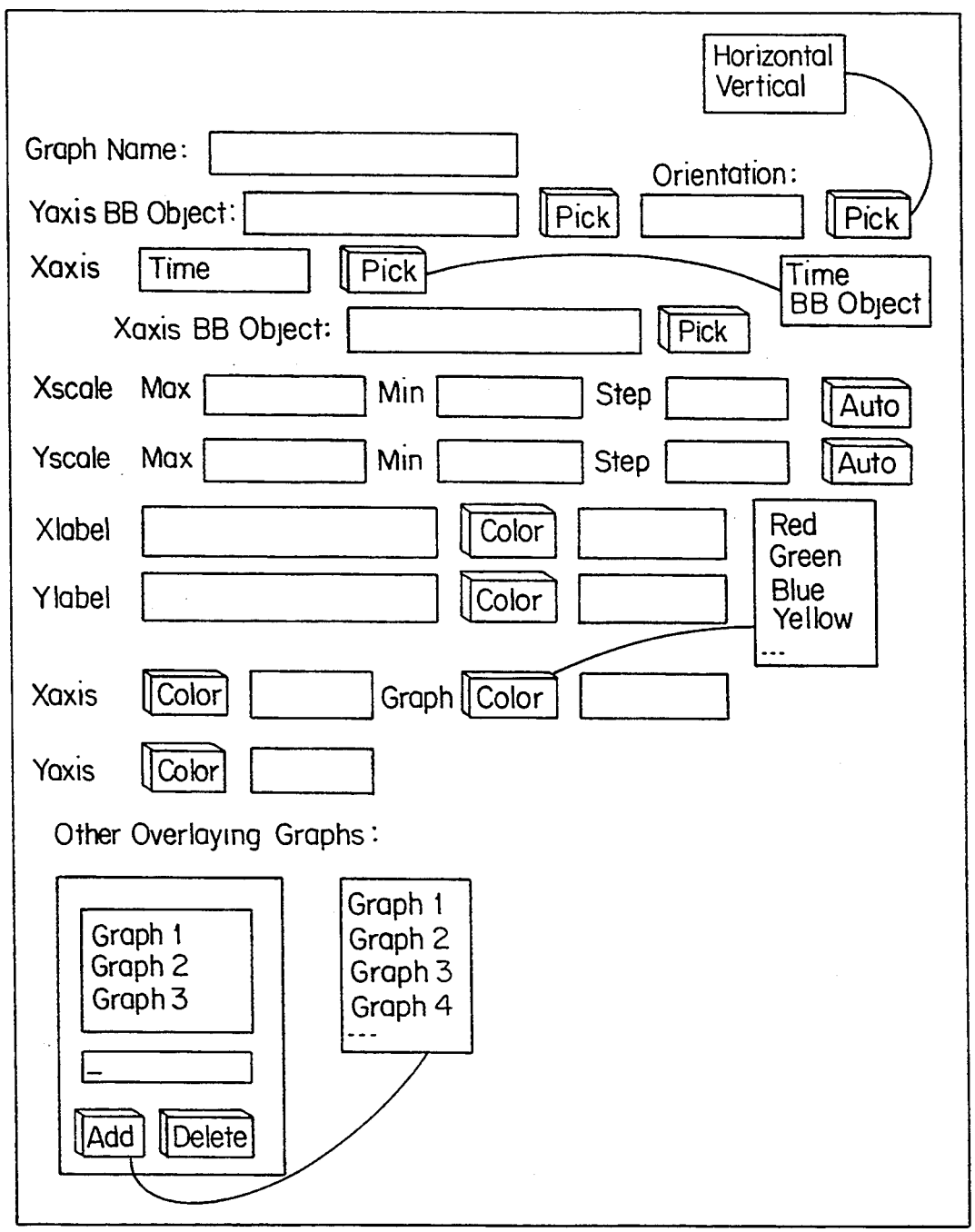
FIG. 80 is a diagram of a graph specification editor.

Graphs are one of the ways available in the shell that can be used to portray data to the end user. The graphs can show historical data (i.e., the X axis is time), or they can plot any two dimensional types of information from the blackboard (i.e., any one object/attribute value versus any other object/attribute value, as long as they have corresponding histories). FIG. 80 shows the screen used to define and edit graph information.

The graph must be given a name and an Y axis blackboard object/attribute. The other entries are optional; the application developer can specify some or all of the following. The X axis can represent time or another blackboard object/attribute. If the latter, then the blackboard must contain all of the corresponding X and Y values. The orientation of the graph can be chosen with a pop-up menu to be either horizontal or vertical. The X and Y scales can be specified, or they will be automatically selected based on the available data if 'auto' is clicked. The X and Y label text and color can be specified if desired. The color of the X and Y axis can be specified.

Finally, other overlaying graphs can be specified so that multiple curves appear overlayed together (using this graph's scaling and labeling information). In other words, if another graph is shown with this graph, then they would both appear in one window. The information for scaling would be taken from this graph's specification. Only the colors of the other graphs would be used when being displayed with this one.

Tables

Figure 81:
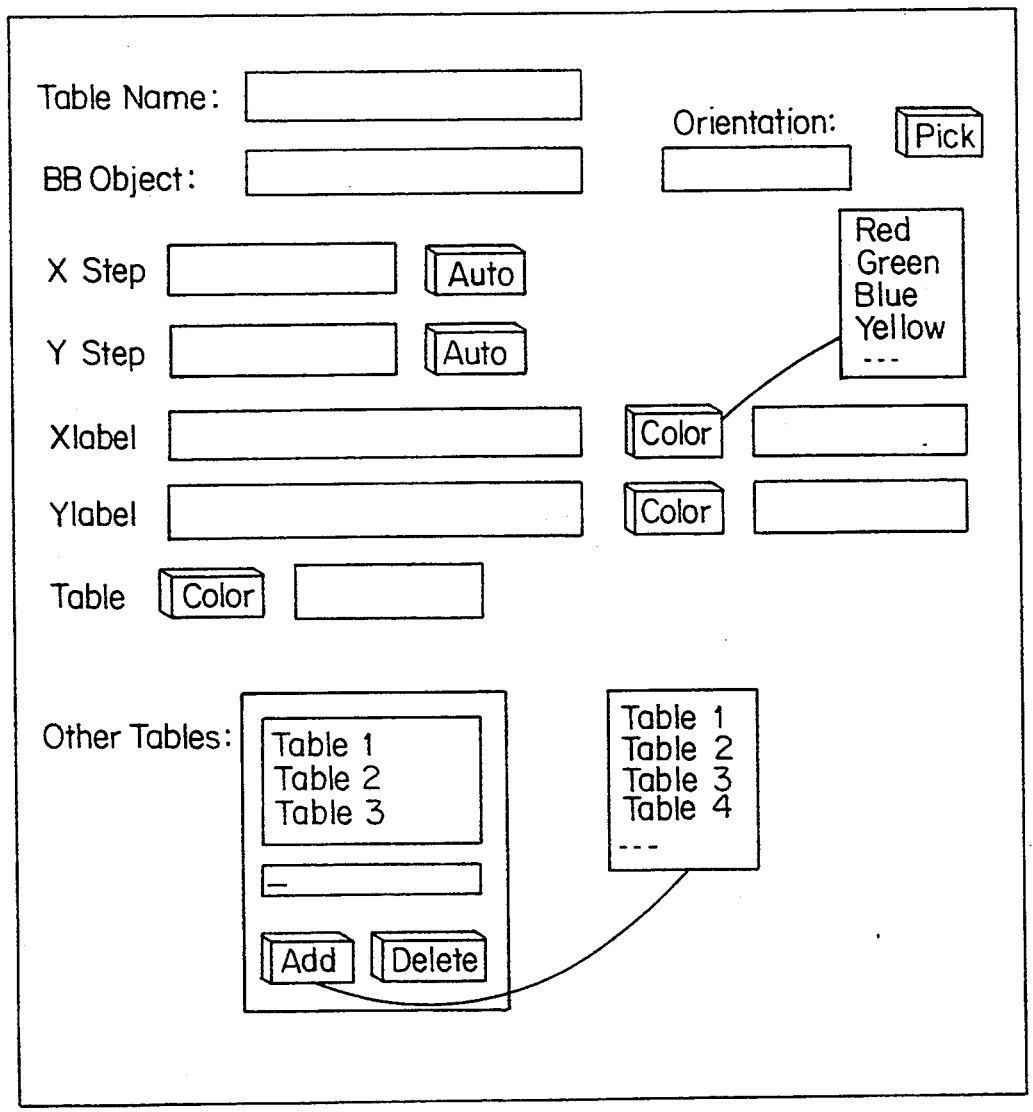
FIG. 81 is a diagram of a table specification.

Tables are used to show data from the blackboard in tabular form. If more than one column of data is to be shown, then the developer has to define more than one table, and link them to this table with the 'other tables' selection. When the end user sees the table, each column would portray information from this table and each of the successive tables listed. FIG. 81 shows the screen used to define and edit table information.

Menus

Figure 82:
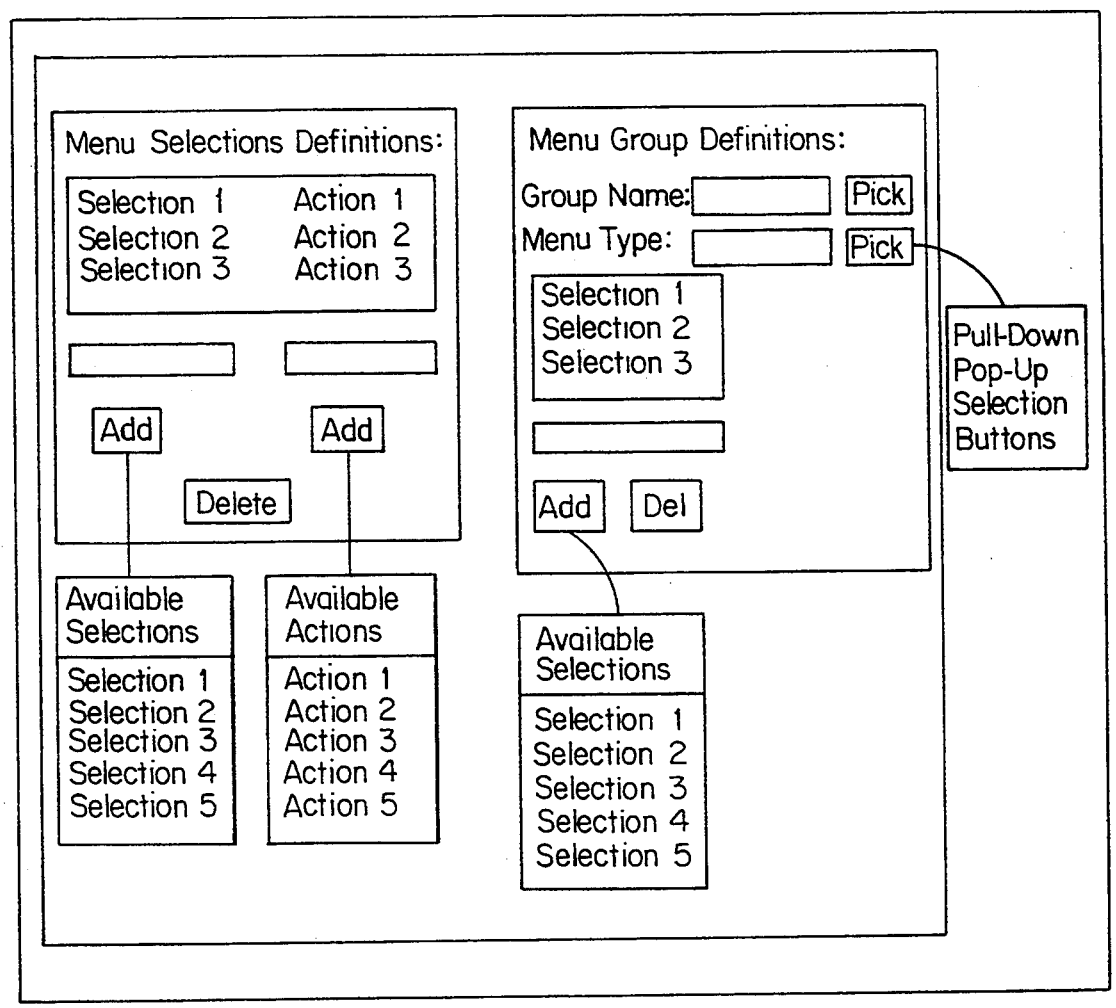
FIG. 82 is a diagram of a menu specification.

Several menu-type displays can be used by the user of the runtime environment to make selections or provide information: pull-down, pop-up, selection-box, dialog windows and buttons. Much of the menu/action information can be tied to a specific view, or sets of menus can be defined and tied to views. FIG. 82 shows the screen used to define and edit menus.

Lists of menu selections can be created, and later tied to views at the top-level menu selection level, or to other menus. This permits the application developer to specify a menu hierarchy to the end user which best fits the needs of the application and that of the end-user, while at the same time, reducing the amount of rework for similar views. The right side of FIG. 82 shows the method for specifying a menu group by picking all of the selections associated with a group and the type of menu to be used to display the group. The left hand side of FIG. 82 shows the mechanism by which menu selections are associated with actions. More than one selections text string can be associated with the same action. The available runtime menu actions are as follows:

exit: exits the runtime system.
return: returns back one level in the menu hierarchy.
help: provide help.
navigate: navigate to a new view based on the type of view desired. A list of the available views connected to this view is shown. It is also possible to navigate to the 'parents' of this view. In other words, it allows going to any of the views which have a connection to the current view.
highlight: highlight hot-spots defined for the current view.
graph: display a graph connected to this view.
table: display a table connected to this view.
information: display all of the information related to this view including the blackboard object information, if any.
tag: mark connections and add them to a bin which later can be used to graph multiple objects.

Testing an Application

The Domain Shell provides several tools to assist the application developer in testing an application. These tools are part of the application development environment. They give the developer a way to observe the operation of an application, or parts of an application, before actually activating it in the runtime environment.

For the Domain Shell, there are three types of testing that are available to the developer. The first type is previewing the appearance of the runtime user interfaces. The next type is testing individual knowledge sources. The last type of testing exercises the entire application, or major portions of it. Additionally, the developer can set test mode parameters that govern test operations.

Testing at the Views Level

The various end user views can be previewed by choosing the Views selection of the TEST command from the Top Level Developer's Window (FIG. 48). The different display elements that can be seen by end users are defined to the Domain Shell in the Views specification windows. The way that these windows are created, and the features of the different view types are described herein.

Figure 83:
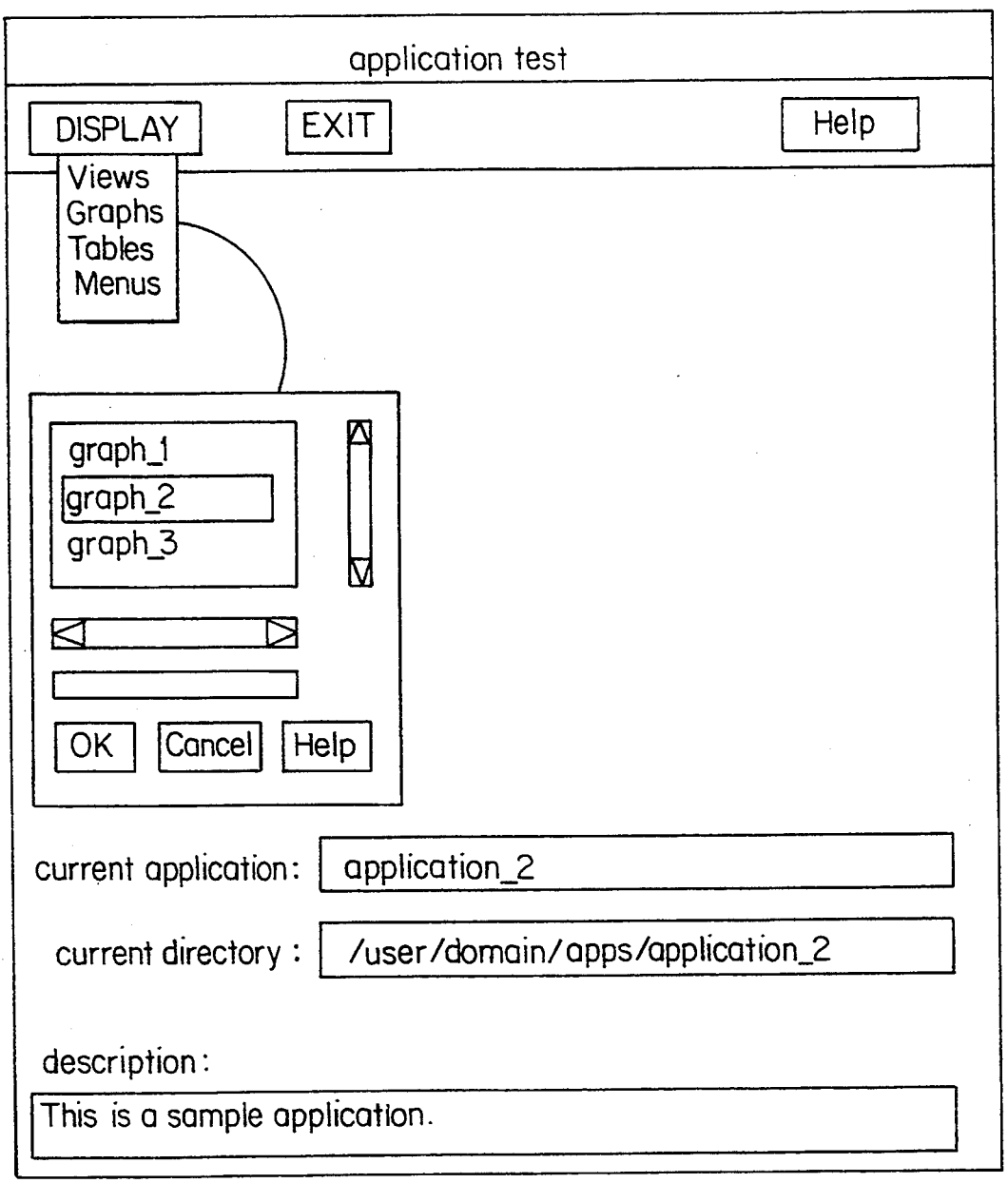
FIG. 83 is a diagram of an application test control window.

When the TEST—Views selection is chosen, a window is displayed that allows the application developer to view various parts of the user interface. This window has a menu bar that gives access for browsing through all parts of the end user interface configuration. FIG. 83 shows the appearance of the TEST—Views control window. The DISPLAY menu option is divided into the following categories: Views, Graphs, Tables, and Menus.

(Runtime) Views

Figure 84:
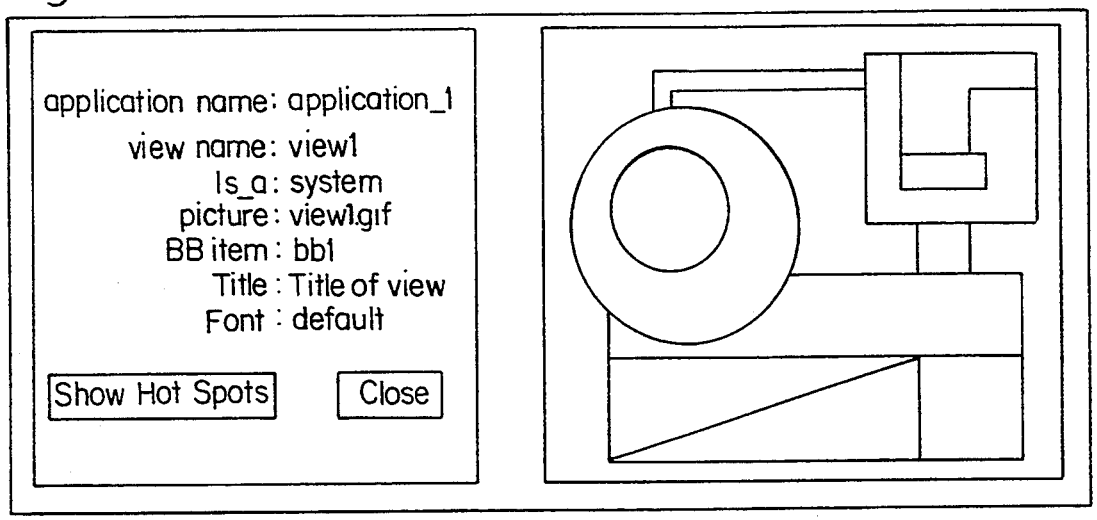
FIG. 84 is a diagram showing an example of a preview of run time views.

The list of views that are available for previewing appears as a pop-up selection list menu when the DISPLAY—Views selection is chosen. They are listed by the names defined in the View Display Specification section of the Views Development portion of the shell. When a View Name is selected, two windows are opened. FIG. 84 shows the appearance of the preview of a runtime view. One window is an information window that contains a summary of Display Specification information for the selected view. The other window shows an image of the view itself. By clicking on the "Show Hot Spots" button in the first window, all of the defined hot spots are shown on the view.

(Runtime) Graphs

The list of graphs that are available for previewing appears as a pop-up selection list menu when the DISPLAY—Graphs selection is chosen. They are listed by the names defined in the Graph Specification section of the Views Development portion of the shell. When a Graph Name is selected, two windows are opened. One window is an information window that contains a summary of Graph Specification information for the selected graph. The other window shows the layout of the graph axes and labels. The appearance of the two windows is similar to that shown in FIG. 84 for the Views previewing, except that graph-related information is displayed in the information window and the "Show Hot Spots" button does not appear.

(Runtime) Tables

The list of tables that are available for previewing appears as a pop-up selection list menu when the DISPLAY—Tables selection is chosen. They are listed by the names defined in the Table Specification of the Views Development portion of the shell. When a Table Name is selected, two windows are opened. One window is an information window that contains a summary of Table Specification information for the selected table. The other window shows the layout of the table (with no data inserted). The appearance of the two windows is similar to that shown in FIG. 84 for the Views previewing, except that table-related information is displayed in the information window and the "Show Hot Spots" button does not appear.

(Runtime) Menus

The list of menus that are available for previewing appears as a pop-up selection list menu when the DISPLAY—Menus selection is chosen. They are listed by the names defined in the Menu Specification of the Views Development portion of the shell. When a Menu Name is selected, the menu appears on the display. Actions associated with the menu selection are disabled in this mode, but the hierarchical levels of the menu and its associated sub-menus can still be traversed. While testing the menu views, an EXIT selection is always available that, when pressed, will remove the menu from the display.

Testing at the Knowledge Source Level

Testing at the knowledge source level consists of operating the inference engine associated with a knowledge source type on a particular knowledge source specification file. In order to test the knowledge source, certain test information must be specified by the developer. This information includes: the mode of test operation, names of input and output files, and a data source.

The knowledge source test option is activated by choosing the Knowledge Source selection from the TEST command menu seen in the Top Level Developer's Window.

Knowledge Source Test Control Panel

Figure 85:
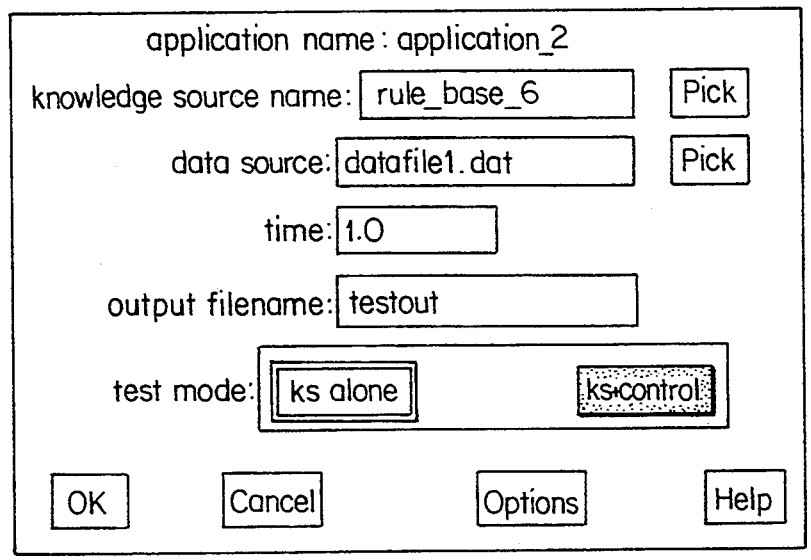
FIG. 85 is a diagram of a knowledge source control panel window.

When testing at the knowledge source level is chosen, a control window is opened. This window contains fields that tell the test environment how to test the knowledge source. FIG. 85 shows the appearance of the knowledge source test control panel. The fields of this window are described below.

Knowledge Source Name

A knowledge source is selected from the list of knowledge sources currently defined for the application. The selection is made by clicking the PICK button next to the Knowledge Source Name field. This causes a selection list of available knowledge sources to be displayed. The desired knowledge source is chosen by highlighting the knowledge source name in the list and pressing the OK button in the selection list window.

Data Source

The data source to be used for the test is specified in this field. When the associated PICK button is pressed, a list of available types of sources is displayed. These choices are: Manual, File, or Real-Time.

If Manual is selected, a new window is opened. The appearance of this window is shown in FIG. 86. This window will remain on the display as long as manual entry of data is used (until the developer explicitly closes the window). The window consists of a text entry area, a Check button, Send button, and a Close button. The developer enters the data point(s) to be used in the text entry area. Each data point is specified by an object name, attribute name, timestamp, data type and data value. Pressing the Check button causes the shell to check the data point specification for validity. The Send button causes the data to be sent to the portion of the application currently under test.

If File is chosen as the data source, a selection list of the available input data files is displayed. The desired file is selected by highlighting the filename and clicking the OK button in the selection list window. The file name is displayed in the data source field (thereby implying that the data source mode is File). Note that the input data files in the selection list are those present in the current application directory (with file extension: .dat).

If Real-Time is chosen as the data source, then no further information is needed. The data sources that were previously specified as external processes in the System Configuration are "activated". The developer must stop the operation of the test environment when testing is completed. For Manual and File data sources, the testing stops automatically when the data run is completed.

Time (Compression/Expansion)

This field is activated if File data is used. This consists of a numerical entry field where a time compression or expansion factor can be entered. A positive real number is entered here. Numbers greater than 1.0 represent time compression, and numbers less than 1.0 represent time expansion.

Output

This field is used to specify where the output of testing will go. This allows the specification of the name of the output file. The output file name entered here is used as the root file name for the output summary file that is generated during the test. Note that each knowledge source generates its own log file as well.

Test Mode

This field consists of a pair of radio buttons. The ks alone button is used for testing the knowledge source without the control sub-system being activated. The ks+control button is used for testing the knowledge source with its associated control. If the knowledge source is to be activated without associated control, then the knowledge source is fired each time that a new data packet is received. If manual input data is used, the knowledge source fires each time a new data point is entered.

The ks+control button is a quick button to another testing mode. Pressing ks+control will cause the shell to enter the TEST—System mode. In this case, the system being tested will consist of only the current knowledge source plus its associated control definitions.

Test Operation at the Knowledge Source Level

Once the test mode configuration has been set, the test of the knowledge source can proceed. The Test Operation Control Window is opened on the developer's display. It is shown in FIG. 87. This window allows the developer to start and stop the testing.

The controls at the bottom of the window let the developer Start, Stop, and Exit the test. The Start button begins the test. The Stop button causes the test to be paused. Note that real-time data, if selected as the data source, will continue to come into the system, even if the test is stopped. However, the data will not be stored in the test environment while the test is stopped. Pressing the Exit button causes the test to be terminated and all associated output files (knowledge source(s) and the summary) to be written.

In addition to the window shown in FIG. 87, the knowledge source being tested will have its own window opened on the display. Each knowledge source window displays the results of firing, as well as other operating information.

Setting Options at the Knowledge Source Level

There is a Set Options button in the Test Operation Control Window (FIG. 87). The developer can set testing options by pressing this button. The features of this window are described herein.

TEST—System

Testing at the system level allows the application developer to verify the overall operation of the various portions of the application, always involving the control portion of the application. This type of testing allows verification of the overall implementation of the application.

System Test Control Panel

In order to test at the system level, the specification of the control of the knowledge sources must be completed. Specifically, the priorities for the individual knowledge sources must be set, and the events, preconditions, and refiring conditions must be specified. This is done in the COMPONENT—Control portion of the Development Environment.

When the TEST—System choice is selected, a window is displayed that lists the knowledge sources that are currently defined for the application. This window is called the System Test Knowledge Source Configuration Window. Its appearance is shown in FIG. 88. By highlighting a knowledge source name and clicking on the DISABLE button, the knowledge source is temporarily de-activated (for testing). The ENABLE button is used to re-activate a knowledge source that was previously de-activated. Double-clicking on a knowledge source name will toggle its status.

Note that this control of the status of the knowledge source affects only the testing environment; to remove a knowledge source from the application entirely, the developer must explicitly delete the knowledge source from the top level of the application development environment.

After the knowledge sources have been set up, the developer clicks on the OK button of the knowledge source list window. This causes a System Level Control Panel to be opened. This panel is similar in appearance to the control panel for the knowledge source level testing, shown in FIG. 87, except that the knowledge source name line does not appear. Also, the test mode buttons are not enabled (system-level testing always implies control is being tested).

Test Operation at the System Level

Test operation for system level tests is similar to that for testing at the knowledge source level, described herein. The control window will appear as shown in FIG. 87. The developer sets test mode options by pressing the Set Options button.

Test Mode Options

The developer can pre-define parameters for the test mode environment to facilitate testing. This is done in the Test Mode Default Configuration Window, shown in FIG. 89. This window is accessed from the Test Operation Control Window (FIG. 87) by pressing the Set Options button. The options that are set in this window remain in effect until explicitly changed by the developer. The purpose of these options is to pre-define certain test mode parameters so that testing can proceed with less developer intervention.

The "use last knowledge source to test?" section of the window applies to the TEST—Knowledge Source mode. If "yes" is depressed, then the shell's test environment will automatically load the last knowledge source that was saved by the knowledge source editors. If "no" is depressed, then when TEST—Knowledge Source is specified, the developer must select the desired knowledge source for testing. Using "yes" allows quicker access to test the results of changes that have just been made to a knowledge source. The "output filename" field applies to the entire test environment. If a filename is specified in the "output filename" field, then the shell will automatically use this as the output filename. If this field is blank, then the developer must explicitly specify an output filename when each test is started.

The data source selection field specifies a default data source mode to be used when testing. If left blank, then the developer must manually specify the data source each time the test is started. If a specific data source type is chosen here, then the shell will automatically use the desired data source without developer intervention. The "time factor" field should be contain the desired time compression or expansion factor, if File data source is specified.

The "knowledge source test mode" section of the window allows the developer to choose a default testing mode for testing knowledge sources. If ks+control is depressed, then knowledge source testing will immediately default to include control testing. If ks only is depressed, then knowledge source testing will not include control testing. If neither button is depressed, then the shell makes no assumption about the knowledge source test mode, and the developer, leaving that selection to the developer.

The "prompt to verify test configuration?" section of the window allows the developer to choose whether or not to prompt for verification in the test mode. If "yes" is depressed, then the shell will prompt the developer to verify test mode configuration information before proceeding with a test. This will protect for accidental overwriting of currently existing output files. If "no" is depressed, then files specified in this window are immediately used in test mode (current output files may be overwritten). This can reduce developer intervention significantly.

System File

The system file contains a list of filenames identifying the blackboard structure description file, and all rule base and case description files for the system. The system file is identified as such by the suffix .sys. The file format is shown in FIG. 27.

Note that the order of files named in the system file is important. The name of the blackboard structure description file should be specified first, then all rule base description files, and finally all case description files. This is the order that is shown in FIG. 27. Only one file should be specified per line. All of the files specified in the system file should exist or initialization errors will occur.

The shell assumes that the files specified in the system file reside in the same directory as the shell executable files unless full pathnames are used in the system file.

There is an option available to determine whether to fully open a knowledge source window or iconify it. The default system operation is to iconify all knowledge source windows. However, if a ,NORMAL is placed at the end of a knowledge source file specification line, then the window associated with that knowledge source's process will be fully opened. This feature is useful for making detailed observations of the operation of a particular knowledge source. If desired, all knowledge source windows can be fully opened by using the same ,NORMAL suffix on all knowledge source file specification lines. The default behavior (iconified knowledge sources) can be explicitly specified by using ,ICON at the end of a knowledge source specification line.

Blackboard Structure Description File

The blackboard structure description file contains the definition of all objects, and all attributes for each object. Objects and attributes are identified by names given by the user. The blackboard file is identified as such by the suffix .bb. The file format is shown in FIG. 28.

The names of the objects and associated attributes are used in the knowledge source description files, and in the input data files. Names must match exactly in spelling and case in order for the shell to operate properly.

Only blackboard data values of type double are allowed. There is no specific maximum history length. Since the blackboard will maintain data points it receives within this history length, excess memory will be used and the system will be slowed needlessly if the history length is longer than what is required by the knowledge sources. A good check on this is to review the history lengths required by knowledge sources and adjust the blackboard history lengths appropriately.

Significant data received by the blackboard can be forwarded to the man machine interface window by using the DEMON feature. Under the object's attribute, include the line, DEMON: MMI WRITE. When the blackboard receives a new value of this object attribute, the object and attribute names and the value will be forwarded to the man machine interface. The value will be shown in the man machine window. This is a powerful tool for working with the shell, since it allows any object attribute to be tracked as the system is running. However, if too many object attributes have the DEMON turned on, the system will be slowed, and the number of values printed in the man machine window will be large. Once an application is tested, the use of the DEMON should be reserved for significant object attributes, such as those representing malfunctions.

Rule Base Description Files

Each rule base is defined by a description file that is comprised of three sections. The first section is a list of event expressions, called EVENTS. These expressions are used by the event detector to determine if a knowledge source should be placed on a list of knowledge sources to be fired which will be sent to the agenda manager. The second section is a list of event expressions, called PRECONDITIONS. These expressions are used by the agenda manager to check if a knowledge source should be fired at a given time.

For the EVENTS section, care should be exercised in writing event expressions that depend on the arrival of new data. Each event expression should refer to new data arriving from one source only (either the user interface or one of the other knowledge sources). All data is sent through the event detector, but each source of data (a knowledge source or the user interface) sends it in separate batches. Therefore, the event detector can only recognize data in a particular batch as new, even if data arriving from another source has the same time stamp. In general, caution should be exercised in writing event expressions with more that one "new" data point in the expression.

The PRECONDITIONS section contains expressions that are similar to those in the EVENTS section. Also, a periodic precondition can be set to cause a knowledge source to fire at regular intervals. This is done by placing a statement "every n" as a precondition, where n is the interval duration in seconds.

The third section defines the rule base structure, including all components of rule base such as hypotheses, malfunctions, rules, etc. A rule base description file is identified as such by the suffix .rb. Details of the file format are shown in FIG. 29.

The blackboard structure description file should be referenced and edited as necessary so that all object attributes named in the rule base as blackboard elements exactly match the names in the blackboard; mismatches will cause the rule base to fail to properly initialize.

There are many operators available in constructing a rule based description file. The user is referred to the Guide To Operators and Expressions for details on the available operators and their use.

Case Description Files

Each case base is defined by a description file that also contains three sections. The first two sections are EVENTS and PRECONDITIONS sections as described above. The third section contains the case base itself, consisting of a set of cases with values. A case description file is identified as such by the suffix .cb. Details of the file format are shown in FIG. 30.

As for the rule based description files, the object attributes in the case based files must exactly match blackboard object attributes, or a loading error will occur.

Each case should be comprised of a set of object attributes with associated case values. The time stamps used for the case values should reflect the required time intervals necessary for comparison; the absolute time is not important. For example, if in a particular case, an object attribute has a characteristic set of values over a 10 second period, the difference in the time stamps between the most recent and oldest values should be 10 seconds.

Input Data File

This file consists of the data that is to be used by the shell to simulate the arrival of actual data. The input data file is identified as such by the suffix .dat. The file format is shown in FIG. 31.

Input data is expected to be structured so that all data with a particular time stamp is grouped together in the same data set.

Object attribute names should exactly match the blackboard names. An error will be reported when the input data file is scanned if name mismatches occur.

The data in the input data file should appear in chronological order, from earliest data to latest data.

Use of the Program

The user must be in the directory where the domain shell executable files reside. All input files should also be in this directory, unless full pathnames are used for files located elsewhere. Also, output files are written in this directory. The program opens at least five windows during execution so it is advisable to have a display with only one window currently open. This window can reside anywhere on the display, but it is recommended that it be placed in the lower left corner.

The program is invoked by typing the program's name followed by the system file name. As currently installed, the program's name is user int. This can be changed by the user if desired. However, the names of the other executable files should not be changed.

Windows will be opened for each of the domain shell processes: blackboard, event detector, agenda manager, man machine interface, and each knowledge source. All windows are xterm windows, and can be resized, moved, or iconified. Each window is appropriately titled in the title bar—knowledge source windows are identified by their respective description file names. All knowledge source files are initially iconified (unless the NORMAL window option was specified in the system file), but can be opened as desired by the user. Within a window, the user can select a variety of viewing and tracing options by placing the pointer within the window, hitting the left or the center mouse button while holding the Ctrl key down, and choosing the desired option. A scrollbar for the window can be enabled by hitting Ctrl-Center Mouse Button and choosing the option "Enable Scrollbar".

A window's title bar identifies the process running within it (with the exception of the user interface window, which is a standard terminal window that the user has previously opened). The knowledge sources are identified by the name of the knowledge source description file associated with it. When the windows are iconified, the knowledge source windows are still identified by the description file's name; the other processes are identified by two letter abbreviations—bb for blackboard, ed for event detector, am for agenda manager, and mm for man machine interface.

Most interaction with the user occurs in the first window, where the program was started. This window will present the user with a menu of top level options after the system is set up. There are four choices: Start Data, Continue Data, Set Operating Parameters, and End the Session.

Start Data—Option 1

This option, when chosen by the user, prompts him for the name of an input data file. It then notifies all knowledge sources to reset and prepare for a session run. After scanning the input data file, the program prints the length of time needed to run the data in seconds. The user is given the option of compressing the time scale in order to complete a data set run in a shorter or longer period of time. The compression factor is divided into time intervals extracted from the data file to determine the compressed interval. After the compression factor is set, data is read from the input data file and sent at the appropriate time to the event detector, which forwards it to the blackboard. The system will operate, firing knowledge sources as appropriate, until the input data is exhausted. Informational messages will appear in the shell windows as the data set run proceeds. When the run is over, the user is presented with the top level menu in the user interface window.

Evidence of the operation of the blackboard is shown by the use of the characters '>' and '<' in the blackboard window. When data is placed in the blackboard, the '>' character is printed; when data is retrieved from the blackboard, the '<' character is printed.

The event detector will print out a set of three '.' characters as it proceeds with the evaluation of event expressions. The agenda manager will also show a set of three '.' characters indicating the completion of an activity. The man machine interface will print received data in its window as the blackboard sends it. Each data point sent will be displayed along with the object and attribute names. Only those object?attributes with DEMON: MMI WRITE will be displayed, and only when a new value is received by the blackboard.

If Start Data is chosen again after a data set has been run, then all data in the blackboard is discarded and all knowledge sources are reset. This, in effect, starts the session over. For continuing a run with further data, use Option 2, Continue Data.

Continue Data—Option 2

This option causes the system to run a data set in a manner identical to that for Option 1—Start Data. However, for the Continue Data option no messages are sent to knowledge sources to reset, and the blackboard data is retained from the previous run. This allows the rule bases to continue operation with current values that were set as a result of operations during a previous data set run. As for Option 1, the user is prompted for the name of an input data file. Data in this file should be begin with a time stamp that is chronologically later than the last data in the previous data set in order for this option to operate correctly. If further data is sent to the blackboard with time stamps earlier than data from a previous run, the blackboard will place the data in the blackboard as a current value for an attribute with no history. However, for attributes with non-zero history length, the blackboard will insert the value at someplace in the history other than as the latest value. This will cause indeterminate behavior as the event detector may fire a knowledge source based on the arrival of "new" data; when the knowledge source retrieves the data from the blackboard, the data is hidden and the knowledge source fires using possibly incorrect data points.

When the data set is running, the appearance of the shell processes is identical to that for Option 1—Start Data.

Set Operating Parameters—Option 3

This option allows the user to set parameters for rule bases. If this option is chosen, the user is prompted for the name of a rule base. Only rule bases have the option of setting operational parameters. The case based knowledge sources have no Set Parameter options. There are six choices for setting parameters: Trace, Log, Step, Breakpoint, Alpha/Beta, and SF/NF.

If Option 3 is selected by the user, he is then prompted to enter the name of a knowledge source file. This specifies the knowledge source file for which the parameter is to be set. Currently, only rule bases have parameters that can be set. After the knowledge source file is specified, the user is then prompted to enter the code corresponding to the parameter to be set.

Trace—Parameter Option 0: If this option is chosen, the user is asked whether to disable or set a tracing capability. When set, this causes detailed descriptions to be displayed in the rule base window when each rule in the rule base is fired.

Log—Parameter Option 1: If this option is chosen, the user is asked whether to disable or set a logging capability. When set, this causes descriptions identical to those generated for the Trace option to be sent to a file. The file is named with a root name the same as the rule base description file that created it, with the .log extension.

Step—Parameter Option 2: If this option is chosen, the user is asked whether to disable or set the step functionality. When set, the Step option causes the rule base to stop after each rule is fired; the rule base will continue only when the user acknowledges the rule firing by responding in the rule base window. Therefore it is necessary for the user to change his focus of attention to the rule base window when this option is set. When the rule base fires, the processing will stop and the user will have options within the rule base. Data will continue to be sent to the blackboard, and all other shell processes will proceed. However, further knowledge source firings will be delayed until the user has completed stepping through the rules in the rule base. Execution of the rest of the shell will therefore be disabled. The purpose of the Step option is to allow the user to follow in detail the sequence of rule firings in a rule base. Since its use generaly ruins the timing of process execution, it should only be used in configurations with only one knowledge source, for debugging purposes.

Breakpoint—Parameter Option 3: If this option is chosen, the user can set or remove breakpoints at rules in a rule base window. In order to use this option, the user must move to the appropriate rule base window in order to set the breakpoints. In the rule base window, the user can set and remove breakpoints for any rule in the rule base. Upon completion, the user must return to the first window to choose a top level option.

As with the Step option, rule base operation is suspended during firing if breakpoints are set. The use of breakpoints is for observation of rule base operation, rather than shell performance as a whole. In other words, it should only be used in configurations with only one knowledge source, for debugging purposes.

Alpha/Beta—Parameter Option 4: If this option is chosen, global values for alpha and beta cutoffs can be set for a particular rule base. The user is prompted to enter values for alpha and beta (from $-1.0$ to $+1.0$). These values are then passed to the rule base specified.

SF/NF—Parameter Option 5: If this option is chosen, global values for the sufficiency and necessity factors (SF and NF) for rules can be set for a particular rule base. The user is prompted to enter values for SF and NF (from $-1.0$ to $+1.0$). These values are then passed to the rule base specified.

End the Session—Option 4

If this option is chosen, the session is ended and the program exits. Output files are written as described herein. Each knowledge source generated a log file that contains a list of diagnoses. The blackboard writes an output file that contains the structural information from the blackboard input file, and a snapshot of all data values currently stored in the blackboard.

Output Files

When the session is ended, each of the knowledge sources prints out at least one output file that contains the results of operation. A rule base may print out a log file if that parameter has been set through the set parameter option.

Each time a session has ended after a set of data has been run, every rule base for the system will create an output file with the results of diagnosis. This file has the same root filename as the rule base description file, but with the suffix .out. The results of diagnostics generated each time the rule base was fired are written into this file. The data written includes the diagnoses that are reached, the number of rules that were fired, and the number of rules fired per second.

If the LOG option has been selected for the rule base, then an output log file is created. This file has the same root filename as the rule base description file, but with the suffix .log. This contains detailed messages that indicate the sequence of operation of the rule base.

The case based processes will write out the results of scoring cases into a file with the same root name as the case description filename's root, and with the suffix .out. The file will contain a record of the results of scoring over a complete data set run.

The blackboard produces an output file that contains all of the object and attribute information from the input file plus all of the data currently stored in the blackboard. This file can be used as an input file for subsequent session runs. In this case, input data sets should contain time stamps chronologically later than the latest data in the blackboard, or indeterminate behavior will result.

Errors

Errors encountered in using the shell can generally be divided into two categories: syntax/loading errors and logical errors. If a particular knowledge source encounters an error, it will print an error message identifying the line number in the file where the error is located. An error message is sent to the user interface. This causes the user interface to try to kill the shell processes and exit.

Logical errors are causes when the information contained in the knowledge source files does not correspond to the desired performance due to incorrect rules, etc. These errors may be difficult to locate. The shell provides several tools to assist in following the operation of the individual shell processes. These include the Set Parameter Options for the rule bases. Also, the values of object?attributes posted on the blackboard can be printed in the man machine window using the DEMON feature. All of the output files can be used to assist in discovering the error.

Case-Based Diagnostics Example: The Intelligent Notebook

Background

This application was developed for the Westinghouse Electronic Repair Center, a large repair depot, which supports a very large number of electronic products, over the full life cycle of these products. Typically, units returned for repair have to be diagnosed first. This is done by first subjecting the unit to a series of tests using Automatic Test Equipment (ATE). This step generates a set of pass/fail results which point to failed unit functionality, but not to actual component failure. Beyond the ATE tests, the diagnostic expertise most often resides with the test technicians who are assigned to the task of testing a repair candidate UUT (Unit Under Test). The technician's troubleshooting techniques and diagnostic expertise are developed through experience, possibly trial and error at first, gradually building up to a thorough understanding of the operation of a UUT. For a variety of reasons, such as a decreasing number of returns for a given UUT as products mature, and due to people mobility, the expertise is often lost before the operational life of a unit has ended. Retaining this expertise, while in the process aiding the technicians' day to day work were the primary goals of this application.

Rule-Based and Mode-Based Approaches

Since knowledge capture and manipulation were the central issues, it seemed appropriate to apply expert system technology. In fact, at that time (early 1980's), rule-based systems were being used in other electronic diagnostic domains. A prototype system was developed over a period of one year, which diagnosed one class of units. Soon thereafter, several limitations were discovered which made this approach infeasible. The limitation of greatest impact related to the level of effort required for the development of the hundreds of expert systems that would have been needed to make this into a useful application. At that point, two new and different directions were pursued. One involved diagnostics from "first-principles", or deep diagnostics. While this approach showed promise, it required several years of research before a viable application could even begin to be implemented. The results of this research are briefly described in Appendix B.

A Case-Based Approach

In solving most problems, half the battle is formulating the problem correctly. In this case, the problem was re-formulated by studying the methodology employed by the test technicians. It became apparent that an approach that emulated the way the technicians did their job was most appropriate. The basic observation was that technicians built up their knowledge over extended periods of time. The tool they used for this was the technician's logbook, which was very much like a diary where an entry was made for each unit tested. In time, however, the logbook lost its utility, because entries were sequential, and old entries were becoming increasingly difficult to find. On the other hand, the logbook contains a collection of past cases, and the diagnostic process carried out by an experienced technician was essentially a case retrieval process. Clearly a case-based approach was appropriate for this application.

Figure 90:
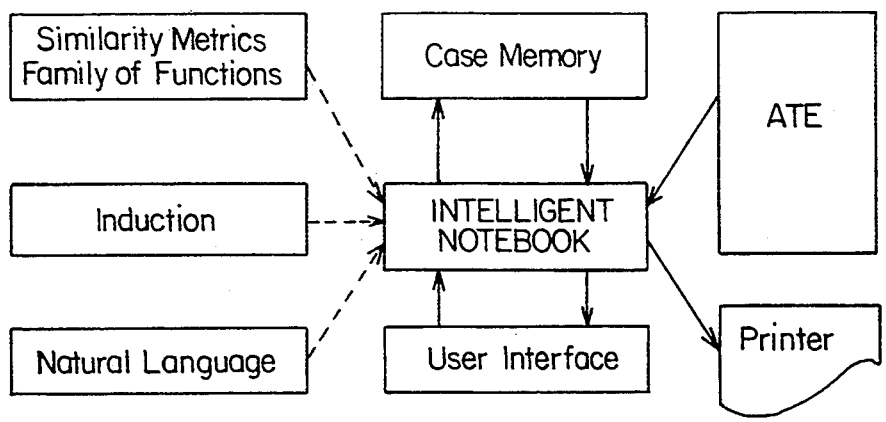
FIG. 90 is an intelligent notebook block diagram.
Figure 91:
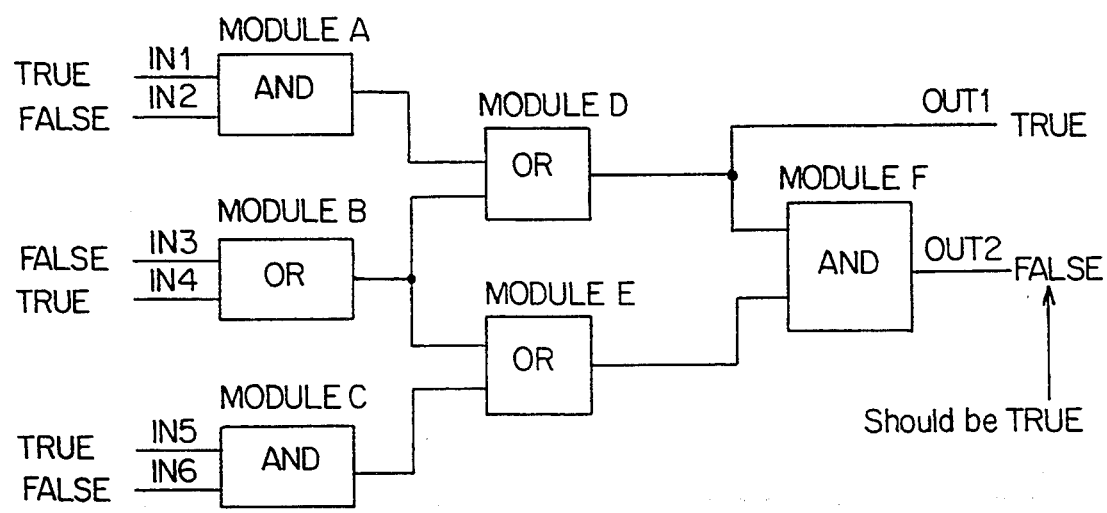
FIG. 91 is a diagram of a detailed example of model-based reasoning.

FIG. 90 shows a simplified block diagram of the Intelligent Notebook system. The case memory contains an ever increasing number of past cases. Each case consists of the following:

1. Serial/part number: uniquely identifies the type of UUT.
2. ATE test result pattern: enumerated by the specific test procedure for that type of unit.
3. Other symptoms: can be such things as visual observations (burn marks, missing parts, solder splashes, etc.), measurements taken at test points, description of erratic behavior, etc.
4. Actions taken: steps taken to repair the JUT.
5. Comments: free-format text.
6. Author name, date of entry.

The first three entries are used for case retrieval. The serial/part number and the test results are automatically received from the ATE. They are used for the first stage of retrieval. Based on the other symptoms associated with the cases found in this first stage, additional information is obtained from the user, which is used to narrow down the number of cases. The user selects the most appropriate case and performs editing (modification and repair) if necessary before adding a new case to the data base. Similarly, if no cases were found, he adds the new case to the data base. Either way, a report is printed, summarizing these activities.

The three blocks on the left, connected by dashed lines, represent planned extensions to the system. The top box represents extensions to the similarity measure algorithms, to account for the need to use different functions in different circumstances. This extension is being carried out by the customer (the Westinghouse Electronic Repair Center). The middle box deals with the incorporating induction functionality, to take advantage of the large number of examples (cases) accumulated. The goal would be to speed up the search time through the case memory. A cost/benefit analysis showed that this extension was not necessary for this application, and thus it was never implemented. The third extension involved the use of pseudo-natural language, mainly for the purpose of improved indexes using the textual part of the entries. This extention was only partially implemented, for the "Other symptoms" part of an entry.

Having now described a limited number of embodiments of the invention, it should now be apparent to those skilled in the art that numerous other embodiments and modifications thereof are contemplated as falling within the scope of the present invention as defined by the appended claims.

What is claimed is:

1. An artificial intelligence software shell for plant operation simulation comprising:
   a blackboard module including a database having objects representing plant elements and concepts;
   at least one knowledge source module including an artificial intelligence operation scheme, in communication with the blackboard module, operating on specific predefined blackboard objects;
   a user interface module, in communication with the blackboard module, enabling a user to view blackboard status information; and
   a control module, in communication with the blackboard module and the at least one knowledge source module, receiving input data and controlling operation of the at least one knowledge source module;

wherein the control module includes:
an event detector module, in communication with the user interface module, determining when the at least one knowledge source should execute, the event detector module including a hash table including a data point structure having entries for objects, and at least one expression list, the hash table being defined by a chaining algorithm.

2. A software shell as claimed in claim 1 wherein the control module includes:
an activation/agenda manager module, in communication with the at least one knowledge source module and the event detector module, executing the at least one knowledge source module in accordance with a predetermined knowledge source priority scheme.

3. A software shell as claimed in claim 2 wherein the at least one knowledge source module includes:
a rule-based knowledge source module having a forward-chaining belief propagation scheme including rules in if-then-else form with associated levels of belief; and
a case-based knowledge source module having a data comparison scheme including predefined patterns and conditions, whereupon execution of the case-based knowledge source, the conditions are inferred to be true if a certain level of closeness is found between received data and the patterns.

4. A software shell as claimed in claim 3 wherein the at least one knowledge source module includes a plurality of knowledge sources of varying priority.

5. A software shell as claimed in claim 3 wherein each of said modules includes a Unix process.

6. A software shell as claimed in claim 3 wherein the blackboard module database includes a hierarchy of objects having vertical hierarchical connections and horizontal links.

7. A software shell as claimed in claim 6 wherein each blackboard object has attributes and each attribute has at least one value, the database including a hash table and plurality of pointers for linking the objects and corresponding attributes and values.

8. A software shell as claimed in claim 6 wherein the vertical hierarchical connections include IS-A and PART-OF hierarchical connections.

9. A software shell as claimed in claim 3 further including message queues and stream sockets for interprocess communication links between modules, messages being communicated in the form of a request-response pair.

10. A software shell as claimed in claim 9 wherein the communication links include data-oriented and control-oriented communication links.

11. A software shell as claimed in claim 10 wherein the data-oriented communication links carry messages including:
an acknowledgment message;
a notification of failure message;
a request for data message;
a data supplied message; and
a knowledge source list message.

12. A software shell as claimed in claim 11 wherein the control-oriented communication links carry messages including:
a start message;
a stop message;
an activate process message;
a set parameters message;
an acknowledgment message; and
a notification of failure message.

13. A software shell as claimed in claim 10 wherein the control-oriented communication links carry messages including:
a start message;
a stop message;
an activate process message;
a set parameters message;
an acknowledgment message; and
a notification of failure message.

14. A software shell as claimed in claim 2 wherein the activation/agenda manager module includes a mechanism for interrupting execution of a knowledge source and executing a higher priority knowledge source in accordance with the knowledge_ source priority scheme.

15. A software shell as claimed in claim 14 wherein the activation/agenda manager module includes a mechanism for determining whether an interrupted knowledge source should be rescheduled for execution.

16. A software shell as claimed in claim 2 wherein the event detector module includes a mechanism receiving blackboard input data and determining when knowledge source execution preconditions are met.

17. A software shell as claimed in claim 1 wherein the at least one knowledge source module includes:
a rule-based knowledge source module having a forward-chaining belief propagation scheme including rules in if-then-else form with associated levels of belief; and
a case-based knowledge source module having a data comparison scheme including predefined patterns and conditions, whereupon execution of the case-based knowledge source, the conditions are inferred to be true if a certain level of closeness is found between received data and the patterns.

18. A software shell as claimed in claim 17 further including:
a blackboard structure description file including object names and attribute/value pairs for each object;
a rule-based description file including rules forming the rule-based knowledge source and a description of execution preconditions for the rule-based knowledge source; and
a case-based description file including cases forming the case-based knowledge source and a description of execution preconditions for the case-based knowledge source;
wherein the blackboard structure description file, rule-based description file, case-based description file, and input data file are user created.

19. A software shell as claimed in claim 18 further including:
a diagnostics file, created by the shell for each input data file cycle completed, including diagnoses made by the rule-based knowledge source and case matches found by the case-based knowledge source; and
a blackboard status file, created by the shell, including blackboard information as modified by any knowledge sources after completion of each input data file cycle.

20. A software shell as claimed in claim 1 wherein the blackboard module database includes a hierarchy of objects having vertical hierarchical connections and horizontal links.

21. A software shell as claimed in claim 20 wherein each blackboard object has attributes and each attribute has at least one value, the database including a hash table and plurality of pointers for linking the objects and corresponding attributes and values.

22. A software shell as claimed in claim 20 wherein the vertical hierarchical connections include IS-A and PART-OF hierarchical connections.

23. An artificial intelligence software shell for plant operation simulation comprising:
   means for storing objects representing plant elements and concepts;
   at least one knowledge source module including and artificial intelligence operation scheme, in communication with the means for storing, operating on specific predefined objects;
   means, in communication the means for storing, for enabling a user to view object status information; and
   means, in communication the means for storing and the at least one knowledge source module, for receiving input data and controlling operation of the at least one knowledge source module;
   wherein the means for receiving and controlling include means, in communication with the means for enabling, for determining when the at least one knowledge source module should execute, the means for determining including a hash table including a data point structure having entries for objects, and at least one expression list, the hash table being defined by a chaining algorithm.

24. A software shell as claimed in claim 23 wherein the means for receiving and controlling include:
   means, in communication with the at least one knowledge source module and the means for determining, for executing the at least one knowledge source module in accordance with a predetermined knowledge source priority scheme.

25. A software shell as claimed in claim 24 wherein the at least one knowledge source module includes:
   a rule-based knowledge source module having a forward-chaining belief propagation scheme including rules in if-then-else form with associated levels of belief; and
   a case-based knowledge source module having a data comparison scheme including predefined patterns and conditions, whereupon execution of the case-based knowledge source, the conditions are inferred to be true if a certain level of closeness is found between received data and the patterns.

26. A software shell as claimed in claim 25 wherein the at least one knowledge source module includes a plurality of knowledge sources of varying priority.

27. A software shell as claimed in claim 25 wherein the means for storing includes a database having a hierarchy of objects having vertical hierarchical connections and horizontal links.

28. A software shell as claimed in claim 27 wherein each object has attributes and each attribute has at least one value, the database including a hash table and a plurality of pointers for linking objects and corresponding attributes and values.

29. A software shell as claimed in claim 28 wherein the vertical hierarchical connections include IS-A and PART-OF hierarchical connections.

30. A software shell as claimed in claim 25 wherein the means for executing includes means for interrupting execution of a lower priority knowledge source and executing a higher priority knowledge source in accordance with the knowledge source priority scheme.

31. A software shell as claimed in claim 25 wherein the means for determining includes means for receiving input data and determining when knowledge source execution preconditions are met.

32. A software shell as claimed in claim 25 further including:
   a blackboard structure description file including object names and attribute/value pairs for each object;
   a rule-based description file including rules forming the rule-based knowledge source and a description of execution preconditions for the rule-based knowledge source;
   a case-based description file including cases forming the case-based knowledge source and a description of execution preconditions for the case-based knowledge source;
   wherein the blackboard structure description file, rule-based description file, case-based description file, and input data file are user created.

33. A software shell as claimed in claim 32 further including:
   a diagnostics file, created by the shell for each input data file cycle completed, including diagnoses made by the rule-based knowledge source and case matches found by the case-based knowledge source; and
   a blackboard status file, created by the shell, including blackboard information as modified by any knowledge sources after completion of each input data file cycle.

34. A software shell as claimed in claim 25 further including message queues and stream sockets for interprocess communication links, the messages being communicated in the form of a request-response pair.

35. A software shell as claimed in claim 34 wherein the communication links include data-oriented and control-oriented communication links.

36. A software shell as claimed in claim 35 wherein the data-oriented communication links carry messages including:
   an acknowledgment message;
   a notification of failure message;
   a request for data message;
   a data supplied message; and
   a knowledge source list message.

37. A software shell as claimed in claim 36 wherein the control-oriented communication links carry messages including:
   a start message;
   a stop message;
   an activate process message;
   a set parameters message;
   an acknowledgment message; and
   a notification of failure message.

38. A method of simulating plant operation with an artificial intelligence software shell comprising the steps of:
   storing, in a database, objects representing plant elements and concepts;
   reading input data from an input data file;
   determining when artificial intelligence knowledge sources should execute in accordance with a predetermined knowledge source priority scheme; and
   executing knowledge sources, in accordance with the determination, on specific predefined objects;

wherein the step of determining includes the step of accessing a hash table being defined by a chaining algorithm, the hash table including a data point structure having entries for objects and at least one expression list.

39. A method as claimed in claim 38 wherein the step of executing knowledge sources includes the step of updating object values.

40. A method as claimed in claim 38 wherein the step of executing knowledge sources includes the steps of:
executing rule-based knowledge sources having a forward-chaining belief propagation scheme including rules in if-then-else form with associated levels of belief;
and executing case-based knowledge sources having a data comparison scheme including predefined patterns and conditions.

41. A method as claimed in claim 40 wherein the step of executing case-based knowledge sources includes the step of inferring to be true the conditions if a certain level of closeness is found between received data and the patterns.

42. A method as claimed in claim 40 further including the steps of:
generating a blackboard structure description file including object names and attribute/value pairs for each object;
generating a rule-based description file including rules forming the rule-based knowledge source and execution preconditions; and
generating a case-based description file including cases and a description of execution preconditions.

43. A method as claimed in claim 42 further including the steps of:
generating a rule-based knowledge source module from the rule-based description file; and
generating a case-based knowledge source module from the case-based description file.

44. A method as claimed in claim 40 further including the steps of:
generating a diagnostics file including diagnoses made by the rule-based knowledge sources and case matches found by the case-based knowledge sources; and
generating a blackboard status file including blackboard information as modified by any knowledge sources during execution.

45. A method as claimed in claim 40 wherein the step of executing knowledge sources further includes the step of executing a plurality of knowledge sources having various levels of priority.

46. A method as claimed in claim 38 wherein the step of storing includes the step of storing objects, attributes and values, each object having an attribute and each attribute having at least one value.

47. A method as claimed in claim 46 wherein the step of storing further includes the step of setting up a database including a hash table and a plurality of pointers linking each object with corresponding attributes and values.

48. A method as claimed in claim 47 wherein the step of setting up a database includes the step of creating hierarchical links between objects.

49. A method as claimed in claim 38 wherein the step of executing knowledge sources includes the step of interrupting execution of a lower priority knowledge source and executing a higher priority knowledge source in accordance with the knowledge source priority scheme.

50. A method as claimed in claim 49 wherein the step of executing knowledge sources further includes the step of, after the step of interrupting, determining whether an interrupted knowledge source should be rescheduled for execution.

51. A method as claimed in claim 50 wherein the step of executing knowledge sources further includes the step of, after determining whether an interrupted knowledge source should be rescheduled for execution, rescheduling that knowledge source in accordance with the determination.

52. A method as claimed in claim 38 wherein the step of determining includes the step of determining when knowledge source execution preconditions are met.

53. A method as claimed in claim 38 further including the steps of communicating messages through sockets between modules in the form of request-response pairs.

54. An artificial intelligence software shell for plant operation simulation comprising:
a blackboard module including a database having objects representing plant elements and concepts;
at least one knowledge source module including an artificial intelligence operation scheme, in communication with the blackboard module, operating on specific predefined blackboard objects;
an input data module, in communication with the blackboard module and the at least one knowledge source module, enabling data to be inputted to the shell; and
a control module, in communication with the input data module and the at least one knowledge source module, receiving all input data and controlling operation of the at least one knowledge source in accordance with a predetermined knowledge source interruptibility/priority scheme, the control module includes a hash table defined by a chaining algorithm, the hash table further including a data point structure having entries for objects and at least one expression list.

55. An event detector module for an artificial intelligence software shell for plant operation simulation, the shell including a blackboard module database having objects representing plant elements and concepts, and at least one knowledge source module including an artificial intelligence operation scheme for execution on the blackboard objects, the event detector module comprising:
a communication module receiving input data; and
a determination module, including a hash table defined by a chaining algorithm, for determining when the at least one knowledge source module should execute, the hash table further including a data point structure having entries for objects and at least one expression list.

* * * * *